(12) United States Patent
Demos

(10) Patent No.: US 6,728,317 B1
(45) Date of Patent: Apr. 27, 2004

(54) MOVING IMAGE COMPRESSION QUALITY ENHANCEMENT USING DISPLACEMENT FILTERS WITH NEGATIVE LOBES

(75) Inventor: Gary A. Demos, Culver City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 09/545,233

(22) Filed: Apr. 7, 2000

Related U.S. Application Data

(63) Continuation-in-part of application No. 09/442,595, filed on Nov. 17, 1999, now abandoned, which is a continuation of application No. 09/217,151, filed on Dec. 21, 1998, now Pat. No. 5,988,863, which is a continuation of application No. 08/594,815, filed on Jan. 30, 1996, now Pat. No. 5,852,565.

(51) Int. Cl.[7] .............................. H04N 7/12; G06K 9/40
(52) U.S. Cl. ............................ 375/240.21; 375/240.29; 382/261
(58) Field of Search ..................... 375/240.21, 240.29, 375/240.16, 240.02, 240.25, 240.26, 240.27; 348/424.1; 382/261–264

(56) References Cited

U.S. PATENT DOCUMENTS

| | | | | |
|---|---|---|---|---|
| 5,253,058 A | * | 10/1993 | Gharavi ................. | 375/240.12 |
| 5,270,813 A | * | 12/1993 | Puri et al. .............. | 375/240.01 |
| 5,387,940 A | * | 2/1995 | Kwok et al. ................ | 348/446 |
| 5,408,270 A | * | 4/1995 | Lim ....................... | 375/240.25 |
| 5,414,469 A | * | 5/1995 | Gonzales et al. ....... | 375/240.15 |
| 5,418,571 A | * | 5/1995 | Ghanbari ............... | 375/240.16 |
| 5,742,343 A | | 4/1998 | Haskell et al. ......... | 375/240.15 |
| 5,828,788 A | | 10/1998 | Chiang et al. ............. | 382/239 |
| 5,852,565 A | | 12/1998 | Demos ...................... | 708/203 |
| 5,974,159 A | * | 10/1999 | Lubin et al. ............... | 382/106 |
| 5,988,863 A | | 11/1999 | Demos ...................... | 708/203 |
| 6,028,634 A | | 2/2000 | Yamaguchi et al. ... | 375/240.16 |
| 6,175,592 B1 | * | 1/2001 | Kim et al. .................. | 348/441 |
| 6,252,906 B1 | * | 6/2001 | Canfield ................ | 375/240.21 |
| 2002/0003838 A1 | * | 1/2002 | Takahashi et al. ...... | 375/240.21 |

OTHER PUBLICATIONS

Shen et al., "Adaptive motion vector resampling for compressed video down–scaling", International Conference on Image Processing, vol. 1, pp. 771–774, Oct. 26–29, 1997.*

* cited by examiner

*Primary Examiner*—Gims Philippe
(74) *Attorney, Agent, or Firm*—Fish & Richardson P.C.

(57) ABSTRACT

A method and apparatus for image compression using temporal and resolution layering of compressed image frames. In particular, layered compression allows a form of modularized decomposition of an image that supports flexible application of a variety of image enhancement techniques. Further, the invention provides a number of enhancements to handle a variety of video quality and compression problems. Most of the enhancements are preferably embodied as a set of tools which can be applied to the tasks of enhancing images and compressing such images. The tools can be combined by a content developer in various ways, as desired, to optimize the visual quality and compression efficiency of a compressed data stream, particularly a layered compressed data stream. Such tools include improved image filtering techniques, motion vector representation and determination, de-interlacing and noise reduction enhancements, motion analysis, imaging device characterization and correction, an enhanced 3-2 pulldown system, frame rate methods for production, a modular bit rate technique, a multi-layer DCT structure, variable length coding optimization, an augmentation system for MPEG-2 and MPEG-4, and guide vectors for the spatial enhancement layer.

9 Claims, 22 Drawing Sheets

MOVING IMAGE COMPRESSION QUALITY ENHANCEMENT USING DISPLACEMENT FILTERS WITH NEGATIVE LOBES

CROSS-REFERENCE TO RELATED APPLICATIONS

This application is a continuation-in-part application of and claims priority to U.S. application Ser. No. 09/442,595 filed on Nov. 17, 1999 abandoned which was a continuation of U.S. application Ser. No. 09/217,151 filed on Dec. 21, 1998 now U.S. Pat. No. 5,988,863 which was a continuation of U.S. application Ser. No. 08/594,815 filed Jan. 30, 1996 (now U.S. Pat. No. 5,852,565, issued Dec. 22, 1998).

TECHNICAL FIELD

This invention relates to electronic communication systems, and more particularly to an advanced electronic television system having temporal and resolution layering of compressed image frames having enhanced compression, filtering, and display characteristics.

BACKGROUND

The United States presently uses the NTSC standard for television transmissions. However, proposals have been made to replace the NTSC standard with an Advanced Television standard. For example, it has been proposed that the U.S. adopt digital standard-definition and advanced television formats at rates of 24 Hz, 30 Hz, 60 Hz, and 60 Hz interlaced. It is apparent that these rates are intended to continue (and thus be compatible with) the existing NTSC television display rate of 60 Hz (or 59.94 Hz). It is also apparent that "3-2, pulldown" is intended for display on 60 Hz displays when presenting movies, which have a temporal rate of 24 frames per second (fps). However, while the above proposal provides a menu of possible formats from which to select, each format only encodes and decodes a single resolution and frame rate. Because the display or motion rates of these formats are not integrally related to each other, conversion from one to another is difficult.

Further, this proposal does not provide a crucial capability of compatibility with computer displays. These proposed image motion rates are based upon historical rates which date back to the early part of this century. If a "clean-slate" were to be made, it is unlikely that these rates would be chosen. In the computer industry, where displays could utilize any rate over the last decade, rates in the 70 to 80 Hz range have proven optimal, with 72 and 75 Hz being the most common rates. Unfortunately, the proposed rates of 30 and 60 Hz lack useful interoperability with 72 or 75 Hz, resulting in degraded temporal performance.

In addition, it is being suggested by some that interlace is required, due to a claimed need to have about 1000 lines of resolution at high frame rates, but based upon the notion that such images cannot be compressed within the available 18–19 mbits/second of a conventional 6 MHz broadcast television channel.

It would be much more desirable if a single signal format were to be adopted, containing within it all of the desired standard and high definition resolutions. However, to do so within the bandwidth constraints of a conventional 6 MHz broadcast television channel requires compression and "scalability" of both frame rate (temporal) and resolution (spatial). One method specifically intended to provide for such scalability is the MPEG-2 standard. Unfortunately, the temporal and spatial scalability features specified within the MPEG-2 standard (and newer standards, like MPEG-4) are not sufficiently efficient to accommodate the needs of advanced television for the U.S. Thus, the proposal for advanced television for the U.S. is based upon the premise that temporal (frame rate) and spatial (resolution) layering are inefficient, and therefore discrete formats are necessary.

Further, it would be desirable to provide enhancements to resolution, image clarity, coding efficiency, and video production efficiency. The present invention provides such enhancements.

SUMMARY

The invention provides a method and apparatus for image compression which demonstrably achieves better than 1000-line resolution image compression at high frame rates with high quality. It also achieves both temporal and resolution scalability at this resolution at high frame rates within the available bandwidth of a conventional television broadcast channel. The inventive technique efficiently achieves over twice the compression ratio being proposed for advanced television. Further, layered compression allows a form of modularized decomposition of an image that supports flexible application of a variety of image enhancement techniques.

Image material is preferably captured at an initial or primary framing rate of 72 fps. An MPEG-like (e.g., MPEG-2, MPEG-4, etc.) data stream is then generated, comprising:

(1) a base layer, preferably encoded using only MPEG-type P frames, comprising a low resolution (e.g., 1024× 512 pixels), low frame rate (24 or 36 Hz) bitstream;

(2) an optional base resolution temporal enhancement layer, encoded using only MPEG-type B frames, comprising a low resolution (e.g., 1024×512 pixels), high frame rate (72 Hz) bitstream;

(3) an optional base temporal high resolution enhancement layer, preferably encoded using only MPEG-type P frames, comprising a high resolution (e.g., 2 k×1 k pixels), low frame rate (24 or 36 Hz) bitstream;

(4) an optional high resolution temporal enhancement layer, encoded using only MPEG-type B frames, comprising a high resolution (e.g., 2 k×1 k pixels), high frame rate (72 Hz) bitstream.

The invention provides a number of key technical attributes, allowing substantial improvement over current proposals, and including: replacement of numerous resolutions and frame rates with a single layered resolution and frame rate; no need for interlace in order to achieve better than 1000-lines of resolution for 2 megapixel images at high frame rates (72 Hz) within a 6 MHz television channel; compatibility with computer displays through use of a primary framing rate of 72 fps; and greater robustness than the current unlayered format proposal for advanced television, since all available bits may be allocated to a lower resolution base layer when "stressful" image material is encountered.

Further, the invention provides a number of enhancements to handle a variety of video quality and compression problems. The following describes a number of such enhancements, most of which are preferably embodied as a set of tools which can be applied to the tasks of enhancing images and compressing such images. The tools can be combined by a content developer in various ways, as desired, to optimize the visual quality and compression efficiency of a compressed data stream, particularly a layered compressed data stream.

Such tools include improved image filtering techniques, motion vector representation and determination, de-interlacing and noise reduction enhancements, motion analysis, imaging device characterization and correction, an enhanced 3-2 pulldown system, frame rate methods for production, a modular bit rate technique, a multi-layer DCT structure, variable length coding optimization, an augmentation system for MPEG-2 and MPEG-4, and guide vectors for the spatial enhancement layer.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
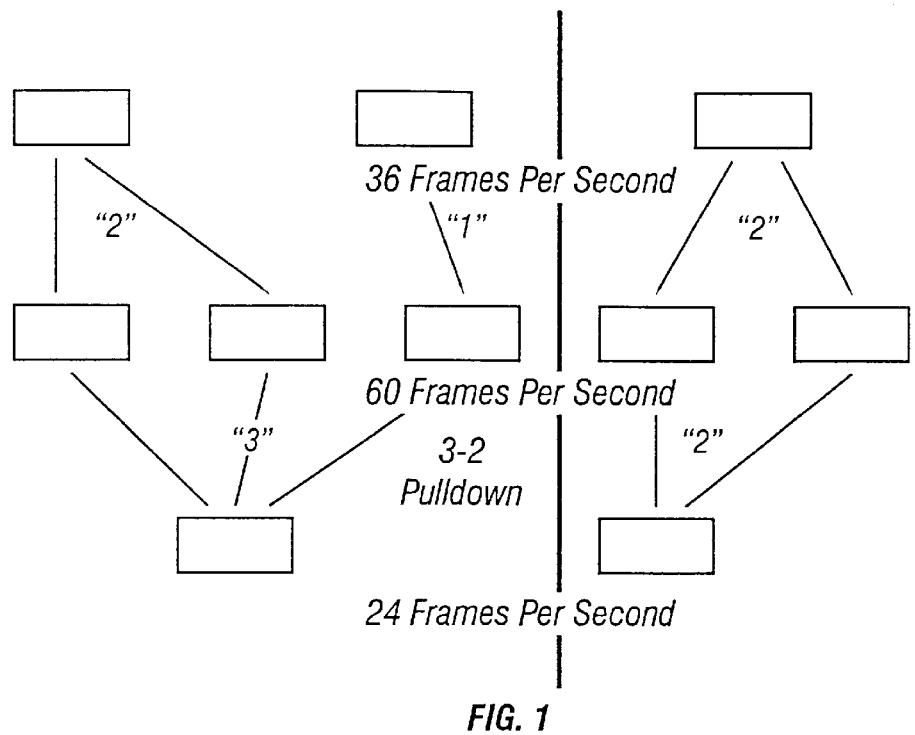
FIG. 1 is a timing diagram showing the pulldown rates for 24 fps and 36 fps material to be displayed at 60 Hz.

Throughout this description, the preferred embodiment and examples shown should be considered as exemplars, rather than as limitations on the invention.

TEMPORAL AND RESOLUTION LAYERING

Goals of a Temporal Rate Family

After considering the problems of the prior art, and in pursuing the invention, the following goals were defined for specifying the temporal characteristics of a future digital television system:

Optimal presentation of the high resolution legacy of 24 frame-per-second films.

Smooth motion capture for rapidly moving image types, such as sports.

Smooth motion presentation of sports and similar images on existing analog NTSC displays, as well as computer-compatible displays operating at 72 or 75 Hz.

Reasonable but more efficient motion capture of less-rapidly-moving images, such as news and live drama.

Reasonable presentation of all new digital types of images through a converter box onto existing NTSC displays.

High quality presentation of all new digital types of images on computer-compatible displays.

If 60 Hz digital standard or high resolution displays come into the market, reasonable or high quality presentation on these displays as well.

Since 60 Hz and 72/75 Hz displays are fundamentally incompatible at any rate other than the movie rate of 24 Hz, the best situation would be if either 72/75 or 60 were eliminated as a display rate. Since 72 or 75 Hz is a required rate for N.I.I. (National Information Infrastructure) and computer applications, elimination of the 60 Hz rate as being fundamentally obsolete would be the most future-looking. However, there are many competing interests within the broadcasting and television equipment industries, and there is a strong demand that any new digital television infrastructure be based on 60 Hz (and 30 Hz). This has lead to much heated debate between the television, broadcast, and computer industries.

Further, the insistence by some interests in the broadcast and television industries on interlaced 60 Hz formats further widens the gap with computer display requirements. Since non-interlaced display is required for computer-like applications of digital television systems, a de-interlacer is required when interlaced signals are displayed. There is substantial debate about the cost and quality of de-interlacers, since they would be needed in every such receiving device. Frame rate conversion, in addition to de-interlacing, further impacts cost and quality. For example, that NTSC to-from PAL converters continue to be very costly and yet conversion performance is not dependable for many common types of scenes. Since the issue of interlace is a complex and problematic subject, and in order to attempt to address the problems and issue of temporal rate, the invention is described in the context of a digital television standard without interlace.

Selecting Optimal Temporal Rates

Beat Problems. Optimal presentation on a 72 or 75 Hz display will occur if a camera or simulated image is created having a motion rate equal to the display rate (72 or 75 Hz, respectively), and vice versa. Similarly, optimal motion fidelity on a 60 Hz display will result from a 60 Hz camera or simulated image. Use of 72 Hz or 75 Hz generation rates with 60 Hz displays results in a 12 Hz or 15 Hz beat frequency, respectively. This beat can be removed through motion analysis, but motion analysis is expensive and inexact, often leading to visible artifacts and temporal aliasing. In the absence of motion analysis, the beat frequency dominates the perceived display rate, making the 12 or 15 Hz beat appear to provide less accurate motion than even 24 Hz. Thus, 24 Hz forms a natural temporal common denominator between 60 and 72 Hz. Although 75 Hz has a slightly higher 15 Hz beat with 60 Hz, its motion is still not as smooth as 24 Hz, and there is no integral relationship between 75 Hz and 24 Hz unless the 24 Hz rate is increased to 25 Hz. (In European 50 Hz countries, movies are often played 4% fast at 25 Hz; this can be done to make film presentable on 75 Hz displays.)

In the absence of motion analysis at each receiving device, 60 Hz motion on 72 or 75 Hz displays, and 75 or 72 Hz motion on 60 Hz displays, will be less smooth than 24 Hz images. Thus, neither 72/75 Hz nor 60 Hz motion is suitable for reaching a heterogeneous display population containing both 72 or 75 Hz and 60 Hz displays.

3-2 Pulldown. A further complication in selecting an optimal frame rate occurs due to the use of "3-2 pulldown" combined with video effects during the telecine (film-to-video) conversion process. During such conversions, the 3-2 pulldown pattern repeats a first frame (or field) 3 times, then the next frame 2 times, then the next frame 3 times, then the next frame 2 times, etc. This is how 24 fps film is presented on television at 60 Hz (actually, 59.94 Hz for NTSC color). That is, each of 12 pairs of 2 frames in one second of film is displayed 5 times, giving 60 images per second. The 3-2 pulldown pattern is shown in FIG. 1

By some estimates, more than half of all film on video has substantial portions where adjustments have been made at the 59.94 Hz video field rate to the 24 fps film. Such adjustments include "pan-and-scan", color correction, and title scrolling. Further, many films are time-adjusted by dropping frames or clipping the starts and ends of scenes to fit within a given broadcast scheduled. These operations can make the 3-2 pulldown process impossible to reverse, since there is both 59.94 Hz and 24 Hz motion. This can make the film very difficult to compress using the MPEG-2 standard. Fortunately, this problem is limited to existing NTSC-resolution material, since there is no significant library of higher resolution digital film using 3-2 pulldown.

Motion Blur. In order to further explore the issue of finding a common temporal rate higher than 24 Hz, it is useful to mention motion blur in the capture of moving images. Camera sensors and motion picture film are open to sensing a moving image for a portion of the duration of each frame. On motion picture cameras and many video cameras, the duration of this exposure is adjustable. Film cameras require a period of time to advance the film, and are usually limited to being open only about 210 out of 360 degrees, or a 58% duty cycle. On video cameras having CCD sensors, some portion of the frame time is often required to "read" the image from the sensor. This can vary from 10% to 50% of the frame time. In some sensors, an electronic shutter must be used to blank the light during this readout time. Thus, the "duty cycle" of CCD sensors usually varies from 50 to 90%, and is adjustable in some cameras. The light shutter can sometimes be adjusted to further reduce the duty cycle, if desired. However, for both film and video, the most common sensor duty cycle duration is 50%.

Preferred Rate. With this issue in mind, one can consider the use of only some of the frames from an image sequence captured at 60, 72, or 75 Hz. Utilizing one frame in two, three, four, etc., the subrates shown in TABLE 1 can be derived.

TABLE 1

| Rate  | 1/2 Rate | 1/3 Rate | 1/4 Rate | 1/5 Rate | 1/6 Rate |
|-------|----------|----------|----------|----------|----------|
| 75 Hz | 37.5     | 25       | 18.25    | 15       | 12.5     |
| 72 Hz | 36       | 24       | 18       | 14.4     | 12       |
| 60 Hz | 30       | 20       | 15       | 12       | 10       |

The rate of 15 Hz is a unifying rate between 60 and 75 Hz. The rate of 12 Hz is a unifying rate between 60 and 72 Hz. However, the desire for a rate above 24 Hz eliminates these rates. 24 Hz is not common, but the use of 3-2 pulldown has come to be accepted by the industry for presentation on 60 Hz displays. The only candidate rates are therefore 30, 36, and 37.5 Hz. Since 30 Hz has a 7.5 Hz beat with 75 Hz, and a 6 Hz beat with 72 Hz, it is not useful as a candidate.

The motion rates of 36 and 37.5 Hz become prime candidates for smoother motion than 24 Hz material when presented on 60 and 72/75 Hz displays. Both of these rates are about 50% faster and smoother than 24 Hz. The rate of 37.5 Hz is not suitable for use with either 60 or 72 Hz, so it must be eliminated, leaving only 36 Hz as having the desired temporal rate characteristics. (The motion rate of 37.5 Hz could be used if the 60 Hz display rate for television can be move 4% to 62.5 Hz. Given the interests behind 60 Hz, 62.5 Hz appears unlikely—there are even those who propose the very obsolete 59.94 Hz rate for new television systems. However, if such a change were to be made, the other aspects of the invention could be applied to the 37.5 Hz rate.)

The rates of 24, 36, 60, and 72 Hz are left as candidates for a temporal rate family. The rates of 72 and 60 Hz cannot be used for a distribution rate, since motion is less smooth when converting between these two rates than if 24 Hz is used as the distribution rate, as described above. By hypothesis, we are looking for a rate faster than 24 Hz. Therefore, 36 Hz is the prime candidate for a master, unifying motion capture and image distribution rate for use with 60 and 72/75 Hz displays.

As noted above, the 3-2 pulldown pattern for 24 Hz material repeats a first frame (or field) 3 times, then the next frame 2 times, then the next frame 3 times, then the next frame 2 times, etc. When using 36 Hz, each pattern optimally should be repeated in a 2-1-2 pattern. This can be seen in TABLE 2 and graphically in FIG. 1.

TABLE 2

| Rate  | Frame Numbers |   |   |   |   |   |   |   |   |    |
|-------|---|---|---|---|---|---|---|---|---|----|
| 60 Hz | 1 | 2 | 3 | 4 | 5 | 6 | 7 | 8 | 9 | 10 |
| 24 Hz | 1 | 1 | 1 | 2 | 2 | 3 | 3 | 3 | 4 | 4  |
| 36 Hz | 1 | 1 | 2 | 3 | 3 | 4 | 4 | 5 | 6 | 6  |

This relationship between 36 Hz and 60 Hz only holds for true 36 Hz material. 60 Hz material can be "stored" in 36 Hz, if it is interlaced, but 36 Hz cannot be reasonable created from 60 Hz without motion analysis and reconstruction. However, in looking for a new rate for motion capture, 36 Hz provides slightly smoother motion on 60 Hz than does 24 Hz, and provides substantially better image motion smoothness on a 72 Hz display. Therefore, 36 Hz is the optimum rate for a master, unifying motion capture and image distribution rate for use with 60 and 72 Hz displays, yielding smoother motion than 24 Hz material presented on such displays.

Although 36 Hz meets the goals set forth above, it is not the only suitable capture rate. Since 36 Hz cannot be simply extracted from 60 Hz, 60 Hz does not provide a suitable rate for capture. However, 72 Hz can be used for capture, with every other frame then used as the basis for 36 Hz distribution. The motion blur from using every other frame of 72 Hz material will be half of the motion blur at 36 Hz capture. Tests of motion blur appearance of every third frame from 72 Hz show that staccato strobing at 24 Hz is objectionable. However, utilizing every other frame from 72 Hz for 36 Hz display is not objectionable to the eye compared to 36 Hz native capture.

Thus, 36 Hz affords the opportunity to provide very smooth motion on 72 Hz displays by capturing at 72 Hz, while providing better motion on 60 Hz displays than 24 Hz material by using alternate frames of 72 Hz native capture material to achieve a 36 Hz distribution rate and then using 2-1-2 pulldown to derive a 60 Hz image.

In summary, TABLE 3 shows the preferred optimal temporal rates for capture and distribution in accordance with the invention.

Preferred Rates

TABLE 3

| Capture | Distribution | Optimal Display | Acceptable Display |
|---------|--------------|-----------------|--------------------|
| 72 Hz   | 36 Hz + 36 Hz | 72 Hz           | 60 Hz              |

It is also worth noting that this technique of utilizing alternate frames from a 72 Hz camera to achieve a 36 Hz distribution rate can profit from an increased motion blur duty cycle. The normal 50% duty cycle at 72 Hz, yielding a 25% duty cycle at 36 Hz, has been demonstrated to be acceptable, and represents a significant improvement over 24 Hz on 60 Hz and 72 Hz displays. However, if the duty cycle is increased to be in the 75–90% range, then the 36 Hz samples would begin to approach the more common 50% duty cycle. Increasing the duty rate may be accomplished, for example, by using "backing store" CCD designs which have a short blanking time, yielding a high duty cycle. Other methods may be used, including dual CCD multiplexed designs.

Modified MPEG-2 Compression

For efficient storage and distribution, digital source material having the preferred temporal rate of 36 Hz should be compressed. The preferred form of compression for the invention is accomplished by using a novel variation of the MPEG-2 standard, but may be used with any other compression system with similar characteristics (e.g, MPEG-4).

MPEG-2 Basics. MPEG-2 is an international video compression standard defining a video syntax that provides an efficient way to represent image sequences in the form of more compact coded data. The language of the coded bits is the "syntax." For example, a few tokens can represent an entire block of 64 samples. MPEG also describes a decoding (reconstruction) process where the coded bits are mapped from the compact representation into the original, "raw" format of the image sequence. For example, a flag in the coded bitstream signals whether the following bits are to be decoded with a discrete cosine transform (DCT) algorithm or with a prediction algorithm. The algorithms comprising the decoding process are regulated by the semantics defined by MPEG. This syntax can be applied to exploit common video characteristics such as spatial redundancy, temporal redundancy, uniform motion, spatial masking, etc. In effect, MPEG-2 defines a programming language as well as a data format. An MPEG-2 decoder must be able to parse and decode an incoming data stream, but so long as the data stream complies with the MPEG-2 syntax, a wide variety of possible data structures and compression techniques can be used. The invention takes advantage of this flexibility by devising a novel means and method for temporal and resolution scaling using the MPEG-2 standard.

MPEG-2 uses an intraframe and an interframe method of compression. In most video scenes, the background* remains relatively stable while action takes place in the foreground. The background may move, but a great deal of the scene is redundant. MPEG-2 starts its compression by creating a reference frame called an I (for Intra) frame. I frames are compressed without reference to other frames and thus contain an entire frame of video information. I frames provide entry points into a data bitstream for random access, but can only be moderately compressed. Typically, the data representing I frames is placed in the bitstream every 10 to 15 frames. Thereafter, since only a small portion of the frames that fall between the reference I frames are different from the bracketing I frames, only the differences are captured, compressed and stored. Two type of frames are used for such differences—P (for Predicted) frames and B (for Bi-directional Interpolated) frames.

P frames generally are encoded with reference to a past frame (either an I frame or a previous P frame), and, in general, will be used as a reference for future P frames. P frames receive a fairly high amount of compression. B frames pictures provide the highest amount of compression but generally require both a past and a future reference in order to be encoded. Bi-directional frames are never used for reference frames.

Macroblocks within P frames may also be individually encoded using intra-frame coding. Macroblocks within B frames may also be individually encoded using intra-frame coding, forward predicted coding, backward predicted coding, or both forward and backward, or bi-directionally interpolated, predicted coding. A macroblock is a 16×16 pixel grouping of four 8×8 DCT blocks, together with one motion vector for P frames, and one or two motion vectors for B frames.

After coding, an MPEG data bitstream comprises a sequence of I, P, and B frames. A sequence may consist of almost any pattern of I, P, and B frames (there are a few minor semantic restrictions on their placement). However, it is common in industrial practice to have a fixed pattern (e.g., IBBPBBPBBPBBPBB).

As an important part of the invention, an MPEG-2 data stream is created comprising a base layer, at least one optional temporal enhancement layer, and an optional resolution enhancement layer. Each of these layers will be described in detail.

Temporal Scalability

Base Layer. The base layer is used to carry 36 Hz source material. In the preferred embodiment, one of two MPEG-2 frame sequences can be used for the base layer: IBPBPBP or IPPPPPP. The latter pattern is most preferred, since the decoder would only need to decode P frames, reducing the required memory bandwidth if 24 Hz movies were also decoded without B frames.

72 Hz Temporal Enhancement Layer. When using MPEG-2 compression, it is possible to embed a 36 Hz temporal enhancement layer as B frames within the MPEG-2 sequence for the 36 Hz base layer if the P frame distance is even. This allows the single data stream to support both 36 Hz display and 72 Hz display. For example, both layers could be decoded to generate a 72 Hz signal for computer monitors, while only the base layer might be decoded and converted to generate a 60 Hz signal for television.

Figure 2:
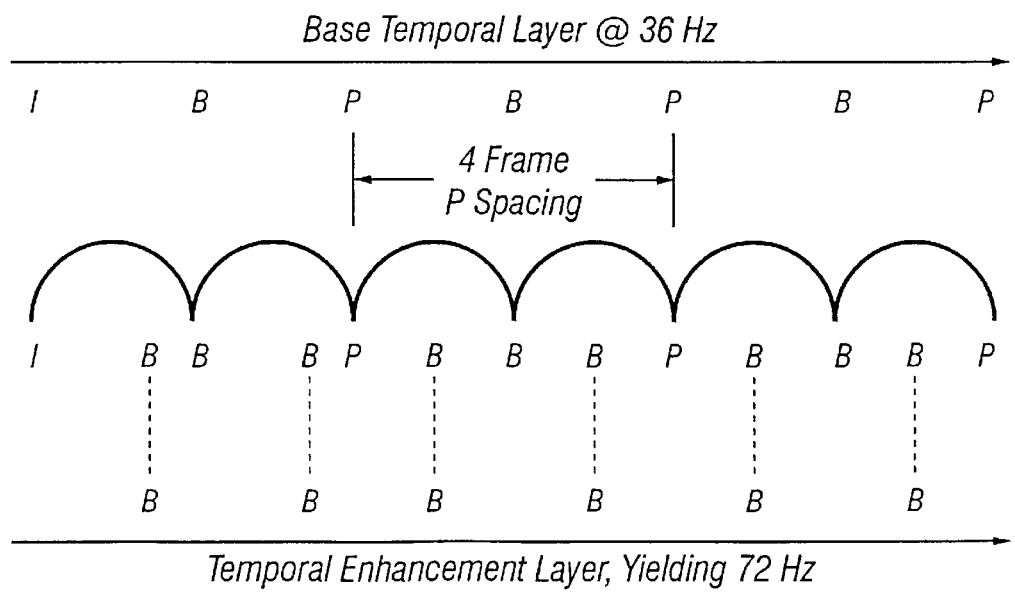
FIG. 2 is a first preferred MPEG-2 coding pattern.
Figure 3:
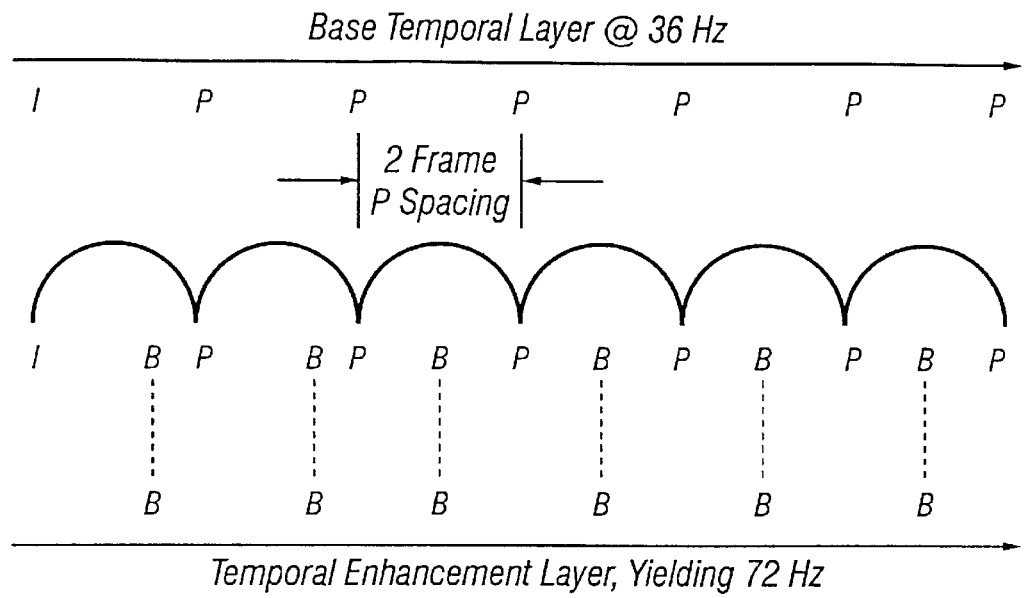
FIG. 3 is a second preferred MPEG-2 coding pattern.

In the preferred embodiment, the MPEG-2 coding patterns of IPBBBPBBBPBBBP or IPBPBPBPB both allow placing alternate frames in a separate stream containing only temporal enhancement B frames to take 36 Hz to 72 Hz. These coding patterns are shown in FIGS. 2 and 3, respectively. The 2-Frame P spacing coding pattern of FIG. 3 has the added advantage that the 36 Hz decoder would only need to decode P frames, reducing the required memory bandwidth if 24 Hz movies were also decoded without B frames.

Figure 4:
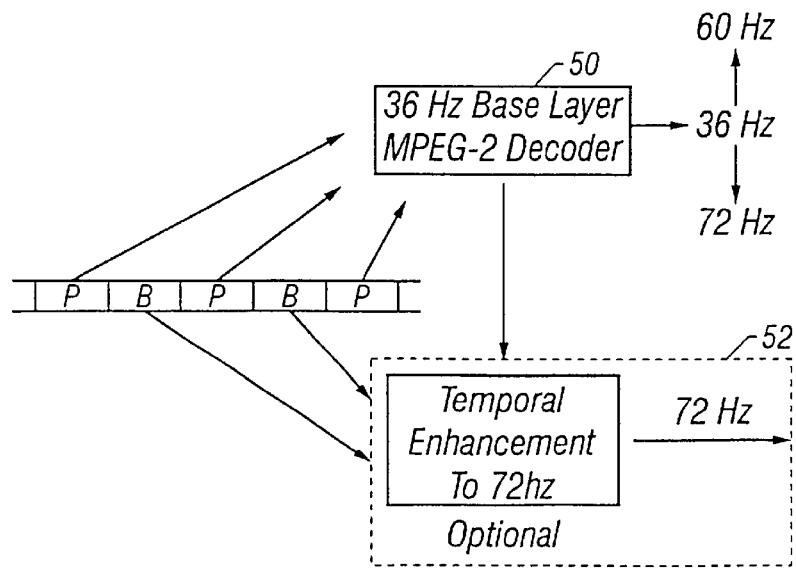
FIG. 4 is a block diagram showing temporal layer decoding in accordance with the preferred embodiment of the invention.

Experiments with high resolution images have suggested that the 2-Frame P spacing of FIG. 3 is optimal for most types of images. That is, the construction in FIG. 3 appears to offer the optimal temporal structure for supporting both 60 and 72 Hz, while providing excellent results on modern 72 Hz computer-compatible displays. This construction allows two digital streams, one at 36 Hz for the base layer, and one at 36 Hz for the enhancement layer B frames to achieve 72 Hz. This is illustrated in FIG. 4, which is a block diagram showing that a 36 Hz base layer MPEG-2 decoder 50 simply decodes the P frames to generate 36 Hz output, which may then be readily converted to either 60 Hz or 72 Hz display. An optional second decoder 52 simply decodes the B frames to generate a second 36 Hz output, which when combined with the 36 Hz output of the base layer decoder 50 results in a 72 Hz output (a method for combining is discussed below). In an alternative embodiment, one fast MPEG-2 decoder 50 could decode both the P frames for the base layer and the B frames for the enhancement layer.

Optimal Master Format. A number of companies are building MPEG-2 decoding chips which operate at around 11 MPixels/second. The MPEG-2 standard has defined some "profiles" for resolutions and frame rates. Although these profiles are strongly biased toward computer-incompatible format parameters such as 60 Hz, non-square pixels, and interlace, many chip manufacturers appear to be developing decoder chips which operate at the "main profile, main level". This profile is defined to be any horizontal resolution up to 720 pixels, any vertical resolution up to 576 lines at up to 25 Hz, and any frame rate of up to 480 lines at up to 30 Hz. A wide range of data rates from approximately 1.5 Mbits/second to about 10 Mbits/second is also specified. However, from a chip point of view, the main issue is the rate at which pixels are decoded. The main-level, main-profile pixel rate is about 10.5 MPixels/second.

Although there is variation among chip manufacturers, most MPEG-2 decoder chips will in fact operate at up to 13 MPixels/second, given fast support memory. Some decoder chips will go as fast as 20 MPixels/second or more. Given that CPU chips tend to gain 50% improvement or more each year at a given cost, one can expect some near-term flexibility in the pixel rate of MPEG-2 decoder chips.

TABLE 4 illustrates some desirable resolutions and frame rates, and their corresponding pixel rates.

TABLE 4

| Resolution | | Frame Rate | Pixel Rate |
|---|---|---|---|
| X | Y | (Hz) | (MPixels/s) |
| 640 | 480 | 36 | 11.1 |
| 720 | 486 | 36 | 12.6 |
| 720 | 486 | 30 (for comparison) | 10.5 |
| 704 | 480 | 36 | 12.2 |
| 704 | 480 | 30 (for comparison) | 10.1 |
| 680 | 512 | 36 | 12.5 |
| 1024 | 512 | 24 | 12.6 |

All of these formats can be utilized with MPEG-2 decoder chips that can generate at least 12.6 MPixels/second. The very desirable 640×480 at 36 Hz format can be achieved by nearly all current chips, since its rate is 11.1 MPixels/second. A widescreen 1024×512 image can be squeezed into 680× 512 using a 1.5:1 squeeze, and can be supported at 36 Hz if 12.5 MPixels/second can be handled. The highly desirable square pixel widescreen template of 1024×512 can achieve 36 Hz when MPEG-2 decoder chips can process about 18.9 MPixels/second. This becomes more feasible if 24 Hz and 36 Hz material is coded only with P frames, such that B frames are only required in the 72 Hz temporal enhancement layer decoders. Decoders which use only P frames require less memory and memory bandwidth, making the goal of 19 MPixels/second more accessible.

The 1024×512 resolution template would most often be used with 2.35:1 and 1.85:1 aspect ratio films at 24 fps. This material only requires 11.8 MPixels/second, which should fit within the limits of most existing main level-main profile decoders.

Figure 6:
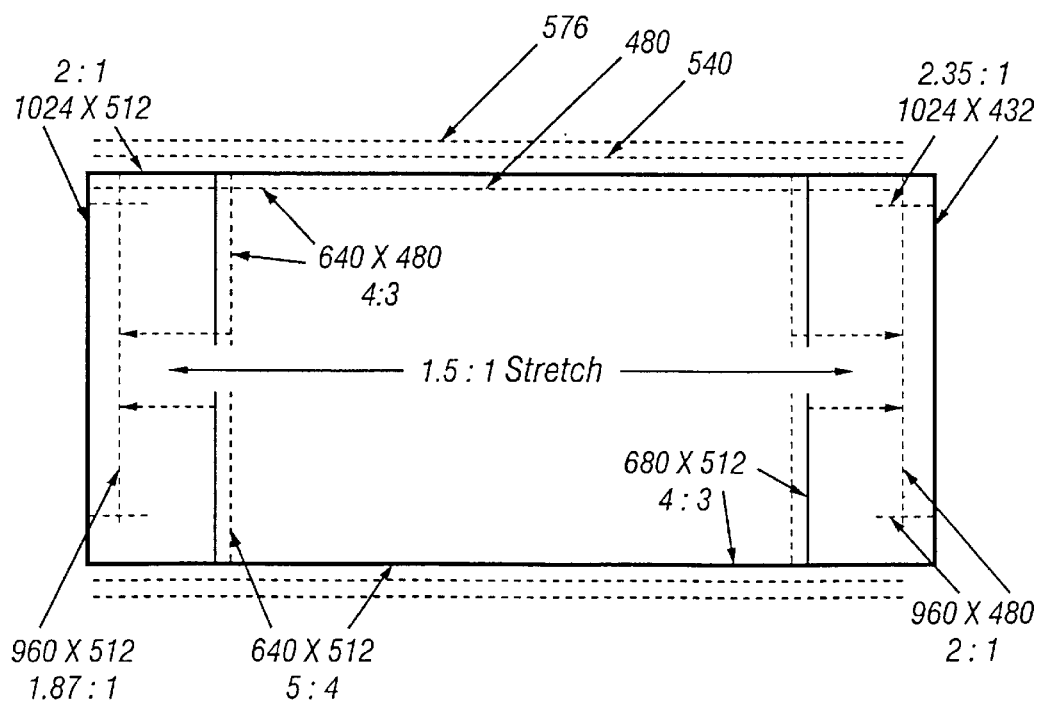
FIG. 6 is a diagram showing a "master template" for a base MPEG-2 layer at 24 or 36 Hz.

All of these formats are shown in FIG. 6 in a "master template", for a base layer at 24 or 36 Hz. Accordingly, the invention provides a unique way of accommodating a wide variety of aspect ratios and temporal resolution compared to the prior art. (Further discussion of a master template is set forth below).

The temporal enhancement layer of B frames to generate 72 Hz can be decoded using a chip with double the pixel rates specified above, or by using a second chip in parallel with additional access to the decoder memory. Under the invention, at least two ways exist for merging of the enhancement and base layer data streams to insert the alternate B frames. First, merging can be done invisibly to the decoder chip using the MPEG-2 transport layer. The MPEG-2 transport packets for two PIDs (Program IDs) can be recognized as containing the base layer and enhancement layer, and their stream contents can both be simply passed on to a double-rate capable decoder chip, or to an appropriately configured pair of normal rate decoders. Second, it is also possible to use the "data partitioning" feature in the MPEG-2 data stream instead of the transport layer from MPEG-2 systems. The data partitioning feature allows the B frames to be marked as belonging to a different class within the MPEG-2 compressed data stream, and can therefore be flagged to be ignored by 36-Hz decoders which only support the temporal base layer rate.

Temporal scalability, as defined by MPEG-2 video compression, is not as optimal as the simple B frame partitioning of the invention. The MPEG-2 temporal scalability is only forward referenced from a previous P or B frame, and thus lacks the efficiency available in the B frame encoding proposed here, which is both forward and backward referenced. Accordingly, the simple use of B frames as a temporal enhancement layer provides a simpler and more efficient temporal scalability than does the temporal scalability defined within MPEG-2. Notwithstanding, this use of B frames as the mechanism for temporal scalability is fully compliant with MPEG-2. The two methods of identifying these B frames as an enhancement layer, via data partitioning or alternate PID's for the B frames, are also fully compliant.

50/60 Hz Temporal enhancement layer. In addition to, or as an alternative to, the 72 Hz temporal enhancement layer described above (which encodes a 36 Hz signal), a 60 Hz temporal enhancement layer (which encodes a 24 Hz signal) can be added in similar fashion to the 36 Hz base layer. A 60 Hz temporal enhancement layer is particular useful for encoding existing 60 Hz interlaced video material.

Most existing 60 Hz interlaced material is video tape for NTSC in analog, D1, or D2 format. There is also a small amount of Japanese HDTV (SMPTE 240/260M). There are also cameras which operate in this format. Any such 60 Hz interlaced format can be, processed in known fashion such that the signal is de-interlaced and frame rate converted. This process involves very complex image understanding technology, similar to robot vision. Even with very sophisticated technology, temporal aliasing generally will result in "misunderstandings" by the algorithm and occasionally yield artifacts. Note that the typical 50% duty cycle of image capture means that the camera is "not looking" half the time. The "backwards wagon wheels" in movies is an example of temporal aliasing due to this normal practice of temporal undersampling. Such artifacts generally cannot be removed without human-assisted reconstruction. Thus, there will always be cases which cannot be automatically corrected. However, the motion conversion results available in current technology should be reasonable on most material.

Figure 5:
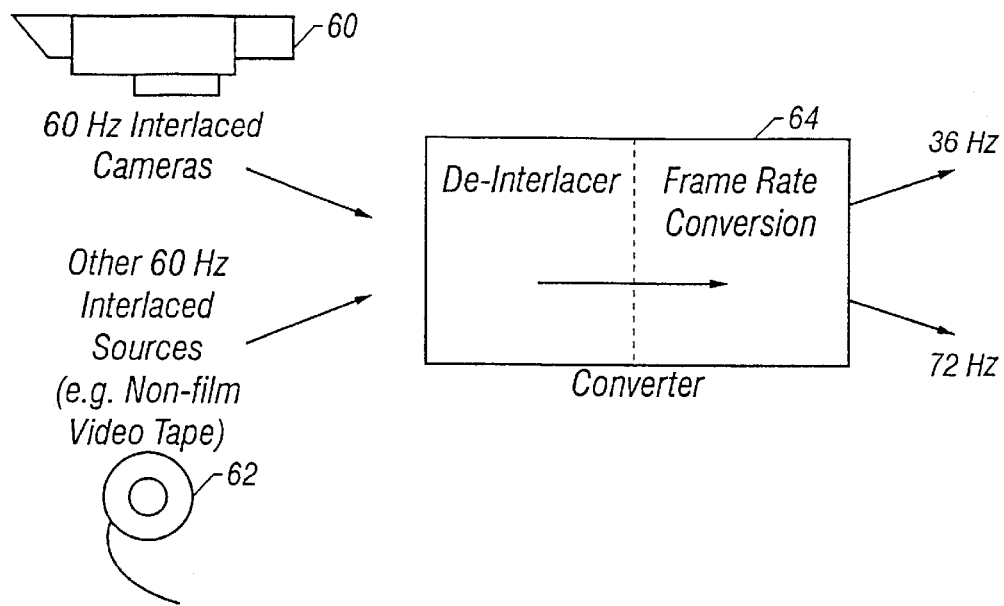
FIG. 5 is a block diagram showing 60 Hz interlaced input to a converter that can output both 36 Hz and 72 Hz frames.

The price of a single high definition camera or tape machine would be similar to the cost of such a converter. Thus, in a studio having several cameras and tape machines, the cost of such conversion becomes modest. However, performing such processing adequately is presently beyond the budget of home and office products. Thus, the complex processing to remove interlace and convert the frame rate for existing material is preferably accomplished at the origination studio. This is shown in FIG. 5, which is a block diagram showing 60 Hz interlaced input from cameras 60 or other sources (such as non-film video tape) 62 to a converter 64 that includes a de-interlacer function and a frame rate conversion function that can output a 36 Hz signal (36 Hz base layer only) and a 72 Hz signal (36 Hz base layer plus 36 Hz from the temporal enhancement layer).

As an alternative to outputting a 72 Hz signal (36 Hz base layer plus 36 Hz from the temporal enhancement layer), this conversion process can be adapted to produce a second MPEG-2 24 Hz temporal enhancement layer on the 36 Hz base layer which would reproduce the original 60 Hz signal, although de-interlaced. If similar quantization is used for the 60 Hz temporal enhancement layer B frames, the data rate should be slightly less than the 72 Hz temporal enhancement layer, since there are fewer B frames.

>60 I→36+36=72

>60 I→36+24=60

>72→36, 72, 60

>50 I→36, 50, 72

>60→24, 36, 72

The vast majority of material of interest to the United States is low resolution NTSC. At present, most NTSC signals are viewed with substantial impairment on most home televisions. Further, viewers have come to accept the temporal impairments inherent in the use of 3-2 pulldown to present film on television. Nearly all prime-time television is made on film at 24 frames per second. Thus, only sports, news, and other video-original shows need be processed in this fashion. The artifacts and losses associated with converting these shows to a 36/72 Hz format are likely to be offset by the improvements associated with high-quality de-interlacing of the signal.

Note that the motion blur inherent in the 60 Hz (or 59.94 Hz) fields should be very similar to the motion blur in 72 Hz frames. Thus, this technique of providing a base and enhancement layer should appear similar to 72 Hz origination in terms of motion blur. Accordingly, few viewers will notice the difference, except possibly as a slight improvement, when interlaced 60 Hz NTSC material is processed into a 36 Hz base layer, plus 24 Hz from the temporal enhancement layer, and displayed at 60 Hz. However, those who buy new 72 Hz digital non-interlaced televisions will notice a small improvement when viewing NTSC, and a major improvement when viewing new material captured or originated at 72 Hz. Even the decoded 36 Hz base layer presented on 72 Hz displays will look as good as high quality digital NTSC, replacing interlace artifacts with a slower frame rate.

The same process can also be applied to the conversion of existing PAL 50 Hz material to a second MPEG-2 enhancement layer. PAL video tapes are best slowed to 48 Hz prior to such conversion. Live PAL requires conversion using the relatively unrelated rates of 50, 36, and 72 Hz. Such converter units presently are only affordable at the source of broadcast signals, and are not presently practical at each receiving device in the home and office.

Resolution Scalability

Figure 7:
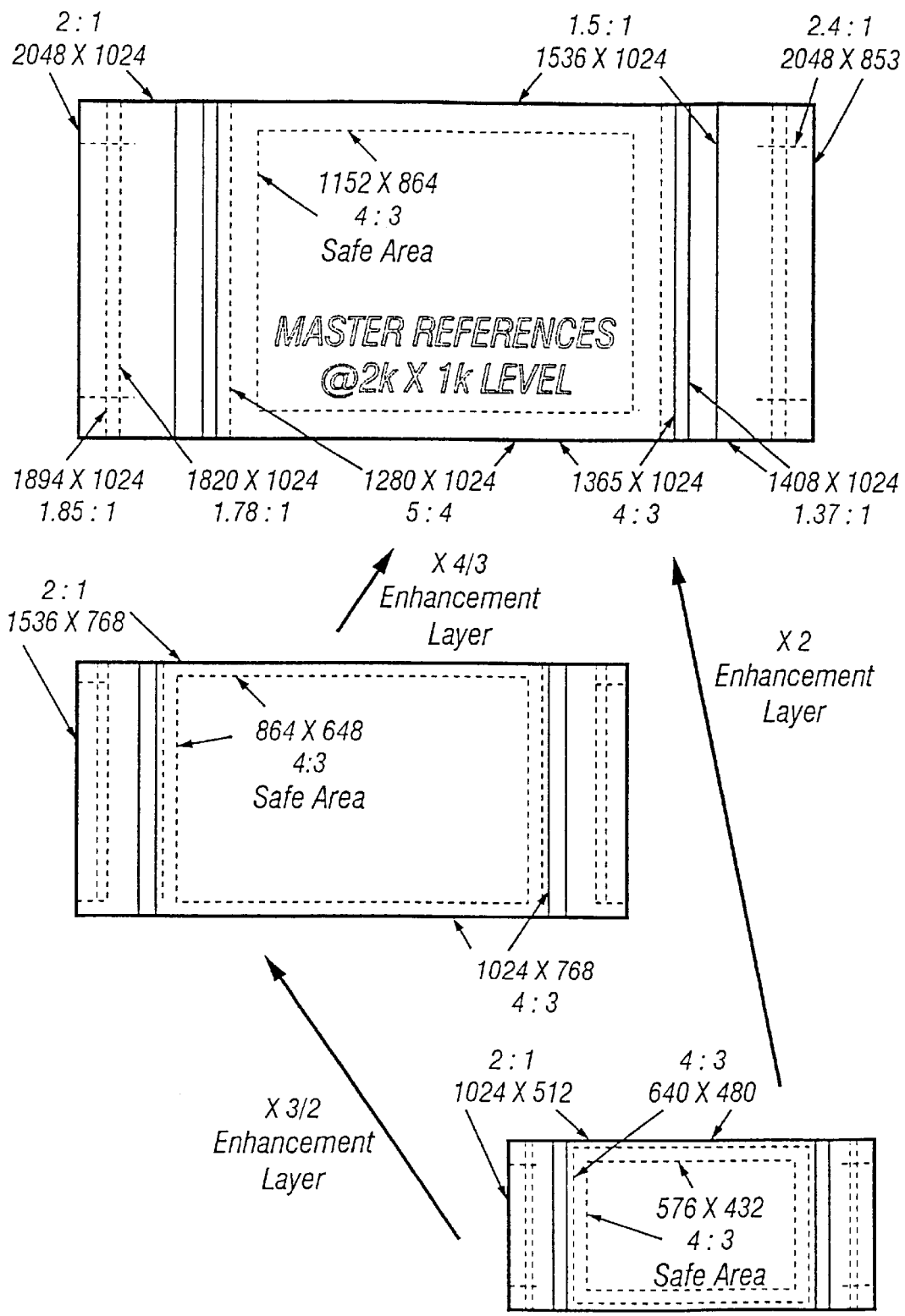
FIG. 7 is a diagram showing enhancement of a base resolution template using hierarchical resolution scalability utilizing MPEG-2.

It is possible to enhance the base resolution template using hierarchical resolution scalability utilizing MPEG-2 to achieve higher resolutions built upon a base layer. Use of enhancement can achieve resolutions at 1.5× and 2× the base layer. Double resolution can be built in two steps, by using ³⁄₂ then ⁴⁄₃, or it can be a single factor-of-two step. This is shown in FIG. 7.

Figure 8:
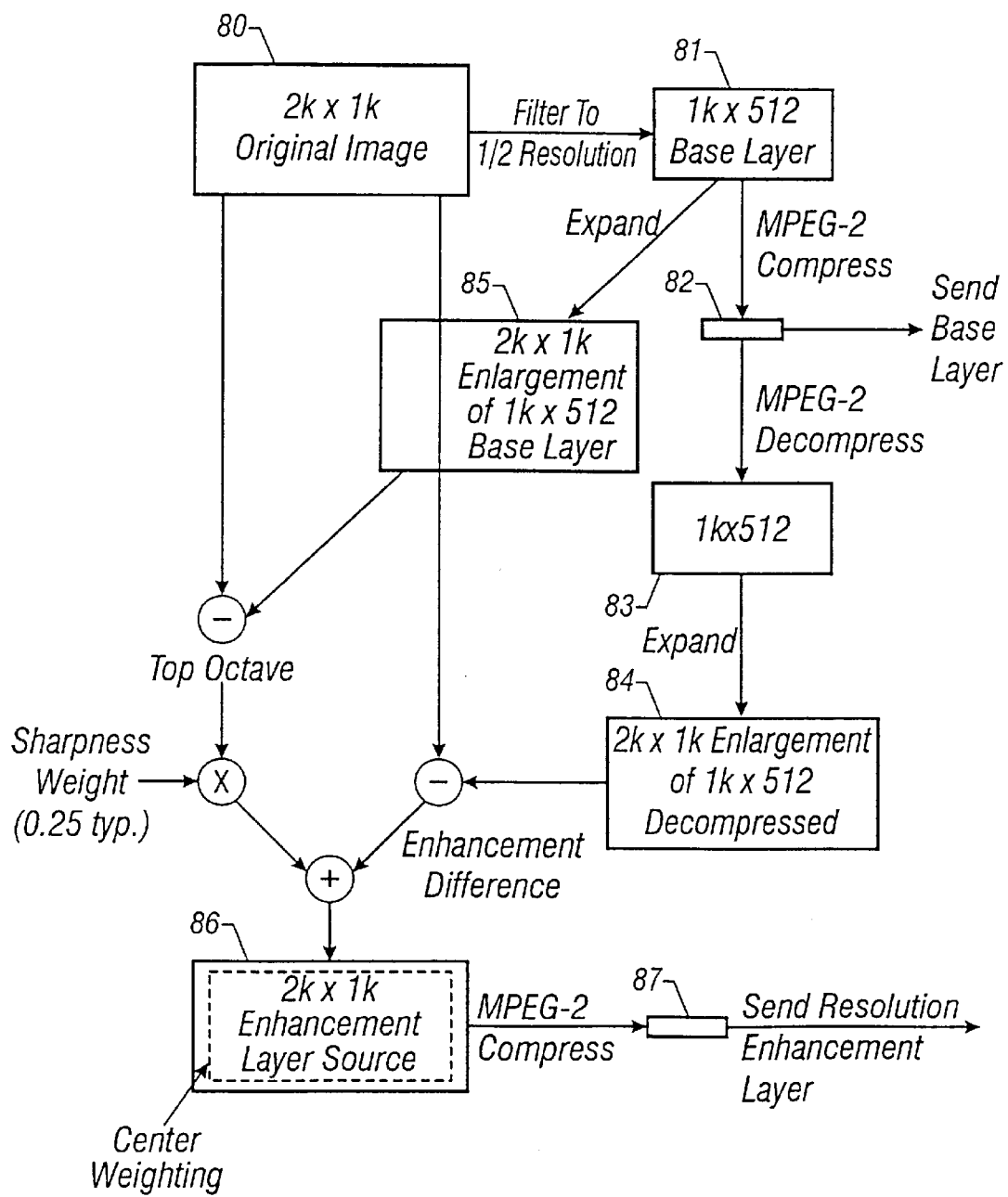
FIG. 8 is a diagram showing the preferred layered resolution encoding process.
Figure 9:
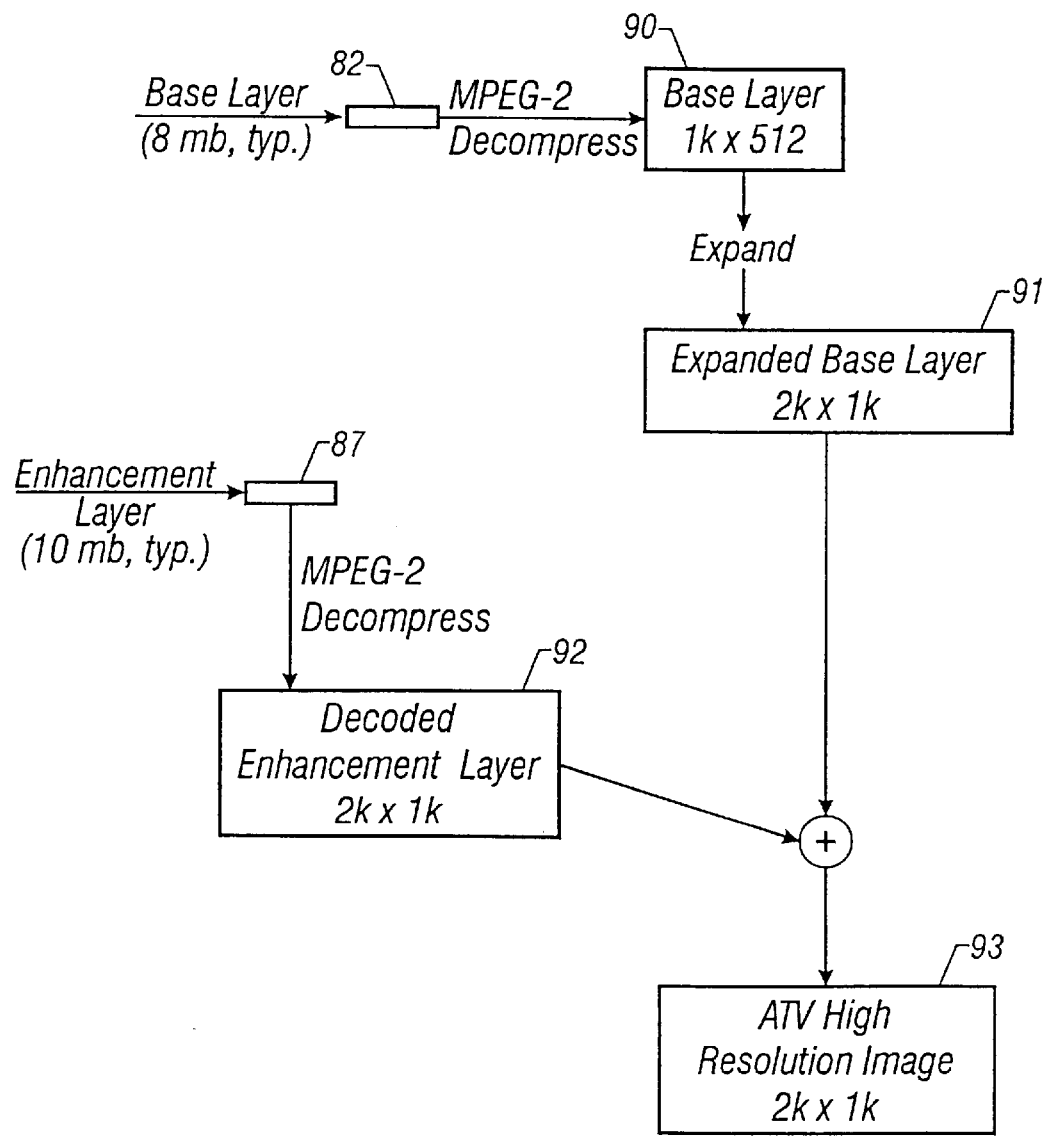
FIG. 9 is a diagram showing the preferred layered resolution decoding process.

The process of resolution enhancement can be achieved by generating a resolution enhancement layer as an independent MPEG-2 stream and applying MPEG-2 compression to the enhancement layer. This technique differs from the "spatial scalability" defined with MPEG-2, which has proven to be highly inefficient. However, MPEG-2 contains all of the tools to construct an effective layered resolution to provide spatial scalability. The preferred layered resolution encoding process of the invention is shown in FIG. 8. The preferred decoding process of the invention is shown in FIG. 9.

Resolution Layer Coding. In FIG. 8, an original 2 k×1 k image 80 is down-filtered, preferably using an optimized filter having negative lobes (see discussion of FIG. 12 below), to ½ resolution in each dimension to create a 1024×512 base layer 81. The base layer 81 is then compressed according to conventional MPEG-2 algorithms, generating an MPEG-2 base layer 82 suitable for transmission. Importantly, full MPEG-2 motion compensation can be used during this compression step. That same signal is then decompressed using conventional MPEG-2 algorithms back to a 1024×512 image 83. The 1024×512 image 83 is expanded (for example, by pixel replication, or preferably by better up-filters such as spline interpolation or filters having negative-lobes; see discussion of FIGS. 13A and 13B below) to a first 2 k×1 k enlargement 84.

Meanwhile, as an optional step, the filtered 1024×512 base layer 81 is expanded to a second 2 k×1 k enlargement

85. This second 2 k×1 k enlargement 85 is subtracted from the original 2 k×1 k image 80 to generate an image that represents the top octave of resolution between the original high resolution image 80 and the original base layer image 81. The resulting image is optionally multiplied by a sharpness factor or weight, and then added to the difference between the original 2 k×1 k image 80 and the second 2 k×1 k enlargement 85 to generate a center-weighted 2 k×1 k enhancement layer source image 86. This enhancement layer source image 86 is then compressed according to conventional MPEG-2 algorithms, generating a separate MPEG-2 resolution enhancement layer 87 suitable for transmission. Importantly, full MPEG-2 motion compensation can be used during this compression step.

Resolution Layer Decoding. In FIG. 9, the base layer 82 is decompressed using conventional MPEG-2 algorithms back to a 1024×512 image 90. The 1024×512 image 90 is expanded to a first 2 k×1 k image 91. Meanwhile, the resolution enhancement layer 87 is decompressed using conventional MPEG-2 algorithms back to a second 2 k×1 k image 92. The first 2 k×1 k image 91 and the second 2 k×1 k image 92 are then added to generate a high-resolution. 2 k×1 k image 93.

Improvements Over MPEG-2. In essence, the enhancement layer is created by expanding the decoded base layer, taking the difference between the original image and the decode base layer, and compressing. However, a compressed resolution enhancement layer may be optionally added to the base layer after decoding to create a higher resolution image in the decoder. The inventive layered resolution encoding process differs from MPEG-2 spatial scalability in several ways:

- The enhancement layer difference picture is compressed as its own MPEG-2 data stream, with I, B, and P frames. This difference represents the major reason that resolution scalability, as proposed here, is effective, where MPEG-2 spatial scalability is ineffective. The spatial scalability defined within MPEG-2 allows an upper layer to be coded as the difference between the upper layer picture and the expanded base layer, or as a motion compensated MPEG-2 data stream of the actual picture, or a combination of both. However, neither of these encodings is efficient. The difference from the base layer could be considered as an I frame of the difference, which is inefficient compared to a motion-compensated difference picture, as in the invention. The upper-layer encoding defined within MPEG-2 is also inefficient, since it is identical to a complete encoding of the upper layer. The motion compensated encoding of the difference picture, as in the invention, is therefore substantially more efficient.
- Since the enhancement layer is an independent MPEG-2 data stream, the MPEG-2 systems transport layer (or another similar mechanism) must be used to multiplex the base layer and enhancement layer.
- The expansion and resolution reduction (down) filtering can be a gaussian or spline function, or a filter with negative lobes (see FIG. 12), which are more optimal than the bilinear interpolation specified in MPEG-2 spatial scalability.
- The image aspect ratio must match between the lower and higher layers in the preferred embodiment. In MPEG-2 spatial scalability, extensions to width and/or height are allowed. Such extensions are not allowed in the preferred embodiment due to efficiency requirements.
- Due to efficiency requirements, and the extreme amounts of compression used in the enhancement layer, the entire area of the enhancement layer is not coded. Usually, the area excluded from enhancement will be the border area. Thus, the 2 k×1 k enhancement layer source image 86 in the preferred embodiment is center-weighted. In the preferred embodiment, a fading function (such as linear weighting) is used to "feather" the enhancement layer toward the center of the image and away from the border edge to avoid abrupt transitions in the image. Moreover, any manual or automatic method of determining regions having detail which the eye will follow can be utilized to select regions which need detail, and to exclude regions where extra detail is not required. All of the image has detail to the level of the base layer, so all of the image is present. Only the areas of special interest benefit from the enhancement layer. In the absence of other criteria, the edges or borders of the frame can be excluded from enhancement, as in the center-weighted embodiment described above. The MPEG-2 parameters "lower_layer_prediction_horizontal&vertical offset" parameters used as signed negative integers, combined with the "horizontal&vertical_subsampling_factor_m&n" values, can be used to specify the enhancement layer rectangle's overall size and placement within the expanded base layer.
- A sharpness factor is added to the enhancement layer to offset the loss of sharpness which occurs during quantization. Care must be taken to utilize this parameter only to restore the clarity and sharpness of the original picture, and not to enhance the image. As noted above with respect to FIG. 8, the sharpness factor is the "high octave" of resolution between the original high resolution image 80 and the original base layer image 81 (after expansion). This high octave image will be quite noisy, in addition to containing the sharpness and detail of the high octave of resolution. Adding too much of this image can yield instability in the motion compensated encoding of the enhancement layer. The amount that should be added depends upon the level of the noise in the original image. A typical weighting value is 0.25. For noisy images, no sharpness should be added, and it even may be advisable to suppress the noise in the original for the enhancement layer before compressing using conventional noise suppression techniques which preserve detail.
- Temporal and resolution scalability are intermixed by utilizing B frames for temporal enhancement from 36 to 72 Hz in both the base and resolution enhancement layers. In this way, four possible levels of decoding performance are possible with two layers of resolution scalability, due to the options available with two levels of temporal scalability.

These differences represent substantial improvements over MPEG-2 spatial and temporal scalability. However, these differences are still consistent with MPEG-2 decoder chips, although additional logic may be required in the decoder to perform the expansion and addition in the resolution enhancement decoding process shown in FIG. 9. Such additional logic is nearly identical to that required by the less effective MPEG-2 spatial scalability.

Optional Non-MPEG-2 Coding of the Resolution Enhancement Layer. It is possible to utilize a different compression technique for the resolution enhancement layer than MPEG-2. Further, it is not necessary to utilize the same compression technology for the resolution enhancement layer as for the base layer. For example, motion-compensated block wavelets can be utilized to match and track details with great efficiency when the difference layer is coded. Even if the most efficient position for placement of wavelets jumps around on the screen due to changing amounts of differences, it would not be noticed in the low-amplitude enhancement layer. Further, it is not necessary to cover the entire image—it is only necessary to place the wavelets on details. The wavelets can have their placement guided by detail regions in the image. The placement can also be biased away from the edge.

Multiple Resolution Enhancement Layers. At the bit rates being described here, where 2 MPixels (2048×1024) at 72 frames per second are being coded in 18.5 mbits/second, only a base layer (1024×512 at 72fps) and a single resolution enhancement layer have been successfully demonstrated. However, the anticipated improved efficiencies available from further refinement of resolution enhancement layer coding should allow for multiple resolution enhancement layers. For example, it is conceivable that a base layer at 512×256 could be resolution-enhanced by four layers to 1024×512, 1536×768, and 2048×1024. This is possible with existing MPEG-2 coding at the movie frame rate of 24 frames per second. At high frame rates such as 72 frames per second, MPEG-2 does not provide sufficient efficiency in the coding of resolution-enhancement layers to allow this many layers at present.

Mastering Formats

Utilizing a template at, or near 2048×1024 pixels, it is possible to create a single digital moving image master format source for a variety of release formats. As shown in FIG. 6, a 2 k×1 k template can efficiently support the common widescreen aspect ratios of 1.85:1 and 2.35:1. A 2 k×1 k template can also accommodate 1.33:1 and other aspect ratios.

Although integers (especially the factor of 2) and simple fractions (⅔ & ⅓) are most efficient step sizes in resolution layering, it is also possible to use arbitrary ratios to achieve any required resolution layering. However, using a 2048×1024 template, or something near it, provides not only a high quality digital master format, but also can provide many other convenient resolutions from a factor of two base layer (1 k×512), including NTSC, the U.S. television standard.

It is also possible to scan film at higher resolutions such as 4 k×2 k, 4 k×3 k, or 4 k×4 k. Using optional resolution enhancement, these higher resolutions can be created from a central master format resolution near 2 k×1 k. Such enhancement layers for film will consist of both image detail, grain, and other sources of noise (such as scanner noise). Because of this noisiness, the use of compression technology in the enhancement layer for these very high resolutions will require alternatives to MPEG-2 types of compression. Fortunately, other compression technologies exist which can be utilized for compressing such noisy signals, while still maintaining the desired detail in the image. One example of such a compression technology is motion compensated wavelets or motion compensated fractals.

Preferably, digital mastering formats should be created in the frame rate of the film if from existing movies (i.e., at 24 frames per second). The common use of both 3-2 pulldown and interlace would be inappropriate for digital film masters. For new digital electronic material, it is hoped that the use of 60 Hz interlace will cease in the near future, and be replaced by frame rates which are more compatible with computers, such as 72 Hz, as proposed here. The digital image masters should be made at whatever frame rate the images are captured, whether at 72 Hz, 60 Hz, 36 Hz, 37.5 Hz, 75 Hz, 50 Hz, or other rates.

The concept of a mastering format as a single digital source picture format for all electronic release formats differs from existing practices, where PAL, NTSC, letterbox, pan-and-scan, HDTV, and other masters are all generally independently made from a film original. The use of a mastering format allows both film and digital/electronic shows to be mastered once, for release on a variety of resolutions and formats.

Combined Resolution and Temporal Enhancement Layers

As noted above, both temporal and resolution enhancement layering can be combined. Temporal enhancement is provided by decoding B frames. The resolution enhancement layer also has two temporal layers, and thus also contains B frames.

For 24 fps film, the most efficient and lowest cost decoders might use only P frames, thereby minimizing both memory and memory bandwidth, as well as simplifying the decoder by eliminating B frame decoding. Thus, in accordance with the invention, decoding movies at 24 fps and decoding advanced television at 36 fps could utilize a decoder without B frame capability. B frames can then be utilized between P frames to yield the higher temporal layer at 72 Hz, as shown in FIG. 3, which could be decoded by a second decoder. This second decoder could also be simplified, since it would only have to decode B frames.

Such layering also applies to the enhanced resolution layer, which can similarly utilize only P and I frames for 24 and 36 fps rates. The resolution enhancement layer can add the full temporal rate of 72 Hz at high resolution by adding B frame decoding within the resolution enhancement layer.

Figure 10:
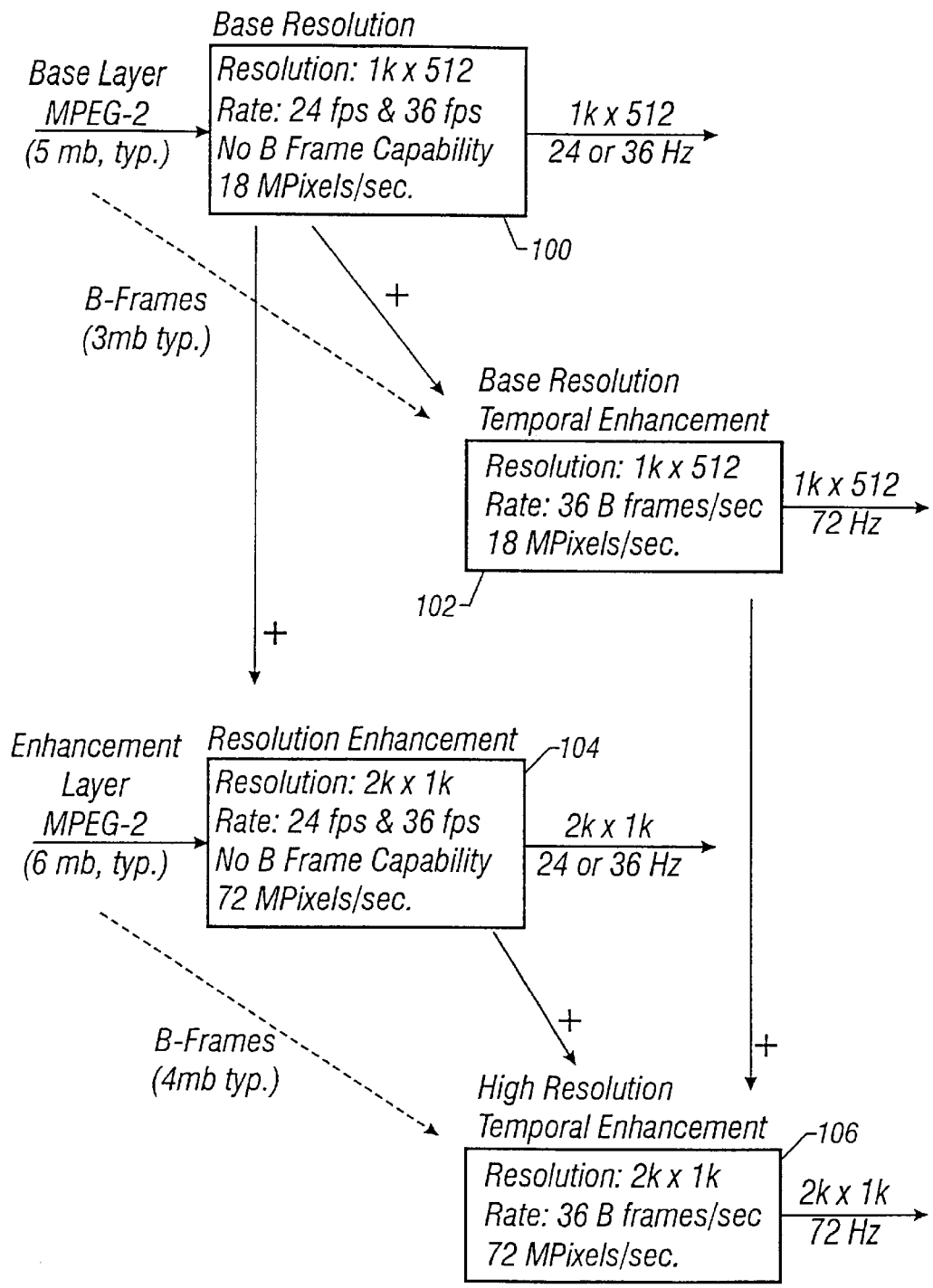
FIG. 10 is a block diagram showing a combination of resolution and temporal scalable options for a decoder in accordance with the invention.

The combined resolution and temporal scalable options for a decoder are illustrated in FIG. 10. This example also shows an allocation of the proportions of an approximately 18 mbits/second data stream to achieve the spatio-temporal layered Advanced Television of the invention.

In FIG. 10, a base layer MPEG-2 1024×512 pixel data stream (comprising only P frames in the preferred embodiment) is applied to a base resolution decoder 100. Approximately 5 mbits/per sec of bandwidth is required for the P frames. The base resolution decoder 100 can decode at 24 or 36 fps. The output of the base resolution decoder 100 comprises low resolution, low frame rate images (1024×512 pixels at 24 or 36 Hz).

The B frames from the same data stream are parsed out and applied to a base resolution temporal enhancement layer decoder 102. Approximately 3 mbits/per sec of bandwidth is required for such B frames. The output of the base resolution decoder 100 is also coupled to the temporal enhancement layer decoder 102. The temporal enhancement layer decoder 102 can decode at 36 fps. The combined output of the temporal enhancement layer decoder 102 comprises low resolution, high frame rate images (1024×512 pixels at 72 Hz).

Also in FIG. 10, a resolution enhancement layer MPEG-2 2 k×1 k pixel data stream (comprising only P frames in the preferred embodiment) is applied to a base temporal high resolution enhancement layer decoder 104. Approximately 6 mbits/per sec of bandwidth is required for the P frames. The output of the base resolution decoder 100 is also coupled to the high resolution enhancement layer decoder 104. The high resolution enhancement layer decoder 104 can decode at 24 or 36 fps. The output of the high resolution enhancement layer decoder 104 comprises high resolution, low frame rate images (2 k×1 k pixels at 24 or 36 Hz).

The B frames from the same data stream are parsed out and applied to a high resolution temporal enhancement layer decoder 106. Approximately 4 mbits/per sec of bandwidth is required for such B frames. The output of the high resolution enhancement layer decoder 104 is coupled to the high resolution temporal enhancement layer decoder 106. The output of the temporal enhancement layer decoder 102 is also coupled to the high resolution temporal enhancement layer decoder 106. The high resolution temporal enhancement layer decoder 106 can decode at 36 fps. The combined output of the high resolution temporal enhancement layer decoder 106 comprises high resolution, high frame rate images (2 k×1 k pixels at 72 Hz).

Note that the compression ratio achieved through this scalable encoding mechanism is very high, indicating excellent compression efficiency. These ratios are shown in TABLE 5 for each of the temporal and scalability options from the example in FIG. 10. These ratios are based upon source RGB pixels at 24 bits/pixel. (If the 16 bits/pixel of conventional 4:2:2 encoding or the 12 bits/pixel of conventional 4:2:0 encoding are factored in, then the compression ratios would be ¾ and ½, respectively, of the values shown.)

TABLE 5

| Layer | Resolution | Rate (Hz) | Data Rate - mb/s (typical) | MPixels/s | Comp. Ratio (typical) |
|---|---|---|---|---|---|
| Base | 1k × 512 | 36 | 5 | 18.9 | 90 |
| Base Temp. | 1k × 512 | 72 | 8 (5 + 3) | 37.7 | 113 |
| High | 2k × 1k | 36 | 11 (5 + 6) | 75.5 | 165 |
| High Temp. | 2k × 1k | 72 | 18 (5 + 3 + 6 + 4) | 151 | 201 |
| for comparison: | | | | | |
| CCIR 601 | 720 × 486 | 29.97 | 5 | 10.5 | 50 |

These high compression ratios are enabled by two factors:
1) The high temporal coherence of high-frame-rate 72 Hz images;
2) The high spatial coherence of high resolution 2 k×1 k images;
3) Application of resolution detail enhancement to the important parts of the image (e.g., the central heart), and not to the less important parts (e.g., the borders of the frame).

These factors are exploited in the inventive layered compression technique by taking advantage of the strengths of the MPEG-2 encoding syntax. These strengths include bi-directionally interpolated B frames for temporal scalability. The MPEG-2 syntax also provides efficient motion representation through the use of motion-vectors in both the base and enhancement layers. Up to some threshold of high noise and rapid image change, MPEG-2 is also efficient at coding details instead of noise within an enhancement layer through motion compensation in conjunction with DCT quantization. Above this threshold, the data bandwidth is best allocated to the base layer. These MPEG-2 mechanisms work together when used according to the invention to yield highly efficient and effective coding which is both temporally and spatially scalable.

In comparison to 5 mbits/second encoding of CCIR 601 digital video, the compression ratios in TABLE 5 are much higher. One reason for this is the loss of some coherence due to interlace. Interlace negatively affects both the ability to predict subsequent frames and fields, as well as the correlation between vertically adjacent pixels. Thus, a major portion of the gain in compression efficiency described here is due to the absence of interlace.

The large compression ratios achieved by the invention can be considered from the perspective of the number of bits available to code each MPEG-2 macroblock. As noted above, macroblock is a 16×16 pixel grouping of four 8×8 DCT blocks, together with one motion vector for P frames, and one or two motion vectors for B frames. The bits available per macroblock for each layer are shown in TABLE 6.

TABLE 6

| Layer | Data Rate - mb/s (typical) | MPixels/s | Average Available Bits/Macroblock |
|---|---|---|---|
| Base | 5 | 19 | 68 |
| Base Temporal | 8 (5 + 3) | 38 | 54 |
| High | 11 (5 + 6) | 76 | 37 overall, 20/enh. layer |
| High w/border around hi-res center | 11 (5 + 6) | 61 | 46 overall, 35/enh. layer |
| High Temporal | 18 (5 + 3 + 6 + 4) | 151 | 30 overall, 17/enh. layer |
| High Temporal w/border around hi-res center | 18 (5 + 3 + 6 + 4) | 123 | 37 overall, 30/enh. layer |
| for comparison: | | | |
| CCIR 601 | 5 | 10.5 | 122 |

The available number of bits to code each macroblock is smaller in the enhancement layer than in the base layer. This is appropriate, since it is desirable for the base layer to have as much quality as possible. The motion vector requires 8 bits or so, leaving 10 to 25 bits for the macroblock type codes and for the DC and AC coefficients for all four 8×8 DCT blocks. This leaves room for only a few "strategic" AC coefficients. Thus, statistically, most of the information available for each macroblock must come from the previous frame of an enhancement layer.

It is easily seen why the MPEG-2 spatial scalability is ineffective at these compression ratios, since there is not sufficient data space available to code enough DC and AC coefficients to represent the high octave of detail represented by the enhancement difference image. The high octave is represented primarily in the fifth through eighth horizontal and vertical AC coefficients. These coefficients cannot be reached if there are only a few bits available per DCT block.

The system described here gains its efficiency by utilizing motion compensated prediction from the previous enhancement difference frame. This is demonstrably effective in providing excellent results in temporal and resolution (spatial) layered encoding.

Graceful Degradation The temporal scaling and resolution scaling techniques described here work well for normal-running material at 72 frames per second using a 2 k×1 k original source. These techniques also work well on film-based material which runs at 24 fps. At high frame rates, however, when a very noise-like image is coded, or when there are numerous shot cuts within an image stream, the enhancement layers may lose the coherence between frames which is necessary for effective coding. Such loss is easily detected, since the buffer-fullness/rate-control mechanism of a typical MPEG-2 encoder/decoder will attempt to set the quantizer to very coarse settings. When this condition is encountered, all of the bits normally used to encode the resolution enhancement layers can be allocated to the base layer, since the base layer will need as many bits as possible in order to code the stressful material. For example, at between about 0.5 and 0.33 MPixels per frame for the base layer, at 72 frames per second, the resultant pixel rate will be 24 to 36 MPixels/second. Applying all of the available bits to the base layer provides about 0.5 to 0.67 million additional bits per frame at 18.5 mbits/second, which should be sufficient to code very well, even on stressful material.

Under more extreme cases, where every frame is very noise-like and/or there are cuts happening every few frames, it is possible to gracefully degrade even further without loss of resolution in the base layer. This can be done by removing the B frames coding the temporal enhancement layer, and thus allow use of all of the available bandwidth (bits) for the I and P frames of the base layer at 36 fps. This increases the amount of data available for each base layer frame to between about 1.0 and 1.5 mbits/frame (depending on the resolution of the base layer). This will still yield the fairly good motion rendition rate of 36 fps at the fairly high quality resolution of the base layer, under what would be extremely stressful coding conditions. However, if the base-layer quantizer is still operating at a coarse level under about 18.5 mbits/second at 36 fps, then the base layer frame rate can be dynamically reduced to 24, 18, or even 12 frames per second (which would make available between 1.5 and 4 mbits for every frame), which should be able to handle even the most pathological moving image types. Methods for changing frame rate in such circumstances are known in the art.

The current proposal for U.S. advanced television does not allow for these methods of graceful degradation, and therefore cannot perform as well on stressful material as the inventive system.

In most MPEG-2 encoders, the adaptive quantization level is controlled by the output buffer fullness. At the high compression ratios involved in the resolution enhancement layer of the invention, this mechanism may not function optimally. Various techniques can be used to optimize the allocation of data to the most appropriate image regions. The conceptually simplest technique is to perform a pre-pass of encoding over the resolution enhancement layer to gather statistics and to search out details which should be preserved. The results from the pre-pass can be used to set the adaptive quantization to optimize the preservation of detail in the resolution enhancement layer. The settings can also be artificially biased to be non-uniform over the image, such that image detail is biased to allocation in the main screen regions, and away from the macroblocks at the extreme edges of the frame.

Except for leaving an enhancement-layer border at high frame rates, none of these adjustments are required, since existing decoders function well without such improvements. However, these further improvements are available with a small extra effort in the enhancement layer encoder.

Conclusion

The choice of 36 Hz as a new common ground temporal rate appears to be optimal. Demonstrations of the use of this frame rate indicate that it provides significant improvement over 24 Hz for both 60 Hz and 72 Hz displays. Images at 36 Hz can be created by utilizing every other frame from 72 Hz image capture. This allows combining a base layer at 36 Hz (preferably using P frames) and a temporal enhancement layer at 36 Hz (using B frames) to achieve a 72 Hz display.

The "future-looking" rate of 72 Hz is not compromised by the inventive approach, while providing transition for 60 Hz analog NTSC display. The invention also allows a transition for other 60 Hz displays, if other passive-entertainment-only (computer incompatible) 60 Hz formats under consideration are accepted.

Resolution scalability can be achieved though using a separate MPEG-2 image data stream for a resolution enhancement layer. Resolution scalability can take advantage of the B frame approach to provide temporal scalability in both the base resolution and enhancement resolution layers.

The invention described here achieves many highly desirable features. It has been claimed by some involved in the U.S. advanced television process that neither resolution nor temporal scalability can be achieved at high definition resolutions within the approximately 18.5 mbits/second available in terrestrial broadcast. However, the invention achieves both temporal and spatial-resolution scalability within this available data rate.

It has also been claimed that 2 MPixels at high frame rates cannot be achieved without the use of interlace within the available 18.5 mbits/second data rate. However, achieves not only resolution (spatial) and temporal scalability, it can provide 2 MPixels at 72 frames per second.

In addition to providing these capabilities, the invention is also very robust, particularly compared to the current proposal for advanced television. This is made possible by the allocation of most or all of the bits to the base layer when very stressful image material is encountered. Such stressful material is by its nature both noise-like and very rapidly changing. In these circumstances, the eye cannot see detail associated with the enhancement layer of resolution. Since the bits are applied to the base layer, the reproduced frames are substantially more accurate than the currently proposed advanced television system, which uses a single constant higher resolution.

Thus, this aspect of the inventive system optimizes both perceptual and coding efficiency, while providing maximum visual impact. This system provides a very clean image at a resolution and frame rate performance that had been considered by many to be impossible. It is believed that this aspect of the inventive system is likely to outperform the advanced television formats being proposed by at this time. In addition to this anticipated superior performance, the invention also provides the highly valuable features of temporal and resolution layering.

While the discussion above has used MPEG-2 in its examples, these and other aspects of the invention may be carried out using other compression systems. For example, the invention will work with any comparable standard that provides I, B, and P frames or equivalents, such as MPEG-1, MPEG-2, MPEG-4, H.263, and other compression systems (including wavelets and other non-DCT systems).

ENHANCEMENTS TO LAYERED COMPRESSION

Overview

A number of enhancements to the embodiments described above may be made to handle a variety of video quality and compression problems. The following describes a number of such enhancements, most of which are preferably embodied as a set of tools which can be applied to the tasks of enhancing images and compressing such images. The tools can be combined by a content developer in various ways, as desired, to optimize the visual quality and compression efficiency of a compressed data stream, particularly a layered compressed data stream.

Enhancement Layer Motion Vectors and Gray Bias

The usual way that a resolution enhancement layer is coded using MPEG-type (e.g., MPEG-2, MPEG-4, or comparable systems) compression is to bias a difference picture with a gray bias. In the common 8-bit pixel value range of 0=black to 255=white, the half-way point of 128 is commonly used as the gray bias value. Values below 128 represent negative differences between images, and values above 128 represent positive differences between the images. (For a 10-bit system, gray would be 512, 0=black, and 1023=white, and so forth for other bit ranges).

The difference picture is found by subtracting an expanded and decompressed base layer from an original high resolution image. Sequences of these difference pictures are then encoded as an MPEG-type difference picture stream of frames, which operates as a normal MPEG-type picture stream. The gray bias value is removed when each difference picture is added to another image (for example, the expanded decoded base layer) to create an improved resolution result.

Instead of using motion vectors found on this difference picture stream, which is often quite noisy, it is usually preferable to find motion vectors on the original high resolution image. These motion vectors are then used to displace the difference pictures within each frame. Such motion vectors will track details better than motion vectors which are found on the difference pictures.

Each difference picture represents a delta adjustment which would be needed to make a perfect encoding of the high resolution original. The pixel difference delta values can only extend for half of the range, which is nearly always sufficient, since differences are usually quite small. Thus, black (typically 0) regions can be extended at most to half gray (at 127, typically), and white (typically 255) can be extended down at most to half gray (at 128, typically).

However, if a region of the original image were to be exactly mid-gray (at 128, typically), then the difference picture could be used to create an entire black-to-white range (of 0 to 255, typically).

This simple relationship can be utilized to widen the aspect ratio of a final image in addition to enhancing the resolution of the base layer. By expanding the decompressed base layer, and then extending the image to a larger width and/or height using mid-gray, the system can provide the gray value (128, typically) for use with a difference picture in order to add full picture detail outside of the extent of the expanded, decompressed base layer.

Figure 11:
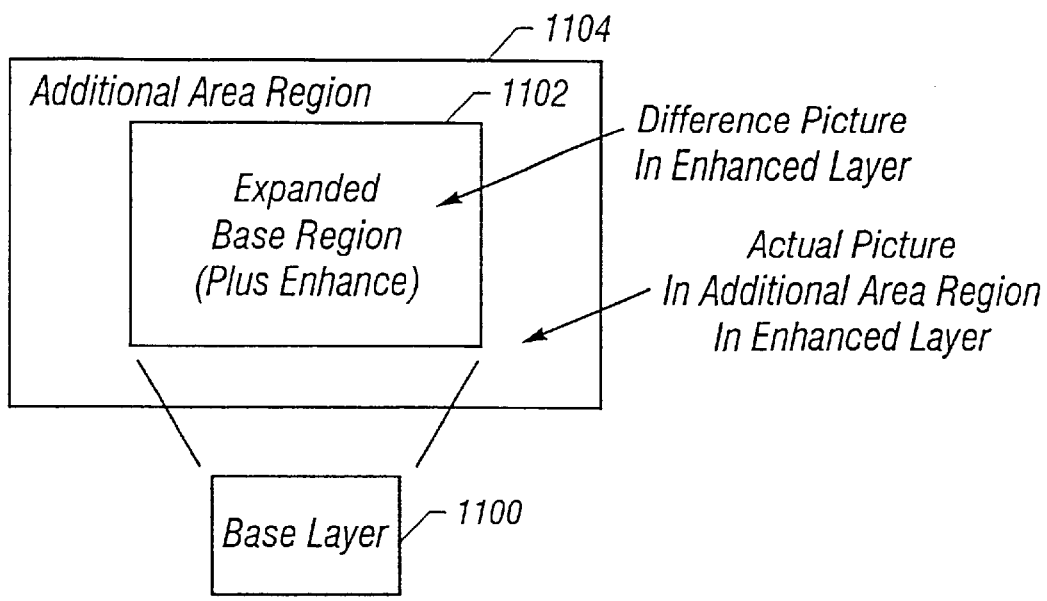
FIG. 11 is diagram of a base layer expanded by using a gray area and enhancement to provide picture detail.

FIG. 11 is diagram of a base layer expanded by using a gray area and enhancement to provide picture detail. In particular, a base layer 1100 having a narrower aspect ratio is upfiltered and then expanded in area as an expanded base region 1102. The expanded base region 1102 is then "padded" with a uniform mid-gray pixel value (e.g., 128) to widen its aspect ratio or otherwise increase its size (an "additional area region" 1104). An enhancement layer can then be added having a small range of possible pixel values (i.e., a difference picture) for the area that coincides with the the expanded base region 1102, but a full range of possible pixel values (e.g., ±127) over the additional area region 1104, thus providing additional actual picture information.

In this way, the base layer can represent a narrow or shorter (or both) image extent than the enhanced image at higher resolution. The enhancement layer then contains both gray-biased image difference pictures, corresponding to the extent of the expanded decompressed base layer (i.e., the expanded base region 1102), as well as containing actual picture. Since the compressed enhancement layer is encoded as a standard MPEG-type picture stream, the fact that the edge region is actual picture, and the inner region is a difference picture, is not distinguished, and both are coded and carried along together in the same picture stream of frames.

In the preferred embodiment, the edge region, outside the expanded decompressed base layer extent, is a normal high resolution MPEG-type encoded stream. It has an efficiency which corresponds to normal MPEG-type encoding of a high resolution picture. However, since it is an edge region, motion vectors within the difference picture region should be constrained not to point into the border region (which contains actual picture information). Also, motion vectors for the border actual-picture region should be constrained not to point into the inner difference picture region. In this way the border actual-picture region coding and difference picture region coding will be naturally separated.

This can be accomplished best by finding all of the motion vectors on the original image, but constrain them not to cross the boundary between the inner difference picture region and the outer border actual-picture region. This is best done if macroblock boundaries fall on the boundary between the inner difference picture region and the outer border actual-picture region. Otherwise, if the difference picture edge with the actual picture border is in the central region of a macroblock, then additional bits will need to be used when coding to accomplish the transition to and from difference and actual picture border regions. Accordingly, greatest efficiency is obtained if macroblock boundaries are on the same edge as the edge between the inner difference picture region and the outer border actual-picture region.

Note that the quantizer and rate buffer control during encoding of these hybrid difference-plus-actual-picture image-expanding enhancement layer pictures may need special adjustment to differentiate the larger extent of signals in the border actual-picture region over the inner difference picture region.

There is a tradeoff in the use of this technique concerning the amount of the extent of the border actual-picture region. For small border extensions, the number of bits in proportion to the overall stream is small, but the relative efficiency for the small area is reduced because of the number of motion vectors which cannot find matches since such matches would be off the edge of the border region. Another way of looking at this is that the border region has a high proportion of edge to area, unlike a usual image rectangle, which has a much lower proportion of edge to area. The inner rectangular picture region, typical of normal digital video as is usually coded with compression such as MPEG-2 or MPEG-4, has a high degree of matches when finding motion vectors since most of the area within the frame, except at the very frame edges, is usually present in the previous frame. On a pan, for example, the direction of picture coming on-screen will cause one edge to have to create picture from nothing, since the image is coming from off-screen for each frame. However, most of a normal picture rectangle is on-screen in the previous frame, allowing the motion vectors to most often find matches.

However, using this inventive border extension technique, the border area has a much higher percentage of off-screen mismatches in previous frames for motion compensation, since the screen outer edge, as well as the difference picture inner edge, are both "out-of-bounds" for motion vectors. Thus, some loss of efficiency is inherent in this approach when considered as bits per image area (or per pixel or per macroblock, which are equivalent bits-per-area measures). Thus, when the border region is relatively small, this relative inefficiency is a sufficiently small proportion of the overall bit rate to be acceptable. If the border is relatively large, likewise, the efficiency becomes higher, and the proportion may again be acceptable. Moderately sized borders may suffer some inefficiency during pans, but this inefficiency may be acceptable.

One way that efficiency may be regained using this technique is that simpler ratios of base to enhancement layer resolution, such as ³⁄₂, ⁴⁄₃, and especially exact factors of 2, can be used for narrower base layers. Using factors of two, especially, helps gain significant efficiency in overall encoding using a base and resolution enhancement layer.

The lower resolution image may also be most naturally used on narrower screens, while the higher resolution image may be more naturally viewed on larger and wider, and/or taller screens.

It is also possible to continuously move or reposition the inner difference picture region, corresponding to the practice of "pan and scan" for the base resolution image. The upper borders would then have a dynamic re-position and size and shape. The macroblock alignment would usually be lost in continuous panning, but could be maintained if some care is taken to align cuts within the larger area. The simplest and most efficient construction, however, is a fixed-position centered alignment of the inner difference picture with respect to the base layer on exact macroblock boundaries.

Image Filtering
Downsizing and Upsizing Filters

Figure 12:
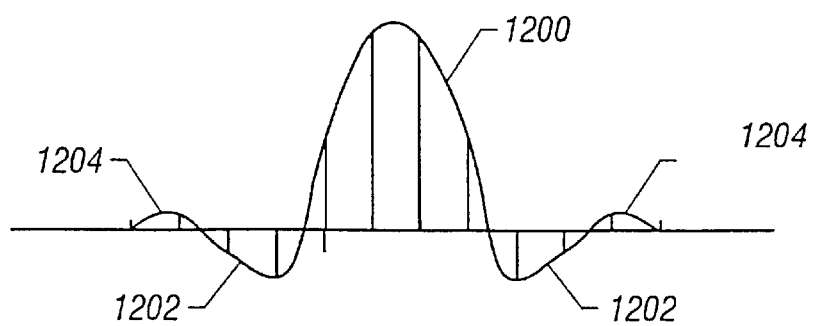
FIG. 12 is a diagram of the relative shape, amplitudes, and lobe polarity of a preferred downsizing filter.

Experimentation has shown that the downsizing filter used in creating a base layer from a high resolution original picture is most optimal if it includes modest negative lobes and an extent which stops after the first very small positive lobes after the negative lobes. FIG. 12 is a diagram of the relative shape, amplitudes, and lobe polarity of a preferred downsizing filter. The down filter essentially is a center-weighted function which has been truncated to a center positive lobe 1200, a symmetric pair of adjacent (bracketing) small negative lobes 1202, and a symmetric pair of adjacent (bracketing) very small outer positive lobes 1204. The absolute amplitude of the lobes 1200, 1202, 1204 may be adjusted as desired, so long as the relative polarity and amplitude inequality relationships shown in FIG. 12 are maintained. However, a good first approximation for the relative amplitudes are defined by a truncated sinc function (sinc(x)=sin(x)/x). Such filters can be used separably, which means that the horizontal data dimension is independently filtered and resized, and then the vertical data dimension, or vice versa; the result is the same.

When creating a base layer original (as input to the base layer compression) from a low-noise high resolution original input, the preferred downsizing filter has first negative lobes which are of a normal sinc function amplitude. For clean and for high resolution input images, this normal truncated sinc function works well. For lower resolutions (e.g., 1280×720, 1024×768, or 1536×768), and for noisier input pictures, a reduced first negative lobe amplitude in the filters is more optimal. A suitable amplitude in such cases is about half the truncated sinc function negative lobe amplitude. The small first positive lobes outside of the first negative lobes are also reduced to lower amplitude, typically to ½ to ⅔ of the normal sinc function amplitude. The affect of reducing the first negative lobes is the main issue, since the small outside positive lobes do not contribute to picture noise. Further samples outside the first positive lobes preferably are truncated to minimize ringing and other potential artifacts.

The choice of whether to use milder negative lobes or full sinc function amplitude negative lobes in the downfilter is determined by of the resolution and noise level of the original image. It is also somewhat a function of image content, since some types of scenes are easier to code than others (mainly related to the amount of motion and change in a particular shot). By using a "milder" downfilter having reduced negative lobes, noise in the base layer is reduced, and a cleaner and quieter compression of the base layer is achieved, thus also resulting in fewer artifacts.

Figure 13A:
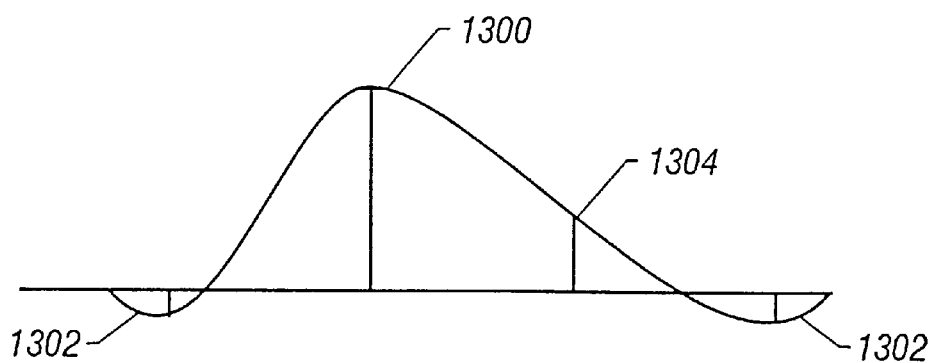
FIGS. 13A and 13B are diagrams of the relative shape, amplitudes, and lobe polarity of a pair of preferred upsizing filters for upsizing by a factor of 2.
Figure 13B:
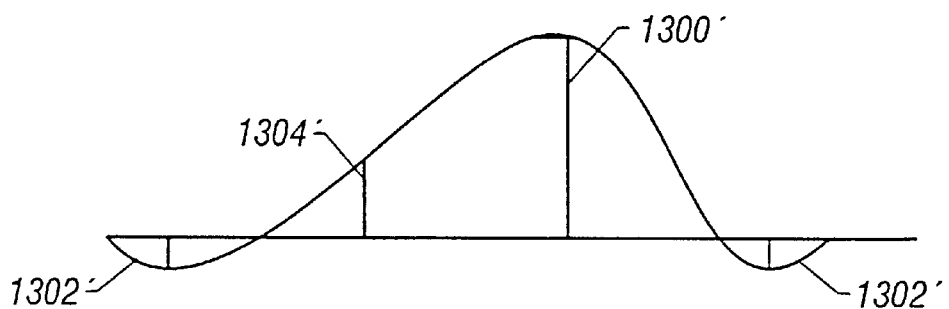

Experimentation has also shown that the optimal upsizing filter has a center positive lobe with small adjacent negative lobes, but no further positive lobes. FIGS. 13A and 13B are diagrams of the relative shape, amplitudes, and lobe polarity of a pair of preferred upsizing filters for upsizing by a factor of 2. A central positive lobe 1300, 1300' is bracketed by a pair of small negative lobes 1302, 1302'. An asymmetrically placed positive lobe 1304, 1304' is also required. These paired upfilters could also be considered to be truncated sinc filters centered on the newly created samples. For example, for a factor of two upfilter, two new samples will be created for each original sample. The small adjacent negative lobes 1302, 1302' have less negative amplitude than is used in the corresponding downsizing filter (FIG. 12), or than would be used in an optimal (sinc-based) upsizing filter for normal images. This is because the images being upsized are decompressed, and the compression process changes the spectral distribution. Thus, more modest negative lobes, and no additional positive lobes beyond the middle ones 1300, 1300', work better for upsizing a decompressed base layer.

Experimentation has shown that slight negative lobes 1302, 1302' provide a better layered result than positive-only gaussian or spline upfilters (note that splines can have negative lobes, but are most often used in the positive-only form). Thus, this upsizing filter preferably is used for the base layer in both the encoder and the decoder.

Weighting of High Octave of Picture Detail

In the preferred embodiment, the signal path which expands the original uncompressed base layer input image uses a gaussian upfilter rather than the upfilter described above. In particular, a gaussian upfilter is used for the "high octave" of picture detail, which is determined by subtracting the expanded original base-resolution input image (without using compression) from the original picture. Thus, no negative lobes are used for this particular upfiltered expansion.

As noted above, for MPEG-2 this high octave difference signal path is typically weighted with 0.25 (or 25%) and added to the expanded decompressed base layer (using the other upfilter described above) as input to the enhancement layer compression process. However, experimentation has shown that weights of 10%, 15%, 20%, 30%, and 35% are useful for particular images when using MPEG-2. Other weights may also prove useful. For MPEG-4, it has been found that filter weights of 4–8% may be optimal when used in conjunction with other improvements described below. Accordingly, this weighting should be regarded as an adjustable parameter, depending upon the encoding system, the scenes being encoded/compressed, the particular camera (or film) being used, and the image resolution.

De-Interlacing and Noise Reduction Enhancements
Overview

Experimentation has shown that many de-interlacing algorithms and devices depend upon the human eye to integrate fields to create an acceptable result. However, since compression algorithms are not a human eye, any integration of de-interlaced fields should take into account the characteristics of such algorithms. Without such careful de-interlaced integration, the compression process will create high levels of noise artifacts, both wasting bits (hindering compression) as well as making the image look noisy and busy with artifacts. This distinction between de-interlacing for viewing (such as with line-doublers and line-quadruplers) vs. de-interlacing as input to compression, has lead to the techniques described below. In particular, the de-interlacing techniques described below are useful as input to single-layer non-interlaced MPEG-like, as well as to the layered MPEG-like compression described above.

Further, noise reduction must similarly match the needs of being an input to compression algorithms, rather than just reducing noise appearance. The goal is generally to reproduce, upon decompression, no more noise than the original camera or film-grain noise. Equal noise is generally considered acceptable, after compression/decompression. Reduced noise, with equivalent sharpness and clarity with the original, is a bonus. The noise reduction described below achieves these goals.

Further, for very noisy shots, such as from high speed film or with high camera sensitivity settings, usually in low light, noise reduction can be the difference between a good looking compressed/decompressed image vs. one which is unwatchably noisy. The compression process greatly amplifies noise which is above some threshold of acceptability to the compressor. Thus, the use of noise-reduction preprocessing to keep noise below this threshold may be required for acceptable good quality results.

De-Graining and Noise-Reducing Filters

It has been found through experimentation that applying de-graining and/or noise-reducing filtering before layered or non-layered encoding improves the ability of the compression system to perform. While de-graining or noise-reduction is most effective on grainy or noisy images prior to compression, either process may be helpful when used in moderation even on relatively low noise or low grain pictures. Any of several known de-graining or noise-reduction algorithms may be applied. Examples are "coring", simple neighbor median filters, and softening filters.

Whether noise-reduction is needed is determined by how noisy the original images are. For interlaced original images, the interlace itself is a form of noise, which usually will require additional noise reduction filtering, in addition to the complex de-interlacing process described below. For progressive scan (non-interlaced) camera or film images, noise processing is useful in layered and non-layered compression when noise is present above a certain level.

There are different types of noise. For example, video transfers from film include film grain noise. Film grain noise is caused by silver grains which couple to yellow, cyan, and magenta film dyes. Yellow affects both red and green, cyan affects both blue and green, and magenta affects both red and blue. Red is formed where yellow and magenta dye crystals overlap. Similarly green is the overlap of yellow and cyan, and blue is the overlap of magenta and cyan. Thus, noise between colors is partially correlated through the dyes and grains between pairs of colors. Further, when multiple grains overlap in all three colors, as they do in a print dark regions of the image or on a negative in light regions of the image (dark on the negative), additional color combinations occur. This correlation between the colors can be utilized in film-grain noise reduction, but is a complex process. Further, many different film types are used, and each type has different grain sizes, shapes, and statistical distributions.

For video images created by CCD-sensor and other (e.g., tube) sensor cameras, the red, green, and blue noise is uncorrelated. In this case, it is best to process the red, green, and blue records independently. Thus, red noise is reduced with self-red processing independently of green noise and blue noise; the same approach applies to green and blue noise.

Thus, noise processing is best matched to the characteristics of the noise source itself. In the case of a composite image (from multiple sources), the noise may differ in characteristics over different portions of the image. In this situation, generic noise processing may be the only option, if noise processing is needed.

It has also been found useful in some cases to perform a "re-graining" or "re-noising" process after decoding a compressed layered data stream, as a creative effect, since some de-grained or de-noised images may be "too clean" or "too sterile" in appearance. Re-graining and/or re-noising are relatively easy effects to add in the decoder using any of several known algorithms. For example, this can be accomplished by the addition of low pass filtered random noise of suitable amplitude.

De-Interlacing Before Compression

As mentioned above, the preferred compression method for interlaced source which is ultimately intended for non-interlaced display includes a step to de-interlace the interlaced source before the compression steps. De-interlacing a signal after decoding in the receiver, where the signal has been compressed in the interlaced mode, is both more costly and less efficient than de-interlacing prior to compression, and then sending a non-interlaced compressed signal. The non-interlaced compressed signal can be either layered or non-layered (i.e., a conventional single layer compression).

Experimentation has shown that filtering a single field of an interlaced source, and using that field as if it were a non-interlaced full frame, gives poor and noisy compression results. Thus, using a single-field de-interlacer prior to compression is not a good approach. Instead, experimentation has shown that a three-field-frame de-interlacer process using field synthesized frames ("field-frames"), with weights of [0.25, 0.5, 0.25] for the previous, current, and next field-frames, respectively, provides a good input for compression. Combining three field-frames may be performed using other weights (although these weights are optimal) to create a de-interlaced input to a compression process.

In the preferred de-interlacing system, a field-de-interlacer is used as the first step in the overall process to create field-frames. In particular, each field is de-interlaced, creating a synthesized frame where the total number of lines in the frame is derived from the half number of lines in a field. Thus, for example, an interlaced 1080 line image will have 540 lines per even and odd field, each field representing 1/60th of a second. Normally, the even and odd fields of 540 lines will be interlaced to create 1080 lines for each frame, which represents 1/30th of a second. However, in the preferred embodiment, the de-interlacer copies each scanline without modification from a specified field (e.g., the odd fields) to a buffer that will hold some of the de-interlaced result. The remaining intermediate scanlines (in this example, the even scanlines) for the frame are synthesized by adding half of the field line above and half of the field line below each newly stored line. For example, the pixel values of line 2 for a frame would each comprise ½ of the summed corresponding pixel values from each of line 1 and line 3. The generation of intermediate synthesized scanlines may be done on the fly, or may be computed after all of the scanlines from a field are stored in a buffer. The same process is repeated for the next field, although the field types (i.e., even, odd) will be reversed.

Figure 14A:
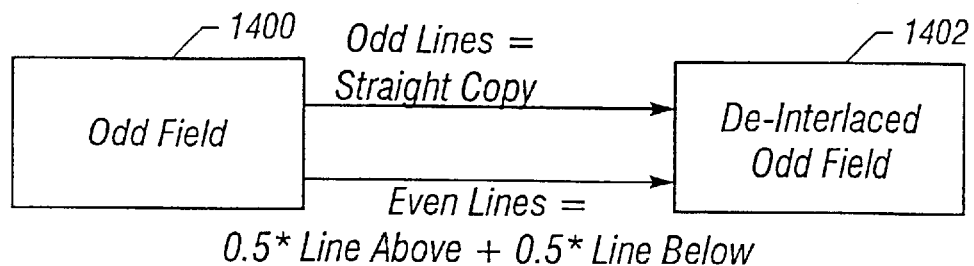
FIG. 14A is a block diagram of an odd-field de-interlacer.
Figure 14B:
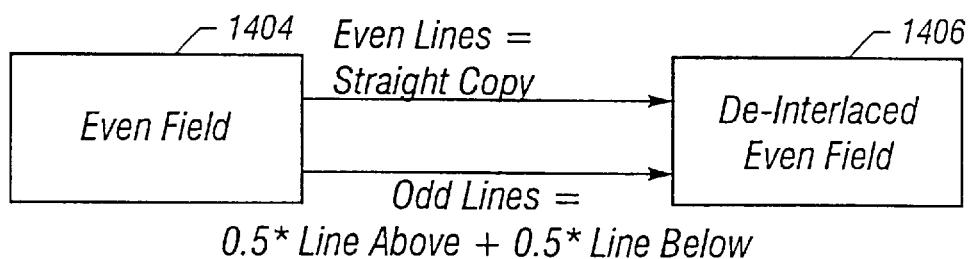
FIG. 14B is a block diagram of an even-field de-interlacer.

FIG. 14A is a block diagram of an odd-field de-interlacer, showing that the odd lines from an odd field 1400 are simply copied to a de-interlaced odd field 1402, while the even lines are created by averaging adjacent odd lines from the original odd field together to form the even lines of the de-interlaced odd field 1402. Similarly, FIG. 14B is a block diagram of an even-field de-interlacer, showing that the even lines from an even field 1404 are simply copied to a de-interlaced even field 1406, while the odd lines are created by averaging adjacent even lines from the original even field together to form the odd lines of the de-interlaced even field 1406. Note that this case corresponde to "top field first"; "bottom field first" could also be considered the "even" field.

Figure 15:
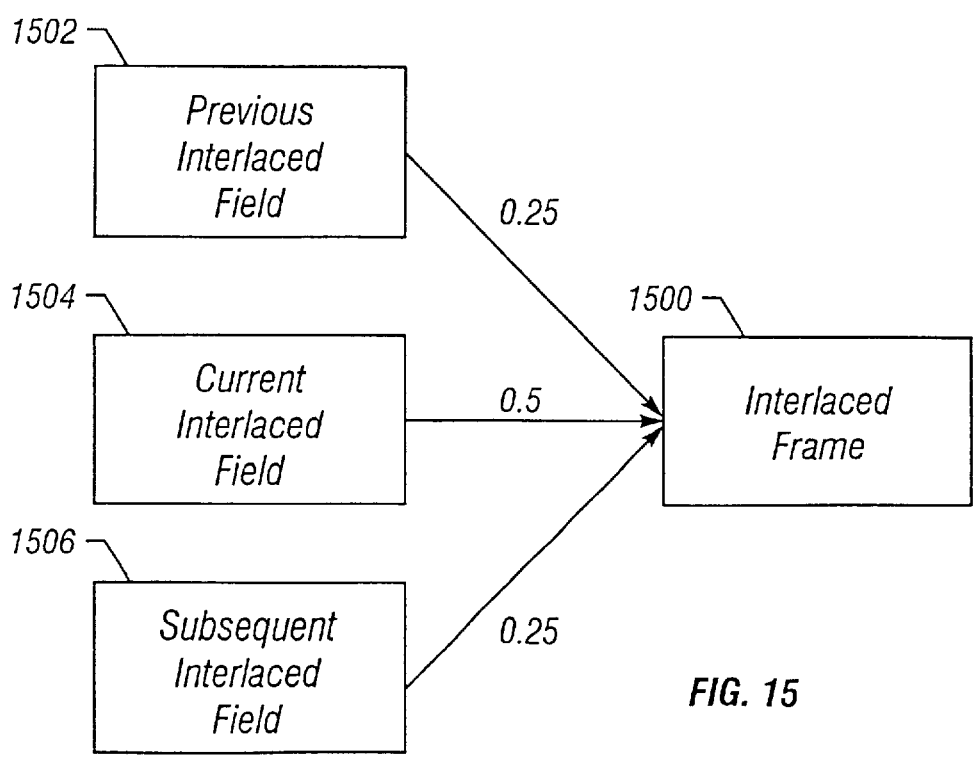
FIG. 15 is a block diagram of a frame de-interlacer using three de-interlaced fields.

As a next step, a sequence of these de-interlaced fields is then used as input to a three-field-frame de-interlacer to create a final de-interlaced frame. FIG. 15 is a block diagram showing how the pixels of each output frame are composed of 25% of the corresponding pixels from a previous de-interlaced field (field-frame) 1502, 50% of the corresponding pixels from a current field-frame 1504, and 25% of the corresponding pixels from the next field-frame 1506.

The new de-interlaced frame then contains much fewer interlace difference artifacts between frames than do the three field-frames of which it is composed. However, there is a temporal smearing by adding the previous field-frame and next field-frame into a current field-frame. This temporal smearing is usually not objectionable, especially in light of the de-interlacing improvements which result.

This de-interlacing process is very beneficial as input to compression, either single layer (unlayered) or layered. It is also beneficial just as a treatment for interlaced video for presentation, viewing, or making still frames, independent of use with compression. The picture from the de-interlacing process appears "clearer" than the presentation of the interlace directly, or of the de-interlaced fields.

De-Interlace Thresholding

Although the de-interlace three-field sum weightings of [0.25, 0.5, 0.25] discussed above provide a stable image, moving parts of a scene can sometimes become soft or can exhibit aliasing artifacts. To counteract this, a threshold test may be applied which compares the result of the [0.25, 0.5, 0.25] temporal filter against the corresponding pixel values of only the middle field-frame. If a middle field-frame pixel value differs more than a specified threshold amount from the value of the corresponding pixel from the three-field-frame temporal filter, then only the middle field-frame pixel value is used. In this way, a pixel from the three-field-frame temporal filter is selected where it differs less than the threshold amount from the corresponding pixel of the single de-interlaced middle field-frame, and the middle field-frame pixel value is used when there is more difference than the threshold. This allows fast motion to be tracked at the field rate, and smoother parts of the image to be filtered and smoothed by the three-field-frame temporal filter. This combination has proven an effective, if not optimal, input to compression. It is also very effective for processing for direct viewing to de-interlace image material (also called line doubling in conjunction with display).

The preferred embodiment for such threshold determinations uses the following equations for corresponding RGB color values from the middle (single) deinterlaced field-frame image and the three-field-frame deinterlaced image:

Rdiff=R_single field_deinterlaced minus R_three_field_deinterlaced

Gdiff=G_single-field_deinterlaced minus G_three_field_deinterlaced

Bdiff=B_single field_deinterlaced minus B_three_field_deinterlaced

ThresholdingValue=abs(Rdiff+Gdiff+Bdiff)+abs(Rdiff)+abs(Gdiff)+abs(Bdiff)

The ThresholdingValue is then compared to a threshold setting. Typical threshold settings are in the range of 0.1 to 0.3, with 0.2 being most common.

In order to remove noise from this threshold, smooth-filtering the three-field-frame and single-field-frame de-interlaced pictures can be used before comparing and thresholding them. This smooth filtering can be accomplished simply by down filtering (e.g., down filtering by two using the preferably down filter described above), and then up filtering (e.g., using a gaussian up-filter by two. This "down-up" smoothed filter can be applied to both the single-field-frame de-interlaced picture and the three-field-frame de-interlaced picture. The smoothed single-field-frame and three-field-frame pictures can then compared to compute a ThresholdingValue and then thresholded to determine which picture will source each final output pixel.

In particular, the threshold test is used as a switch to select between the single-field-frame de-interlaced picture and the three-field-frame temporal filter combination of single-field-frame de-interlaced pictures. This selection then results in an image where the pixels are from the three-field-frame de-interlacer in those areas where that image differs in small amounts (i.e., below the threshold) from the single field-frame image, and where the pixels are from the single field-frame image in those areas where the three-field-frame differed more than then the threshold amount from the single-field-frame de-interlaced pixels (after smoothing).

This technique has proven effective in preserving single-field fast motion details (by switching to the single-field-frame de-interlaced pixels), while smoothing large portions of the image (by switching to the three-field-frame de-interlaced temporal filter combination).

In addition to selecting between the single-field-frame and three-field-frame de-interlaced image, it is also often beneficial to add a bit of the single-field-frame image to the three-field-frame de-interlaced picture, to preserve some of the immediacy of the single field pictures over the entire image. This immediacy is balanced against the temporal smoothness of the three-field-frame filter. A typical blending is to create new frame by adding 33.33% (⅓) of a single middle field-frame to 66.67% (⅔) of the corresponding three-field-frame smoothed image. This can be done before or after threshold switching, since the result is the same either way, only affecting the smoothed three-field-frame picture. Note that this is effectively equivalent to using a different proportion of the three field-frames, rather than the original three-field-frame weights of [0.25, 0.5, 0.25]. Computing ⅔ of [0.25, 0.5, 0.25] plus ⅓ of (0, 1, 0), yields [0.1667, 0.6666, 0.1667] as the temporal filter for the three field-frames. The more heavily weighted center (current) field-frame brings additional immediacy to the result, even in the smoothed areas which fell below the threshold value. This combination has proven effective in balancing temporal smoothness with immediacy in the de-interlacing process for moving parts of a scene.

Use of Linear Filters

Sums, filters, or matrices involving video pictures should take into account the fact that pixel values in video are non-linear signals. For example, the video curve for HDTV can be several variations of coefficients and factors, but a typical formula is the international CCIR XA-11 (now called Rec. 709):

$V=1.0993*L^{0.45}-0.0993$ for $L>0.018051$ $V=4.5*L$ for $L<=0.018051$ where V is the video value and L is linear light luminance.

The variations adjust the threshold (0.018051) a little, the factor (4.5) a little (e.g. 4.0), and the exponent (0.45) a little (e.g, 0.4). The fundamental formula, however, remains the same.

A matrix operation, such as a RGB to/from YUV conversion, implies linear values. The fact that MPEG in general uses the video non-linear values as if they were linear results in leakage between the luminance (Y) and the color values (U, and V). This leakage interferes with compression efficiency. The use of a logarithmic representation, such as is used with film density units, corrects much of this problem. The various types of MPEG encoding are neutral to the non-linear aspects of the signal, although its efficiency is effected due to the use of the matrix conversion RGB to/from YUV. YUV (U=R−Y, V=B−Y) should have Y computed as a linearized sum of 0.59 G, plus 0.29 R, plus 0.12 B (or slight variations on these coefficients). However, U (=R−Y) becomes equivalent to R/Y in logarithmic space, which is orthogonal to luminance. Thus, a shaded orange ball will not vary the U (=R−Y) parameter in a logarithmic representation. The brightness variation will be represented completely in the Luminance parameter, where full detail is provided.

The linear vs. logarithmic vs. video issue impacts filtering. A key point to note is that small signal excursions (e.g. 10% or less) are approximately correct when a non-linear video signal is processed as if it were a linear signal. This is because a piece-wise linear approximation to the smooth video-to-from-linear conversion curve is reasonable. However, for large excursions, a linear filter is much more effective, and produces much better image quality. Accordingly, if large excursions are to be optimally coded, transformed, or otherwise processed, it would be desirable to first convert the non-linear signal to a linear one in order to be able to apply a linear filter.

De-interlacing is therefore much better when each filter and summation step utilizes conversions to linear values prior to filtering or summing. This is due to the large signal excursions inherent in interlaced signals at small details of the image. After filtering, the image signals are converted back to the non-linear video digital representation. Thus, the three-field-frame weighting (e.g., [0.25, 0.5, 0.25] or [0.1667, 0.6666, 0.1667]) should be performed on a linearized video signal. Other filtering and weighted sums of partial terms in noise and de-interlace filtering should also be converted to linear form for computation. Which operations warrant linear processing is determined by signal excursion, and the type of filtering. Image sharpening can be appropriately computed in video or logarithmic non-linear representations, since it is self-proportional. However, matrix processing, spatial filtering, weighted sums, and de-interlace processing should be computed using linearized digital values.

As a simple example, the single field-frame de-interlacer described above computes missing alternate lines by averaging the line above and below each actual line. This average is much more correct numerically and visually if this average is done linearly. Thus, instead of summing 0.5 times the line above plus 0.5 times the line below, the digital values are linearized first, then averaged, and then reconverted back into the non-linear video representation.

Layered Mode Based Upon ⅔ Base Layer

Figure 16:
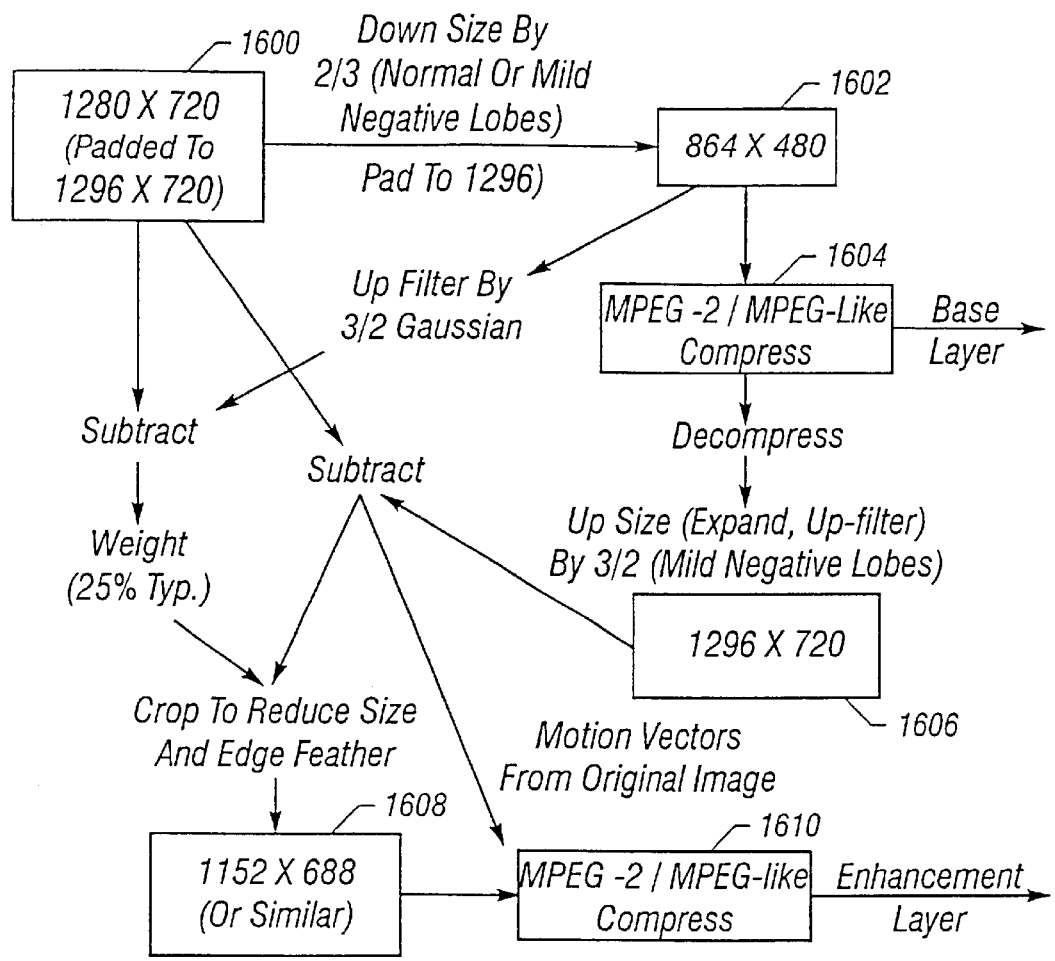
FIG. 16 is a block diagram of an additional layered mode based upon a ⅔ base layer.

A 1280×720 enhancement layer can utilize an 864×480 base layer (i.e., a ⅔ relationship between the enhancement and base layer). FIG. 16 is a block diagram of such a mode. An original image 1600 at 1280×720 is padded to 1296×720 (to be a multiple of 16) and then downsized by ⅔ to an 864×480 image 1602 (also a multiple of 16). The downsizing preferably uses a normal filter or a filter having mild negative lobes. As described above, this downsized image 1602 may be input to an first encoder 1604 (e.g., an MPEG-2 or MPEG-4 encoder) for direct encoding as a base layer.

To encode the enhancement layer, the base layer is decompressed and upsized (expanded and up-filtered) by 3/2 to a 1296×720 intermediate frame 1606. The upfilter preferably has mild negative lobes. This intermediate frame 1606 is subtracted from the original image 1600. Meanwhile, the 864×480 image 1602 is up-filtered by 3/2 (preferably using a gaussian filter) to 1280×720 and subtracted from the original image 1600. The result is weighted (e.g., typically by 25% for MPEG-2) and added to the result of the subtraction of the intermediate frame 1606 from the original image 1600. This resulting sum is cropped to a reduced size (e.g., 1152×688) and the edges feathered, resulting in a-pre-compression enhancement layer frame 1608. This pre-compression enhancement layer frame 1608 is applied as an input to a second encoder 1610 (e.g, an MPEG-2 or MPEG-4 encoder) for encoding as an enhancement layer.

The efficiency and quality at 18.5 mbits/sec is approximately equivalent between "single" layered (i.e., non-layered) and a layered system using this configuration. The efficiency of a ⅔ relationship between the enhancement and base layer is not as good as when using a factor of two, since the DCT coefficients are less orthogonal between the base and enhancement layers. However, this construction is workable, and has the advantage of providing a high quality base layer (which is cheaper to decode). This is an improvement over the single layered configuration where the entire high resolution picture must be decoded (at a higher cost), when lower resolution is all that can be provided by a particular display.

The layered configuration also has the advantage that the enhancement sub-region is adjustable. Thus, efficiency can be controlled by adjusting the size of the enhancement layer and the proportion of the total bit rate that is allocated to the base layer vs. the enhancement layer. Adjustment of the enhancement layer size and bit proportion can be used to optimize compression performance, especially under high stress (rapid motion or many scene changes). For example, as noted above, all of the bits may be allocated to the base layer under extreme stress.

Favorable resolution relationships between the enhancement and base layers are factors of ½, ⅔, and other simple fractions (e.g., ⅓, ¾). It is also useful to apply squeezes with respect to the relationship between an enhancement layer and the base layer. For example, a source picture of 2048× 1024 could have a base layer of 1536×512, which has a horizontal relationship of ¾ and a vertical relationship of ½ with respect to the source image. Although this is not optimal (a factor of two both horizontally and vertically is optimal), it is illustrative of the principle. The use of ⅔ both horizontally and vertically might be improved upon for some resolutions by using a factor of 2 vertically and a factor of ⅔ horizontally. Alternatively, it may be more optimal for some resolutions to use a factor of ⅔ vertically and ½ horizontally. Thus, simple fractions such as ½, ⅔, ¾, ⅓, etc. can be independently applied to the horizontal and vertical resolution relationships, allowing a large number of possible combinations of relationships. Thus, the relationship of the full input resolution to the resolution of the base layer, as well as the relationship of the enhancement layer to the base layer and the input resolution, allows full flexibility in the use of such fractional relationships. Particularly useful combinations of such resolution relationships may be assigned a compression "enhancement mode" number if adopted as part of any standard.

Median Filters

In noise processing, the most useful filter is the median filter. A three element median filter just ranks the three entries, via a simple sort, and picks the middle one. For example, an X (horizontal) median filter looks at the red value (or green or blue) of three adjacent horizontal pixels, and picks the one with the middle-most value. If two are the same, that value is selected. Similarly, a Y filter looks in the scanlines above and below the current pixel, and again picks the middle value.

It has been experimentally determined that it is useful to average the results from applying both an X and a Y median filter to create a new noise-reducing component picture (i.e., each new pixel is the 50% equal average of the X and Y medians for the corresponding pixel from a source image).

In addition to X and Y (horizontal and vertical) medians, it is also possible to take diagonal and other medians. However, the vertical and horizontal pixel values are most close physically to any particular pixel, and therefore produce less potential error or distortion than the diagonals. However, such other medians remain available in cases where noise reduction is difficult using only the vertical and horizontal medians.

Another beneficial source of noise reduction is information from the previous and subsequent frame (i.e., a temporal median). As mentioned below, motion analysis provides the best match for moving regions. However, it is compute intensive. If a region of the image is not moving, or is moving slowly, the red values (and green and blue) from a current pixel can be median filtered with the red value at that same pixel location in the previous and subsequent frames. However, odd artifacts may occur if significant motion is present and such a temporal filter is used. Thus, it is preferred that a threshold be taken first, to determine whether such a median would differ more than a selected amount from the value of a current pixel. The threshold can be computed essentially the same as for the de-interlacing threshold above:

Rdiff=R_current_pixel minus R_temporal_median
Gdiff=G_current_pixel minus G_temporal_median
Bdiff=B_current_pixel minus B_temporal_median
ThresholdingValue=abs(Rdiff+Gdiff+Bdiff)+abs(Rdiff)+abs(Gdiff)+abs(Bdiff)

The ThresholdingValue is then compared to a threshold setting. Typical threshold settings are in the range 0.1 to 0.3, with 0.2 being typical. Above the threshold, the current value is kept. Below the threshold, the temporal median is used.

An additional median type is a median taken between the X, Y, and temporal medians. Another median type can take the temporal median, and then take the equal average of the X and Y medians from it.

Each type of median can cause problems. X and Y medians smear and blur an image, so that it looks "greasy". Temporal medians cause smearing of motion over time. Since each median can result in problems, yet each median's properties are different (and, in some sense, "orthogonal"), it has been determined experimentally that the best results come by combining a variety of medians.

In particular, a preferred combination of medians is a linear weighted sum (see the discussion above on linear video processing) of five terms to determine the value for each pixel of a current image:

50% of the original image (thus, the most noise reduction is 3 db, or half);
15% of the average of X and Y medians;
10% of the thresholded temporal median;
10% of the average of X and Y medians of the thresholded temporal median; and
15% of a three-way X, Y, and temporal median.

This set of time medians does a reasonable job of reducing the noise in the image without making it appear "greasy" or blurred, causing temporal smearing of moving objects, or losing detail. Another useful weighting of these five terms is 35%, 20%, 22.5%, 10%, and 12.5%, respectively.

In addition, it is useful to apply motion-compensation by applying center weighted temporal filters to a motion-compensated n×n region, as described below. This can be added to the median filtered image result (of five terms, just described) to further smooth the image, providing better smoothing and detail on moving image regions.

Motion Analysis

In addition to "in-place" temporal filtering, which does a good job at smoothing slow-moving details, de-interlacing and noise reduction can also be improved by use of motion analysis. Adding the pixels at the same location in three fields or three frames is valid for stationary objects. However, for moving objects, if temporal averaging/smoothing is desired, it is often more optimal to attempt to analyze prevailing motion over a small group of pixels. For example, an n×n block of pixels (e.g., 2×2, 3×3, 4×4, 6×6, or 8×8) can be used to search in previous and subsequent fields or frames to attempt to find a match (in the same way MPEG-2 motion vectors are found by matching 16×16 macroblocks). Once a best match is found in one or more previous and subsequent frames, a "trajectory" and "moving mini-picture" can be determined. For interlaced fields, it is best to analyze comparisons as well as compute inferred moving mini-pictures utilizing the results of the thresholded de-interlaced process above. Since this process has already separated the fast-moving from the slow-moving details, and has already smoothed the slow moving details, the picture comparisons and reconstructions are more applicable than individual de-interlaced fields.

The motion analysis preferably is performed by comparison of an n×n block in the current thresholded de-interlaced image with all nearby blocks in the previous and subsequent one or more frames. The comparison may be the absolute value of differences in luminance or RGB over the n×n block. One frame is sufficient forward and backward if the motion vectors are nearly equal and opposite. However, if the motion vectors are not nearly equal and opposite, then an additional one or two frames forward and backward can help determine the actual trajectory. Further, different de-interlacing treatments may be useful in helping determine the "best guess" motion vectors going forward and back. One de-interlacing treatment can be to use only individual de-interlaced fields, although this is heavily prone to aliasing and artifacts on small moving details. Another de-interlacing technique is to use only the three-field-frame smooth de-interlacing, without thresholding, having weightings [0.25, 0.5, 0.25], as described above. Although details are smoothed and sometimes lost, the trajectory may often be more correct.

Once a trajectory is found, a "smoothed n×n block" can be created by temporally filtering using the motion-vector-offset pixels from the one (or more) previous and subsequent frames. A typical filter might again be [0.25, 0.5, 0.25] or [0.1667, 0.6666, 0.1667] for three frames, and possibly [0.1, 0.2, 0.4, 0.2, 0.1] for two frames back and forward. Other filters, with less central weight, are also useful, especially with smaller block sizes (such as 2×2, 3×3, and 4×4). Reliability of the match between frames is indicated by the absolute difference value. Large minimum absolute differences can be used to select more center weight in the filter. Lower values of absolute differences can suggest a good match, and can be used to select less center weight to more evenly distribute the average over a span of several frames of motion-compensated blocks.

These filter weights can be applied to: individual de-interlaced motion-compensated field-frames; thresholded three-field-frame de-interlaced pictures, described above; and non-thresholded three-field-frame de-interlaced images, with a [0.25, 0.5, 0.25] weighting, also as described above. However, the best filter weights usually come from applying the motion-compensated block linear filtering to the thresholded three-field-frame result described above. This is because the thresholded three-field-frame image is both the smoothest (in terms of removing aliasing in smooth areas), as well as the most motion-responsive (in terms of defaulting to a single de-interlaced field-frame above the threshold). Thus, the motion vectors from motion analysis can be used as the inputs to multi-frame or multi-de-interlaced-field-frame or single-de-interlaced field-frame filters, or combinations thereof. The thresholded multi-field-frame de-interlaced images, however, form the best filter input in most cases.

The use of motion analysis is computationally expensive for a large search region, when fast motion might be found (such as ±32 pixels). Accordingly, it may be best to augment the speed by using special-purpose hardware or a digital signal processor assisted computer.

Once motion vectors are found, together with their absolute difference measure of accuracy, they can be utilized for the complex process of attempting frame rate conversion. However, occlusion issues (objects obscuring or revealing others) will confound matches, and cannot be accurately inferred automatically. Occlusion can also involve temporal aliasing, as can normal image temporal undersampling and its beat with natural image frequencies (such as the "backward wagon wheel" effect in movies). These problems often cannot be unraveled by any known computation technique, and to date require human assistance. Thus, human scrutiny and adjustment, when real-time automatic processing is not required, can be used for off-line and non-real-time frame-rate conversion and other similar temporal processes.

De-interlacing is a simple form of the same problem. Just as with frame-rate-conversion, the task of de-interlacing is theoretically impossible to perform perfectly. This is especially due to the temporal undersampling (closed shutter), and an inappropriate temporal sample filter (i.e., a box filter). However, even with correct samples, issues such as occlusion and interlace aliasing further ensure the theoretical impossibility of correct results. The cases where this is visible are mitigated by the depth of the tools, as described here, which are applied to the problem. Pathological cases will always exist in real image sequences. The goal can only be to reduce the frequency and level of impairment when these sequences are encountered. However, in many cases, the de-interlacing process can be acceptably fully automated, and can run unassisted in real-time. Even so, there are many parameters which can often benefit from manual adjustment.

Filter Smoothing of High Frequencies

In addition to median filtering, reducing high frequency detail will also reduce high frequency noise. However, this smoothing comes at the price of loss of sharpness and detail. Thus, only a small amount of such smoothing is generally useful. A filter which creates smoothing can be easily made, as with the threshold for de-interlacing, by down-filtering with a normal filter (e.g., truncated sinc filter) and then up-filtering with a gaussian filter. The result will be smoothed because it is devoid of high frequency picture detail. When such a term is added, it typically must be in very small amounts, such as 5% to 10%, in order to provide a small amount of noise reduction. In larger amounts, the blurring effect generally becomes quite visible.

Base Layer Noise Filtering

The filter parameters for the median filtering described above for an original image should be matched to the noise characteristics of the film grain or image sensor that captured the image. After this median filtered image is down-filtered to generate an input to the base layer compression process, it still contains a small amount of noise. This noise may be further reduced by a combination of another X-Y median filters (equally averaging the X and Y medians), plus a very small amount of the high frequency smoothing filter. A preferred filter weighting of these three terms, applied to each pixel of the base layer, is:

- 70% of the original base layer (down filtered from median-filtered original above);
- 22.5% of the average of X and Y medians; and
- 7.5% of the down-up smoothing filter.

This small amount of additional filtering in the base layer provides a small additional amount of noise reduction and improved stability, resulting in better MPEG encoding and limiting the amount of noise added by such encoding.

Filters with Negative Lobes For Motion Compensation in MPEG-2 and MPEG-4

In MPEG-4, reference filters have been implemented for shifting macroblocks when finding the best motion vector match, and then using the matched region for motion compensation. MPEG-4 video coding, like MPEG-2, supports ½ pixel resolution of motion, vectors for macroblocks. Unlike MPEG-2, MPEG-4 also supports ¼ pixel accuracy. However, in the reference implementation of MPEG-4, the filters used are sub-optimal. In MPEG-2, the half-way point between pixels is just the average of the two neighbors, which is a sub-optimal box filter. In MPEG-4, this filter is used for ½ pixel resolution. If ¼ pixel resolution is invoked in MPEG-4 Version2, a filter with negative lobes is used for the half-way point, but a sub-optimal box filter with this result and the neighboring pixels is used for the ¼ and ¾ points.

Further, the chrominance channels (U =R−Y and V=B−Y) do not use any sub-pixel resolution in the motion compensation step under MPEG-4. Since the luminance channel (Y) has resolution to the ½ or ¼ pixel, the half-resolution chrominance U and V channels should be sampled using filters to ¼ pixel resolution, corresponding to ½ pixel in luminance. When ¼ pixel resolution is selected for luminance, then ⅛ pixel resolution should be used for U and V chrominance.

Experiments have shown that the effects of filtering are significantly improved by using a negative lobe truncated sinc function (as described above) for filtering the ¼, ½, and ¾ pixel points when doing ¼ pixel resolution in luminance, and by using similar negative lobes when doing ½ pixel resolution for the filter which creates the ½ pixel position.

Similarly, effects of filtering are significantly improved by using a negative lobe truncated sinc function for filtering the ⅛-pixel points for U and V chrominance when using ¼ pixel luminance resolution, and by using ¼ pixel resolution filters with similar negative lobe filters when using ½ pixel luminance resolution.

It has been discovered that the combination of quarter-pixel motion vectors with truncated sinc motion compensated displacement filtering results in a major improvement in picture quality. In particular, clarity is improved, noise and artifacts are reduced, and chroma detail is increased.

These filters may be applied to video images under MPEG-1, MPEG-2, MPEG-4 or any other appropriate motion-compensated block-based image coding system.

Imaging Device Characterization and Correction

In working with particular progressive-scan (non-interlaced) cameras, it has been experimentally determined that it is highly desirable to apply pre-processing specific to a particular camera prior to compression (either layered or non-layered). For example, in one camera type, there is a mechanical horizontal misalignment of ⅓ of a pixel between the sensors for red and green, and another ⅓ pixel between the sensors for green and blue (⅔ pixel between red and blue). This results in color fringes around tiny vertical details. These color fringes, although not visible to the eye in the original image, result in color noise in the compression/decompression process which is very visible and objectionable. A pre-process specific to this one camera type corrects this color displacement, resulting in an input to the compression which then does not have color artifacts. Thus, although invisible, such tiny nuances in the properties of cameras and their sensors become critical to the acceptability and quality of the final compressed/decompressed results.

Thus, it is useful to distinguish between "what the eye sees" vs. "what the compressor sees". This distinction has been used to advantage to discover pre-processing steps which greatly improve the quality of a compressed/decompressed image.

Accordingly, each individual electronic camera, each camera type, each film-type, and each individual film scanner and scanner type used in creating input to a compression/decompression system should be individually characterized in terms of color alignment and noise (electronic noise for video cameras and scanners, and grain for film). The information about where the image was created, a table of the specific properties, and specific settings of each piece of equipment, should be carried with the original image, and subsequently used in pre-processing prior to compression.

For example, a specific camera may require a color realignment. It may also be set on a medium noise setting (substantially affecting the amount of noise processing needed). These camera settings and inherent camera properties should be carried as side information along with each shot from that camera. This information then can be used to control the type of pre-processing, and the settings of parameters for the pre-processes.

For images which are edited from multiple cameras, or even composited from multiple cameras and/or film sources, the pre-processing should probably be performed prior to such editing and combining. Such pre-processing should not degrade image quality, and may even be invisible to the eye, but does have a major impact on the quality of the compression.

Following is a general methodology for performing and using such characterizations for non-film imaging systems (e.g., electronic cameras and film scanners) used to create images to be input into a particular compression system:

(1) Image a resolution test chart and measure the horizontal and vertical color alignment of the pixel sensors (grains, for film), by color pair (e.g., RG, RB, GB), preferably expressed in pixel units.

(2) Image one or more monochrome test charts and measure the noise generated by the sensors individually and as a set (e.g., by imaging a white card, black card, 50% and 18% gray cards, and each of red, green, and blue reference cards, preferably expressed as red, green, and blue pixel values. Determine if the noise is correlated by comparing output variations from other color channels and adjacent neighbor pixels.

(3) Convey the measured information created by the measured device along with the image (e.g., by electronic transmission, storage on a machine readable medium, or by human-readable data accompanying the image).

(4) Before using images from the imaging system in a compression process, translate the pixels, by color, by an equal offset amount to correct for any measured misalignment. For example, if the red sensor is misaligned 0.25 pixels below the blue sensor, then all red pixels in an image should be shifted upwards by 0.25 pixels. Similarly, based on the measured amounts of noise, adjust the noise reduction filter weights by an amount that compensates for the amount of measured noise (this may need to be empirically determined and defined in a manual or computerized look-up table).

Following is a general methodology for performing and using such characterizations for film imaging systems used to create images to be input into a particular compression system:

(1) Determine the film type (grain varies by film type).

(2) Expose the film to one or more monochrome test charts under a variety of lighting conditions (noise is in part a function of exposure).

(3) Scan the film at normal speed through a film scanner (whose characteristics are measured as above) and measure the noise generated by the sensors individually and as a set. Determine if the noise is correlated.

(4) Whenever film of the same type is exposed and then scanned by the measured scanner, convey the determined and measured information (i.e., film type, exposure conditions, scanning characteristics) along with the scanned film image.

(5) Before using such images in a compression process, adjust the noise reduction filter weights by an amount that compensates for the amount of measured noise (this may need to be empirically determined and defined in a manual or computerized look-up table; a computer is preferable because the adjustment may be a function of at least three factors: film type, exposure conditions, and scanning characteristics).

Enhanced 3-2 Pulldown System

It is a common and highly disliked practice for film to be transferred to 60 Hz video using the 3-2 pulldown method described above. The 3-2 pulldown method is used because 24 frames per second do not divide evenly into 59.94 or 60 fields per second for existing NTSC (and some proposed HDTV) systems. The odd frames (or even) are placed on two of the interlaced fields, and the even frames (or odd) are placed on three of the interlaced fields. Thus, one field is a duplicate in every five fields. One frame of film maps to five fields of video. As noted above, this process leads to numerous unpleasant problems.

Most video processing equipment only applies its process to an immediate signal. With this being the case, a time-changing effect will operate differently on one field than the next, even though some of the input fields were duplicates. After such processes, the fields are no longer duplicates, nor can field pairs be recombined to recover the original film frames. Examples of such processes, occurring at the field rate, include pan-and-scan (to move narrow 4:3 video screens horizontally across widescreen images to show important action), fade up or down, gradual color adjust, video title overlay scroll, etc. Further, if such a signal is captured on film, and then edited and processed on video, the frame processing of the film, and the field processing of the video, are horribly intermixed in an inextricable manner. When such a video signal (which occur widely) is then fed to an image compression system, the system generally performs sub-optimally.

Experiments have shown that, to date, the best image compression from a film source occurs only when the 24 fps images of the film can be perfectly re-extracted from the video signal (or better yet, never leave the 24 fps realm). Then the compression system can code the movie (or film-based TV show or commercial) at the original 24 fps rate of the original film. This is the most efficient manner of compression. Some movie-on-demand systems and DVD mastering systems are careful to apply 3-2 pulldown and editing in very limited ways, to ensure that the 24 fps original frames can be finally extracted and compressed at 24 fps.

However, such care is "open loop", and is often violated by normal human error. The complexity of editing and applying post-production effects to a production often leads to "mistakes" where field-rate processing occurs. Accordingly, a preferred methodology that avoids such a possibility and eliminates the complexity of attempting to keep track of everything so as to avoid such errors, is as follows:

(1) Whenever possible, utilize equipment for film processing which supports direct 24 fps storage, processing, or communication.

(2) Use electronic or fast optical media (e.g., hard drive and/or RAM) for local storage, and store all film images at their native 24 fps rate.

(3) Whenever a device takes 3-2-pulldown video as an input, make the 3-2 pulldown on the fly (in real time) converted from local storage (which is kept at 24 fps).

(4) When storing the output of any device which produces and communicates 3-2 pulldown images, undo the 3-2 pulldown on the fly, and store again at 24 fps.

(5) Eliminate all devices from the system which must operate only on fields such that frames cannot be preserved with common processing (for 2 and for 3 fields, as one frame).

(6) Set all software which performs effects or editing on the stored image sequences to match the 24 fps mode which is used on the storage media; use no software which cannot operate in 24 fps native mode.

(7) Telecine (i.e., convert from film to video) all original images with a deterministic cadence (i.e., either always 3 then 2, or 2 then 3) if the telecine does not provide direct 24 fps output. Undo the cadence immediately after the interlaced 3-2 pulldown interface from the telecine.

(8) If a tape is received with an unknown 3-2 pulldown cadence, the cadence must be discovered by some method, and removed prior to storage. This can be done with hardware detecting systems, software detecting systems, or manually/visually. Unfortunately, no hardware detection systems are perfect, so manual visual inspection may always be required. (Current systems attempt to detect field misalignment. Such misalignment cannot presently be detected on black or white frames, or any constant value field of image brightness. Even with detectable misalignment, some detectors fail due to noise or algorithmic weaknesses.)

(9) Any tape storage output from the facility requiring 3-2 pulldown will be stored in a known cadence which is maintained purely, and not disturbed for the entire running time of the program.

By this methodology, any particular processing device requiring 3-2 pulldown as input and output will get its input(s) made on the fly in real time from a 24 fps source. The cadence will always begin in a standard way for each input. The cadence of the device's output is then known, and must be identical to the cadence created on the fly as the devices' input. The cadence is then un-done by this a priori knowledge, and the frames are saved in 24 fps format on the storage medium.

This methodology requires real-time 3-2 pulldown undo and 3-2 pulldown synthesis. Unless the cadence comes from tape in an unknown format, the 24 fps nature of the frames will automatically be preserved by such a film-based telecine post-production system. The system will then automatically form an optimal input to compression systems (including layered compression process described above).

This process should be broadly useful in video and HDTV telecine facilities. Someday, when all devices accept a 24 fps (and other rate progressive scan) native signal input, output, processing, and storage modes, such a methodology will no longer be needed. However, in the interim, many devices require 3-2 pulldown for the interface in and out, even though the devices have a targeted function to operate on film input. During this interim, the above methodology eliminates 3-2 pulldown problems and can be an essential element of the efficiency of post-production and telecine of film.

Frame Rate Methods for Production

Although 24 fps has formed a world-wide standard for motion picture film, the use of 24 fps results in jumpy motion in many cases (also called "stutter" due to the multiple repeat flashes of a frame before moving to the next). Higher frame rates are desirable to provide smoother motion, a clearer picture for moving objects, as well as allowing slow motion (by capturing the images at a high frame rate, but playing them at a slower rate). As noted above, the video rate in the U.S. of 60 fps (and 59.94 fps in broadcast video) is relatively incompatible with 24 fps. This creates problems when attempting to release a movie worldwide, since 50 Hz PAL and SECAM video systems are relatively incompatible with 60 fps NTSC video and 60 Hz-centric US HDTV.

U.S. patent application Ser. No. 09/435,277 (entitled "System And Method For Motion Compensation and Frame Rate Conversion", filed Nov. 5, 1999, and assigned to the assignee of the present invention) teaches techniques which can perform difficult frame rate conversions such as 60 Hz to/from 50 Hz as well as 60 Hz to/and/from 72 Hz. These techniques also provide de-interlacing, in addition to frame rate conversion.

The results in using the frame rate conversion techniques taught in such application to convert between nearby high frame rates, such as 60 Hz to/from 50 Hz, or 60 Hz to/from 72 Hz, have been very successful (they look quite good), although computationally expensive. However, 24 Hz to/from 60 Hz has proven to be quite difficult using motion analysis. At 24 fps, frames differ substantially, especially in having differing amounts of motion blur on each frame (as with the cockpit scenes from the movie "Top Gun"). This makes motion analysis, as well as subsequent frame rate conversion, difficult from a 24 fps source. Further, it is not possible to remove motion blur, so that even if motion analysis were possible on high-motion 24 fps scenes, the images would still be blurry (although they would move more smoothly with less stutter). Since motion analysis involves matching portions of an image, frames which have widely differing amounts of motion blur from adjacent frames become nearly impossible to match up. Thus, 24 fps source material from film (or electronic cameras) is a poor starting point for frame rate conversions to 50 Hz or 60 Hz video.

This leads to the conclusion that high frame rate electronic cameras are a much better image source than 24 fps electronic cameras. However, given the difficulties in converting from 60 fps video back to 24 fps film, 72 fps is a much better camera frame rate for eventual 24 fps compatibility.

Experiments have shown that a good quality 24 fps moving image can be derived from 72 fps frames through use of a very simple weighted frame filter. The best weightings for three consecutive frames (previous, current, and next) from a 72 fps source to yield one frame at 24 fps is centered about weightings of [0.1667, 0.6666, 0.1667]. However, any set of three frame weightings in the range [0.1, 0.8, 0.1] to [0.25, 0.5, 0.25] seem to work well. There is emphasis on the center frame, which helps strike a balance between the clarity of a single frame, due to the short motion blur, plus the needed blur from the adjacent frames in order to help smooth the stutter of 24 fps motion (by simulating 24 fps motion blur).

This weighting technique works well in about 95% of all cases, allowing this simple weighting function to provide the majority of the 24 fps conversions. For the remaining 5% or so of the cases, motion compensation can be used, as taught in U.S. patent application Ser. No. 09/435,277. By having reduced the workload on the conversion process by a factor of 20 by this simple weighting technique, the remaining motion-compensated conversions become more practical when needed.

It should also be noted that a 120 fps source can be used with five weightings to achieve a similar results at 24 fps. For example, weightings of [0.1, 0.2, 0.4, 0.2, 0.1] may be used. Also, 60 fps can be derived from 120 fps by taking every other frame, although the shorter open shutter duration will be noticeable on fast motion. In order to reduce this problem, an overlapping filter can also be used (e.g., preferably about [0.1667, 0.6666, 0.1667], but may be in the range [0.1, 0.8, 0.1] to [0.25, 0.5, 0.25]), repeating the low-amplitude weighted frames. Of course, even higher frame rates allow even more careful shaping of the temporal sample for deriving 24 fps and other frame rates. As the frame rates become very high, the techniques of U.S. Pat. Nos. 5,465,119 and 5,737,027, assigned to the assignee of the present invention, begin to apply, since methods are needed to reduce the data rate within each frame in order to keep the data transfer rate manageable. However, on-chip parallel processing in the sensor (e.g., active pixel or CCD) can provide an alternative means to reduce the off-chip I/O rates required.

Given that 24 fps is desired for economic viability of new 72 fps (and other) frame rate formats, it is also important to be able to monitor the images at 24 fps, using the temporal filter weighting function described here (e.g., 0.1667, 0.6666, 0.1667). By doing so, the "blocking" (setting up) of the shots in a scene can be checked to ensure that the 24 fps results will look good (in addition to the 72 fps or other higher rate full-rate versions). In this way, the benefits of high frame rate capture are fully integrated with the capability to provide 24 fps international film and video release.

Thus, certain select higher frame rates form the most suitable basis for creating both a high-frame-rate electronic image source for the future, as well as being backward-compatible with today's existing 24 fps film and worldwide video releasing infrastructure.

Modular Bit Rate

It is useful in many video compression applications to "modularize" the bit rate. Variable bit rate systems have used continuously varying bit rates to attempt to apply more bits to faster changing shots. This can be done in a coarse way by giving each useful unit a different bit rate. Examples of suitable units include a range of frames (a "Group of Pictures," or GOP) or each P frame. Thus, for example, the bit rate might be constant within a GOP. However, for GOPs where high compression stress is detected (e.g., due to high motion or scene change), a higher constant bit rate can be utilized. This is similar to the above-described layering technique of applying all of the bits in an enhancement layer to the base layer during periods of high stress (typically resetting at the next I frame). Thus, in addition to the concept of applying more bits to the base layer, more bits can be applied to single layer compressions, or to the base and enhancement layer (in the case of layered compression), so as to yield high quality during periods of high stress.

It is typically the case that low bit rates can handle 90% of the time in a movie or live event. For the remaining 10% of the time, using 50% or 100% more bits generally will yield a near perfect encoding, while only increasing the overall bit count by 5% to 10%. This proves to be a very efficient way to get essentially visually perfect encodings, while generally coding to a constant bit rate (thereby retaining most of the modularity and processing advantages of a constant bit rate).

The use of such higher bit rate periods can be either manually or automatically controlled. Automatic control is possible using the rate-control quantization scale factor parameter, which gets large (to keep the bit rate from greatly increasing) under periods of high stress. Such high stress thus can be detected, signaling that either the remainder of the GOP should be coded at a higher bit rate, or else the GOP should be re-coded beginning at the starting I frame, using a higher bit rate. Using visual inspection, a manual selection can also be used to flag GOPs requiring a higher bit rate.

Figure 17:
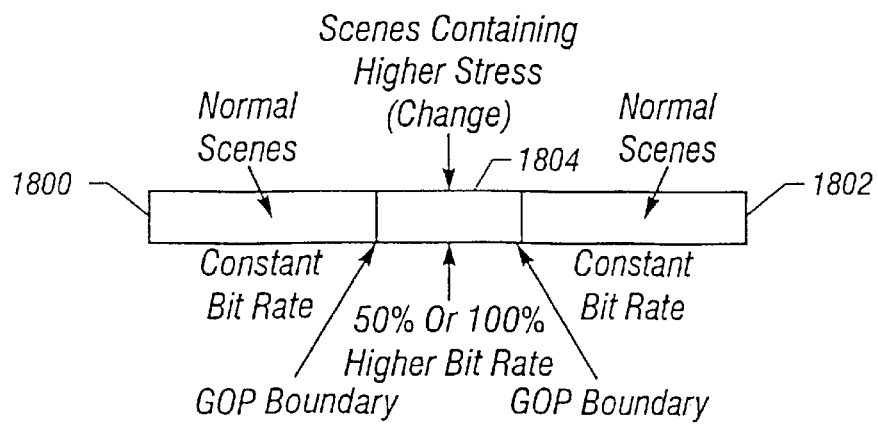
FIG. 17 is a diagram of one example of applying higher bit rates to modular portions of a compressed data stream.

It is beneficial to real-time decoding to take advantage of the fact that GOP's generally have a specific size. Thus, using simple multiples of a GOP (e.g., a 50% or 100% increase in the number of bits for GOPs having high stress) also retains much of this advantage. FIG. 17 is a diagram of one example of applying higher bit rates to modular portions of a compressed data stream. Groups of pictures containing normal scenes 1800, 1802 are allocated bits at a constant rate. When a GOP 1804 occurs that contains a scene exhibiting a high level of stress (i.e., changes that are difficult for the compression process to compress as much as "normal" scenes), a higher number of bits (e.g., 50–100% additional) are allocated to that GOP to allow more accurate encoding of the scene.

It should be noted that many MPEG-2 implementations use a constant bit rate. Constant bit rate provides a good match with constant bit rate transport and storage media. Transport systems such as broadcast channels, satellite channels, cables, and fibers, all have a fixed constant total capacity. Also, digital compressed video tape storage systems have a constant tape playback rate, thereby yielding a constant recording or playback bit rate.

Other MPEG-2 implementations, such as DirecTV/DSS, and DVD, use some form of variable bit rate allocation. In the case of DirecTV/DSS, the variability is a combination of scene stress in the current program vs. scene stress in adjacent TV programs which share a common multiplex. The multiplex corresponds to a tuned satellite channel and transponder, which has a fixed total bit rate. In the case of consumer video DVD, the digital optical disk capacity is 2.5 Gbytes, requiring that the MPEG-2 bit rate average 4.5 mbits/s for a two-hour movie. However, the optical disk has a peak reading rate capability of 100% higher, at 9 mbits/s. For a shorter movie, the average rate can be higher, up to the full 9 mbits/s. For a two-hour movie, the way that the bit rate achieves an average of 4.5 mbits/s is that a rate above this is used for scenes having high scene stress (high change due to rapid scene motion), while a rate below this average is used during low scene stress (low change due to little motion).

The bit rate in MPEG-2 and MPEG-4 is held constant by a combination of modeling of a virtual decoder buffer's capacity, and by varying the quantization parameter to throttle the bit rate emitted from the encoder. Alternatively, a constant quantization parameter will yield a variable number of bits, in proportion to scene change and detail, also known as scene "entropy". A constant quantization parameter yields relatively constant quality, but variable bit rate. A varying quantization parameter can be used in conjunction with a size bounded decoder buffer to smooth out any variability and provide a constant bit rate.

The sharing of many channels in a multiplex is one method that can support variable bit rate, as with DirecTV, or with standard definition signals in the ACATS/ATSC 19.3 mbits/s 6 Mhz multiplex. The statistics of high entropy shows (fast sports, like hockey) paired with low entropy shows (like talk shows), allows instantaneous tradeoff in the application of bits to shows having more entropy. Slow periods in one show use fewer bits, providing more bits for a fast moving simultaneous alternate show in the same multiplex.

It should be noted that these variable bit rate systems have a peak bit rate, usually somewhere near 100% above the average. Thus, these systems become constant bit rate systems at the highest bit rate, limiting the peak bit rate available for periods of continued high scene stress. There is also a limit to the input bit rate in some MPEG-2 decoder systems, also limiting the peak bit rate in such variable bit rate systems. However, this limit on peak input bit rate is gradually rising well above these other limits, as decoders improve.

The general concept of each of these prior bit rate control systems is that there is a small memory buffer in the decoder, holding somewhere between a fraction of a frame and a few frames of moving image. At the time this decoder bit rate buffer was conceived, around 1990, there was concern that the memory cost of this buffer in decoders would have a significant affect on the decoder's price. However, as of the present, the cost of this buffer has proven insignificant. In fact, many seconds' worth of buffer is now an insignificant cost. It may be extrapolated that, in the near future, the bit receiving memory buffer may hold many minutes of video information at insignificant cost. Further, the cost of disk and other storage media has also fallen rapidly, while capacity has increased rapidly. It is therefore also reasonable to spool the compressed bitstream to disk or other storage memory systems, thereby yielding many hours or days worth of storage capacity. This is currently being done by commercially available harddrive based home video recorders.

One fundamental issue remains, however, which is that there will be time delay while bits wait in a compressed bit buffer. For broadcast television and movie distribution, a delay of several seconds or tens of seconds would have little affect on viewing, as long as an auxiliary selection stream is available to guide ongoing program "tune-in" or "movie selection" or where the initial start (of a movie, for example) uses a shortened delay through a small initial buffer. However, for teleconferencing or live interactive events, a small fast running buffer may be required in order to minimize delay. With the exception of live interactive and teleconferencing applications, inexpensive large buffers can be utilized to improve quality.

In light of these trends, the architecture of variable and constant bit rate compression techniques can be significantly improved. These improvements include:

Greatly increasing the buffer size in the decoder buffer model, thereby providing much of the benefits of variable bit rate and constant bit rate simultaneously.

Pre-loading of "interstitial" show titles, to support instantaneous change to the titles, while decoder buffers begin to fill.

Utilizing a partially-filled FIFO (first in, first out) decoder bit rate buffer at the beginning of newly starting programs or movies and gradually increasing the buffer fullness (and therefore delay) as the program progresses after starting.

Pre-loading into decoder bit memory (e.g., using a second FIFO, main memory, or even spooling to disk) increased bit rate "modules" (using the modular bit rate concept described above) to augment the average bit rate during periods of high scene stress. Such. "pre-loading" can allow periods of bit rate which exceed the average bit rate in constant bit rate channels, but also which exceed the maximum bit rate in variable bit rate systems.

In the layered structure of the invention, all of the bits in the average (or constant) bit rate stream could be shunted to the base layer during scenes having high scene stress. However, the enhancement layer bits for a scene can be pre-loaded for that scene, and can also be played out using a timing marker for synchronization. Note again that maximum (or constant) bit rate limits in transport and/or playback can be exceeded for periods of time (limited only by amount of available buffer space) using this technique.

Multi-Layer DCT Structure

Variable DCT Block Size

Figure 18:
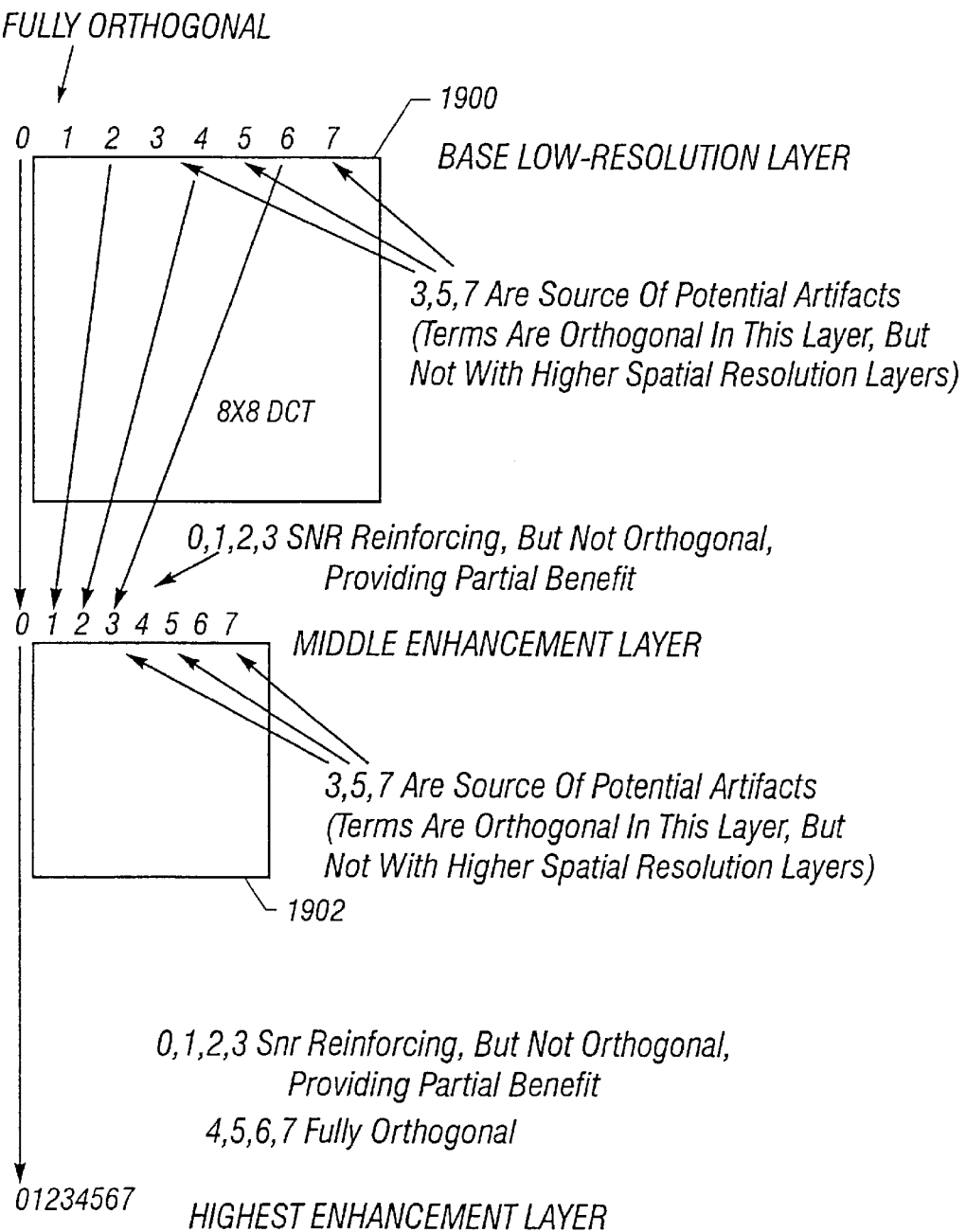
FIG. 18 graphically illustrates the relationships of DCT harmonics between two resolution layers.
Figure 19:
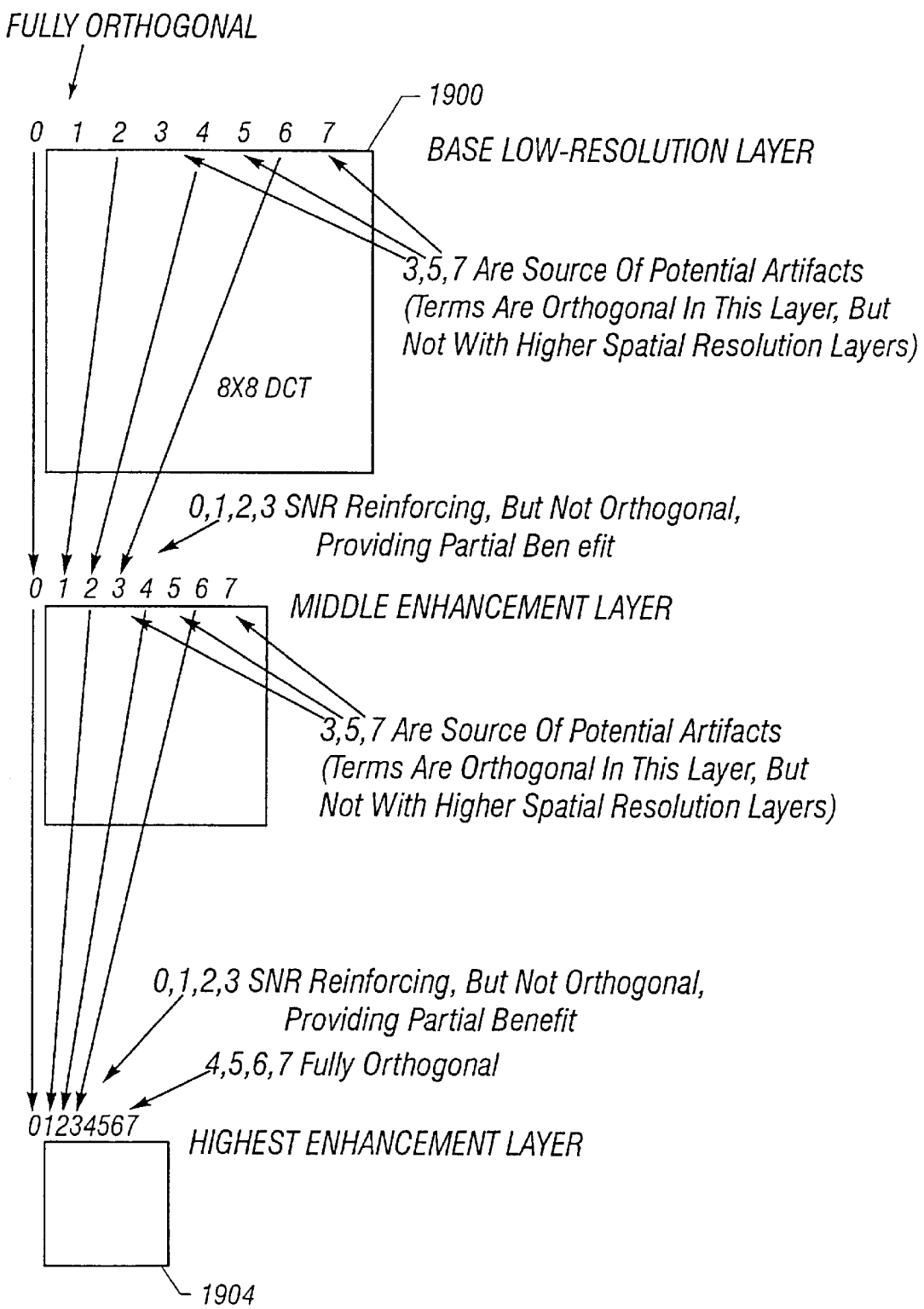
FIG. 19 graphically illustrates the similar relationships of DCT harmonics between three resolution layers.

Fundamental to a layered DCT structure is the harmonic alignment of the transform wavelengths. For example, FIG. 18 graphically illustrates the relationships of DCT harmonics between two resolution layers. In a currently optimal two layer configuration of the invention, the base layer utilizes DCT coefficients using an arithmetic harmonic series having frequencies of 1, 2, 3, 4, 5, 6, and 7 times the 8×8 pixel DCT block size 1900. At the factor-of-two resolution enhancement layer, these base layer harmonics then map to frequencies of ½, 1, 3/2, 2, 5/2, 3, and 7/2 of the corresponding enhancement layer DCT block 1902. Although there is no penalty for the ½ term, since its frequency is entirely held in the base layer, the remaining terms only partially harmonize with the enhancement layer. For example, frequencies of 2, 4, and 6 times the macroblock size from the base layer are aligned with frequencies of 1, 2, and 3 times the macroblock size from the enhancement layer. These terms form a natural signal-to-noise ratio (SNR) layering, as if additional precision were applied to these coefficients in the base layer. The 3, 5, and 7 terms from the base layer are non-harmonic with the enhancement layer, and therefore represent orthogonality to the base layer only, providing no synergy with the enhancement layer. The remaining terms in the enhancement layer, 4, 5, 6, and 7, represent additional detail which the enhancement layer can provide to the image, without overlap with the base layer. FIG. 19 graphically illustrates the similar relationships of DCT harmonics between three resolution layers, showing a highest enhancement layer 1904.

It can be seen that there is only partial orthogonality and partial alignment in this structure. While this alignment and orthogonality is mostly beneficial, the phase alignment of the DCT coding series was never optimized for two (or more) spatial resolution layers. Rather, the DCT was designed as a single set of orthogonal basis functions utilizing phase characteristics which eliminated the phase-carrying imaginary terms from the Fourier transform series. While the DCT is demonstrably adequate in coding performance in a two-layer spatial coding structure, these issues of layer orthogonality and phase relationships become central to the expansion of the layered structure to three or four spatial resolution layers.

A solution to providing cross-layer orthogonality is to utilize different DCT block sizes for each resolution layer. For example, if a given layer doubles the resolution, then the DCT block size will be twice as large. This results in a harmonically aligned resolution layering structure, providing optimal coding efficiency due to optimal inter-layer coefficient orthogonality.

Figure 20:
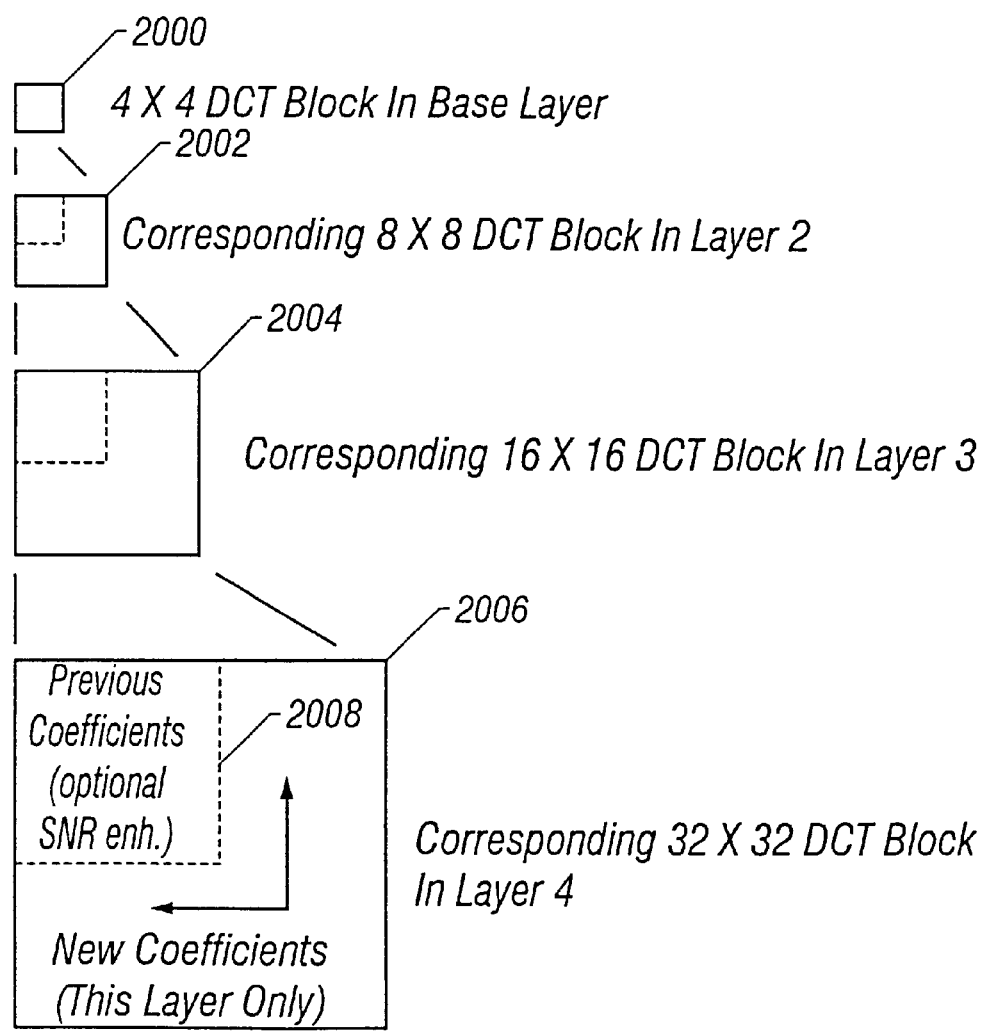
FIG. 20 is a diagram showing a set of matched DCT block sizes for multiple resolution layers.

FIG. 20 is a diagram showing various DCT block sizes for different resolution layers. For example, a 4×4 pixel DCT block 2000 could be used at the base layer, an 8×8 pixel DCT block 2002 could be utilized at the next layer up, a 16×16 pixel DCT block 2004 could be utilized at the third layer, and a 32×32 pixel DCT block 2006 could be utilized at the fourth layer. In this way, each layer adds additional harmonic terms in full orthogonality to the layer(s) below. Optionally, additional precision (in the SNR sense) can be added to previously covered coefficient terms. For example, the 16×16 pixel subset 2008 in the 32×32 pixel block 2006 can be used to augment (in an SNR improvement sense) the precision of the 16×16 pixel DCT block 2004.

Motion Vectors

In MPEG-2, macroblocks corresponding to motion vectors consist of 16×16 pixels, organized as four 8×8 DCT blocks. In MPEG-4, each macroblock can optionally be further subdivided into 8×8 regions, corresponding to the DCT blocks, each having their own motion vector.

Even though the DCT blocks preferably have differing sizes in each layer, the motion compensation macroblocks need not be constrained by this structure. The simplest structure is where the single motion vector for each base layer motion compensation macroblock applies to all higher layers as well, eliminating motion vectors from all enhancement layers entirely, since the motion is specified by the base layer's motion vector for all layers together. A more efficient structure, however, is to allow each layer to independently select (1) no motion vector (i.e., use the base layer motion vector), (2) additional sub-pixel precision for the base layer's motion vector, or (3) split each motion compensation macroblock into two, four, or other numbers of blocks each having independent motion vectors. The technique of overlapped block motion compensation (OBMC) in MPEG-4 could be utilized to smooth the transition between the independent blocks motion compensation being moved. The use of negative-lobed filters for sub-pixel placement, as specified in other parts of this description, is also beneficial to the motion compensation of this DCT layer structure.

Figure 21:
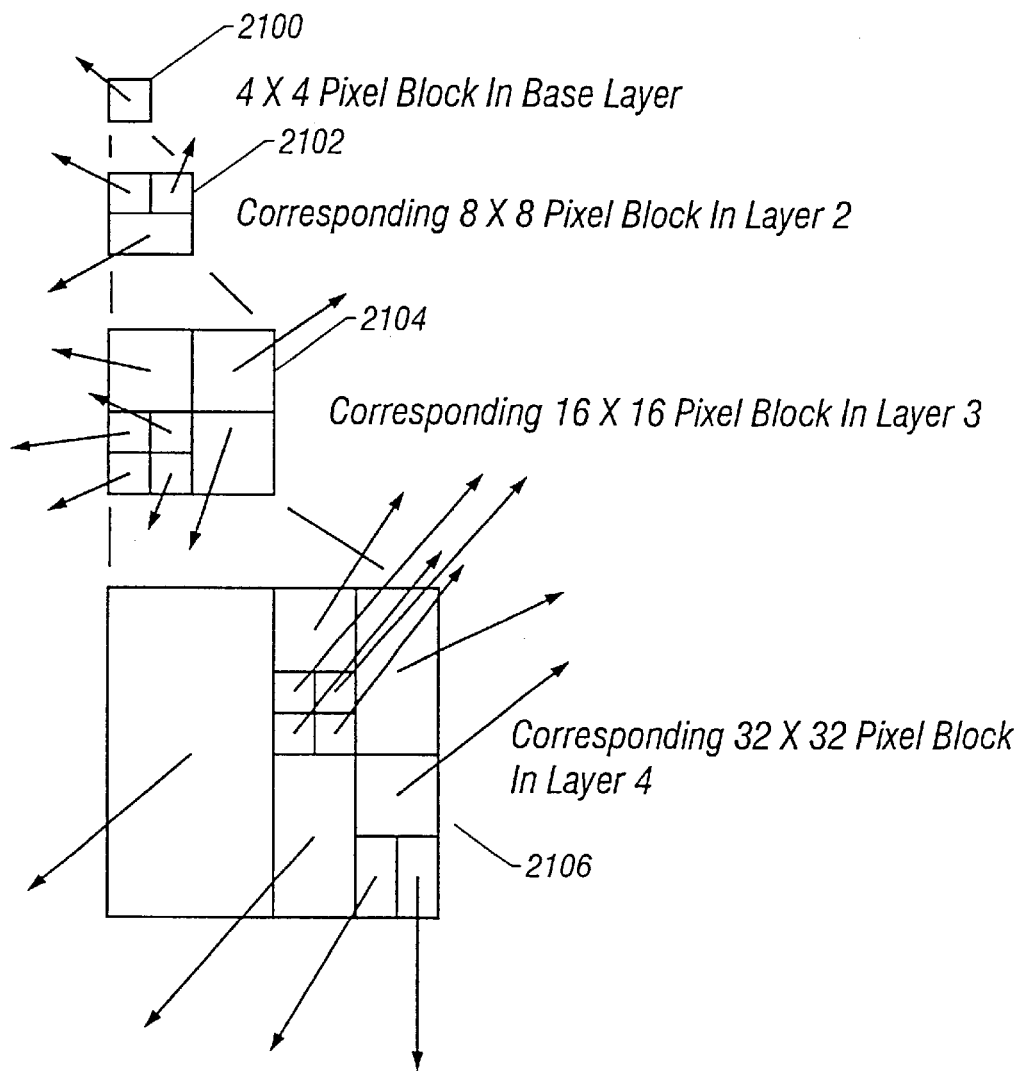
FIG. 21 is a diagram showing examples of splitting of motion compensation macroblocks for determining independent motion vectors.

Thus, each DCT block at each layer may be split into as many motion vector blocks for motion compensation as are optimal for that layer. FIG. 21 is a diagram showing examples of splitting of motion compensation macroblocks for determining independent motion vectors. For example, the base layer, if constructed using 4×4 pixel DCT blocks 2100, could utilize from one (shown) to as many as 16 motion vectors (one for each pixel), or even utilize sub-pixel motion vectors. Correspondingly, each higher level can split its larger corresponding DCT block 2102, 2104, 2106 as appropriate, yielding an optimal balance between coding prediction quality (thus saving DCT coefficient bits) vs. the bits required to specify the motion vectors. The block split for motion compensation is a tradeoff between the bits used to code the motion vectors and the improvement in picture prediction.

The use of guide vectors from motion vectors for lower layers to predict each higher layer's motion vectors, as described in other portions of this description, also improves coding efficiency and effectiveness.

Variable Length Coding Optimization

The variable length codes (such as Huffman or arithmetic codes) used by MPEG-1, MPEG-2, MPEG-4, H.263, and other compression systems (including wavelets and other DCT and non-DCT systems) are selected based upon demonstrated efficiency on a small group of test sequences. These test sequences are limited in the types of images, and only represent a relatively narrow range of bit rate, resolution, and frame rate. Further, the variable length codes are selected based upon average performance over each test sequence, and over the test sequences as a group.

Experimentation has shown that a substantially more optimal variable length coding system can be obtained by (1) applying specific variable length coding tables to each frame and (2) selecting the most optimal codes for that particular frame. Such a selection of optimal variable length codes can applied in units smaller than a frame (a part or region of a frame), or in groups of several frames. The variable length codes used for motion vectors, DCT coefficients, macroblock types, etc., can then each be independently optimized for the instantaneous conditions of a given unit (i.e., frame, sub-frame, or group of frames) at that unit's current resolution and bit rate. This technique is also applicable to the spatial resolution enhancement layers described in other parts of this description.

The selection of which group of variable length codes is to be used can be conveyed with each frame (or subpart or group) using a small number of bits. Further, custom coding tables can be downloaded where reliable data transmission or playback is available (such as with optical data disk or optical fiber networks).

Note that the existing coding tables used by MPEG-1, MPEG-2, MPEG-4, H.263, DVC-Pro/DV, and other compression systems are pre-defined and static. Thus, application of the this aspect of the invention would not be backwards compatible, but may be forward compatible with future coding systems.

Augmentation System For MPEG-2 and MPEG-4

At present, there is a large installed base of MPEG-2 capable decoders. For example both DVD players and DirecTV satellite receivers are now in millions of homes. The improvement which MPEG-4 video compression coding could offer beyond MPEG-2 is not yet available, since MPEG-4 is incompatible with MPEG-2. However, MPEG-4 and MPEG-2 are both motion-compensated DCT compression system, sharing a common basic structure. The composition system in MPEG-4's video coding system is fundamentally different from MPEG-2, as are some other expanded features. In this discussion, only the full frame video coding aspects of MPEG-4 are being considered.

Although there are many differences between MPEG-4 and MPEG-2, the following are the main differences:

(1) MPEG-4 can optionally split a 16×16 macroblock into four 8×8 blocks, one for each DCT, each having an independent motion vector.

(2) MPEG-4 B-frames have a "direct" mode, which is a type of prediction.

(3) MPEG-4 B-frames do not support "I" macroblocks, unlike MPEG-2 which does support "I" macroblocks in B-frames.

(4) The DCT coefficients in MPEG-4 can be coded by more elaborate patterns than with MPEG-2, although the well-known zigzag pattern is common to both MPEG-2 and MPEG-4.

(5) MPEG-4 supports 10-bit and 12-bit pixel depths, whereas MPEG-2 is limited to 8 bits.

(6) MPEG-4 supports quarter-pixel motion vector precision, whereas MPEG-2 is limited to half-pixel precision.

Some of these differences, such as the B-frame "direct" mode and "I" macroblocks, are fundamental incompatibilities. However, both of these coding modes are optional, and an encoder could chose to use neither of them (at a small efficiency loss), thereby eliminating this incompatibility. Similarly, an encoder could restrict the coding patterns in MPEG-4 for DCT coefficients to provide for better MPEG-2 commonality (again at a small efficiency loss).

The thee remaining major items, the 8×8 four-way block split, the quarter-pixel motion vector precision, and the 10-bit and 12-bit pixel depths, could be considered to be "augmentations" to the basic structure which MPEG-2 already provides.

Figure 22:
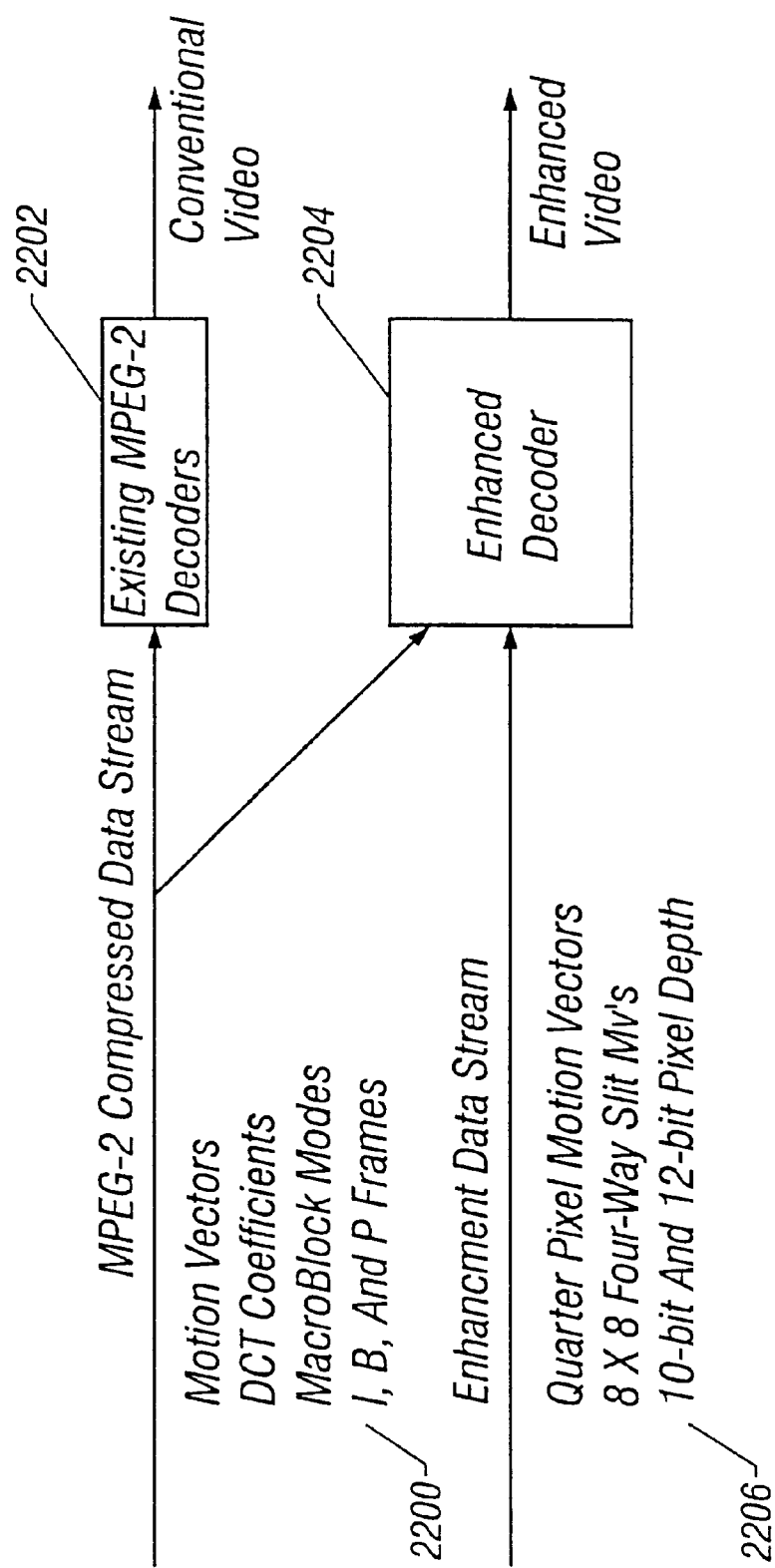
FIG. 22 is a block diagram showing an augmentation system for MPEG-2 type systems.

This aspect of the invention takes advantage of the fact that these "augmentations" can be provided as separate constructs. Accordingly, they can be coded separately and conveyed as a separate augmentation stream together with a standard MPEG-2 or MEPG-4 stream. This technique can also be used with MPEG-1, H.263, or any other video coding system which shares a common motion-compensated DCT structure. FIG. 22 is a block diagram showing an augmentation system for MPEG-2 type systems. A main compressed data stream 2200 (shown as including motion vectors, DCT coefficients, macroblock mode bits, and I, B, and P frames) is conveyed to a conventional MPEG-2 type decoder 2202 and to a parallel enhanced decoder 2204. Concurrently, an enhanced data stream 2206 (shown as including quarter-pixel motion vector precision, 8×8 four-way block split motion vectors, and 10-bit and 12-bit pixel depths) is conveyed to the enhanced decoder 2204. The enhanced decoder 2204 would combine the two data streams 2200, 2206 and decode them to provide an enhanced video output. Using this structure, any coding enhancements can be added to any motion-compensated DCT compression system.

The use of this structure can be biased by an encoder toward more optimal MPEG-2 decoding, or toward more optimal enhanced decoding. The expectation is that such enhanced decoding, by adding MPEG-4 video coding improvements, would be favored, to achieve the optimal enhanced picture quality, with a small compromise in quality to the MPEG-2 decoded picture.

For example, in the case of MPEG-4 enhancements to MPEG-2 video coding, the MPEG-2 motion vectors can be used as "predictors" for the four-way split motion vectors (in those cases where MPEG-4 chooses to split four ways), or may be used directly for non-split 16×16 macroblocks. The quarter pixel motion vector resolution can be coded as one additional bit of precision (vertically and horizontally) in the enhanced data stream 2206. The extra pixel depth can be coded as extra precision to the DCT coefficients prior to applying the inverse DCT function.

The spatial resolution layering which is a principal subject of this invention performs most optimally when the base layer is as perfectly coded as possible. MPEG-2 is an imperfect coding, yielding degraded performance for resolution enhancement layers. By using this augmentation system, the base layer can be improved, for example, by using the MPEG-4 improvements described above (as well as other improvements set forth in this description) to augment the MPEG-2 data stream that encodes the base layer. The resulting base layer, with accompanying enhancement data stream, will then have most of the quality and efficiency that would have been obtained using an improved base layer which would have resulted from better coding (such as with MPEG-4 and the other improvements of this invention). The resulting improved base layer can then have one or more resolution enhancement layers applied, using other aspects of this invention.

The other improvements of this invention, such as the better filters with negative lobes for motion compensation, can also be invoked by the augmented enhanced decoder, thus yielding further improvements beyond those provided by MPEG-4 or other motion compensated compression systems.

Guide Vectors For The Spatial Enhancement Layer

Motion vectors comprise a large portion of the allocated bits within each resolution enhancement layer created in accordance with the invention. It has been determined that it is possible to substantially reduce the number of bits required for enhancement layer motion vectors by using the corresponding motion vectors at the same position in the base layer as "guide vectors". The enhancement layer motion vectors are therefore coded by only searching for a small search range about the corresponding guide vector center from the base layer. This is especially important with MPEG-4 enhancement layers, since each macroblock can optionally have 4 motion vectors, and since quarter-pixel resolution of motion vectors is available.

Figure 23:
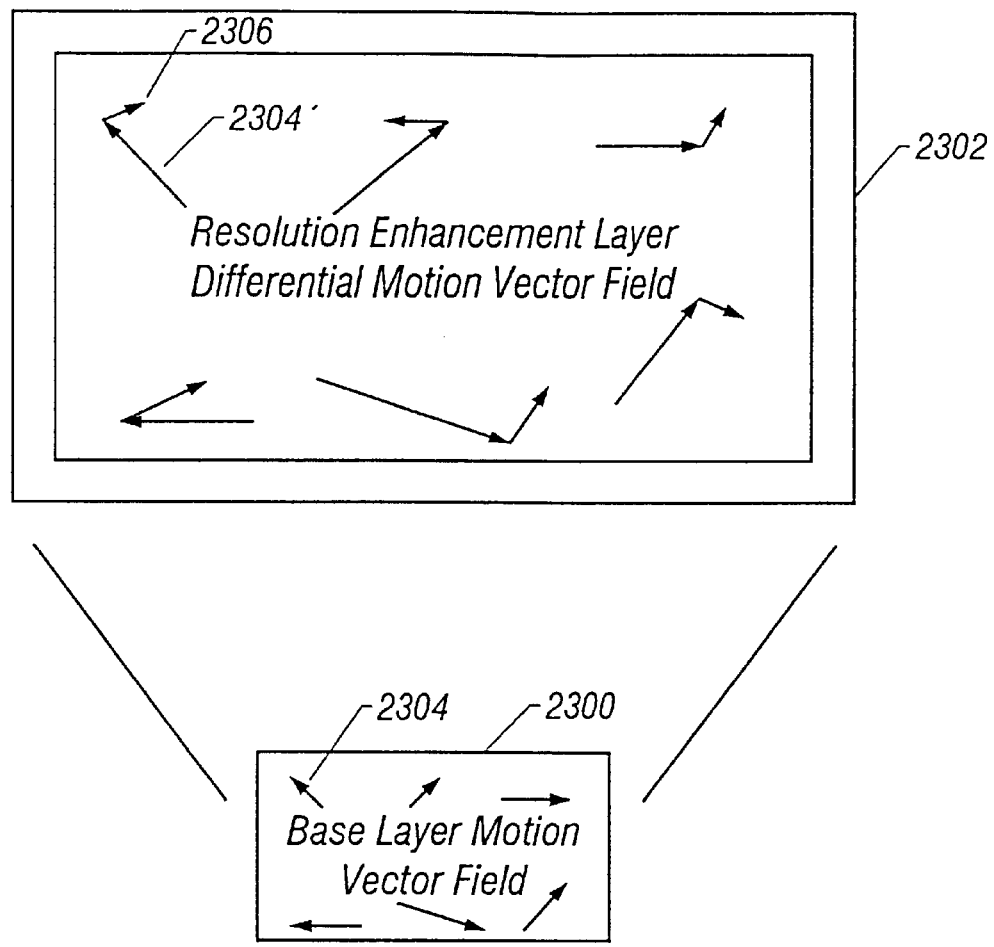
FIG. 23 is a diagram showing use of motion vectors from a base layer as guide vectors for a resolution enhancement layer.

FIG. 23 is a diagram showing use of motion vectors from a base layer 2300 as guide vectors for a resolution enhancement layer 2302. A motion vector 2304 from the base layer 2300, after expansion up to scale of the resolution enhancement layer 2302, serves as a guide vector 2304' for refinement of the motion vectors for the enhancement layer 2302. Accordingly, only a small range need be searched to find the corresponding enhancement layer 2302 motion vector 2306. The process is the same for all of the motion vectors from the base layer. For example, in MPEG-4 a 16×16 pixel base layer macroblock may optionally be split into four 8×8 pixel motion vector blocks. A corresponding factor-of-two enhancement layer would then utilize the co-located motion vectors from the base layer as guide vectors. In this example, a motion vector from one of the 8×8 motion vector blocks in the base layer would guide the search for a motion vector in a corresponding 16×16 pixel macroblock in the enhancement layer. This 16×16 block could optionally be further split into four 8×8 motion vector blocks, all using the same corresponding base layer motion vector as a guide vector.

These small search range motion vectors in the enhancement layer are then coded much more efficiently (i.e., fewer bits are required to code the smaller enhancement layer motion vectors 2306). This guide-vector technique is applicable to MPEG-2, MPEG-4, or other appropriate motion-compensated spatial resolution enhancement layer(s).

Enhancement Modes

FIGS. 24A–24E are data flow diagrams showing on example professional level enhancement mode. This figures shows picture data (including intermediate stages) in the left column, processing steps in the middle column, and output in the right column. It should be noted that this is just one example of how to combine a number of the processing steps described herein. Different combinations, simpler as well as more complex, can be configured to achieve different levels of compression, aspect ratios, and image quality.

Figure 24A:
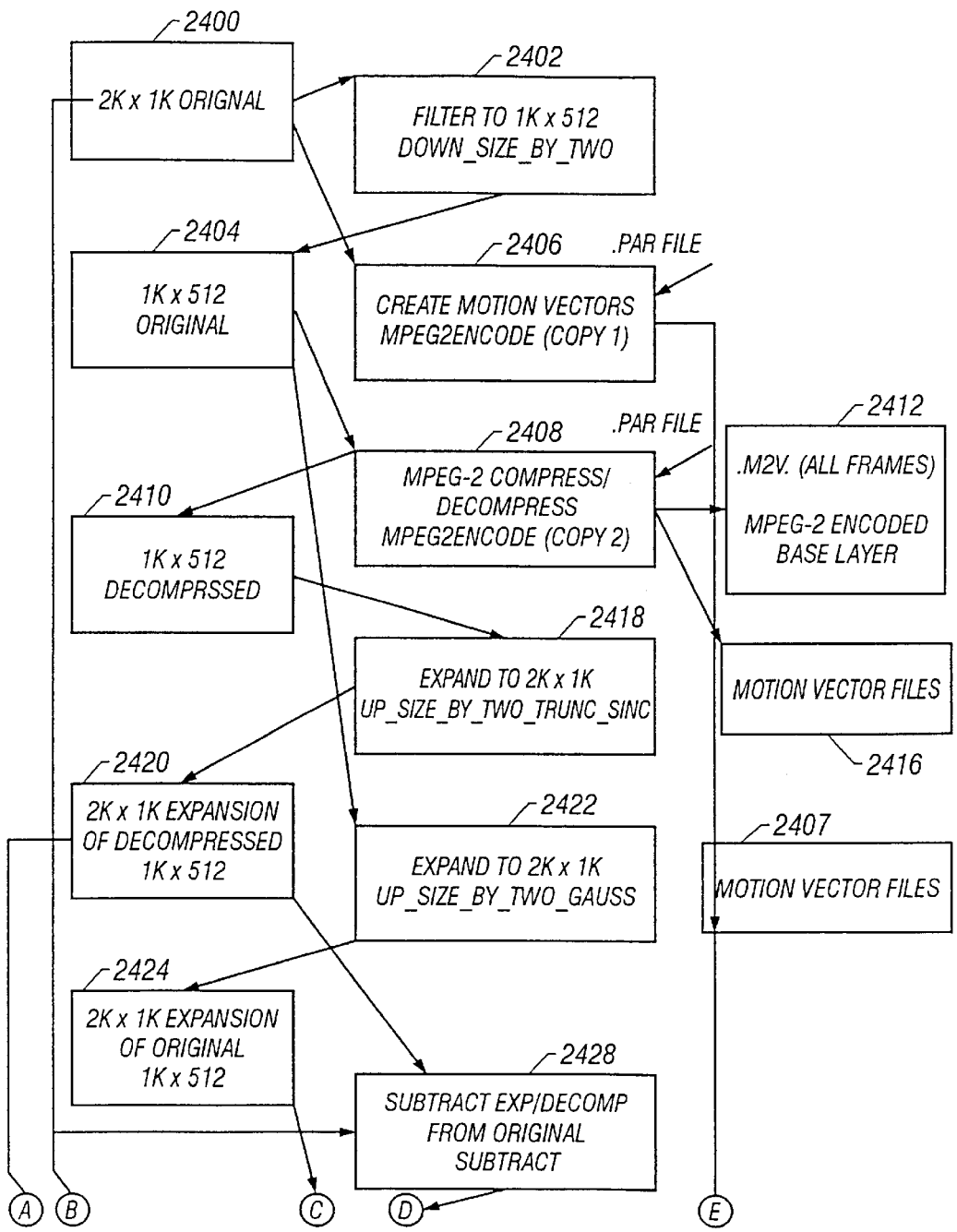
FIGS. 24A–24E are data flow diagrams showing on example professional level enhancement mode.
Figure 24B:
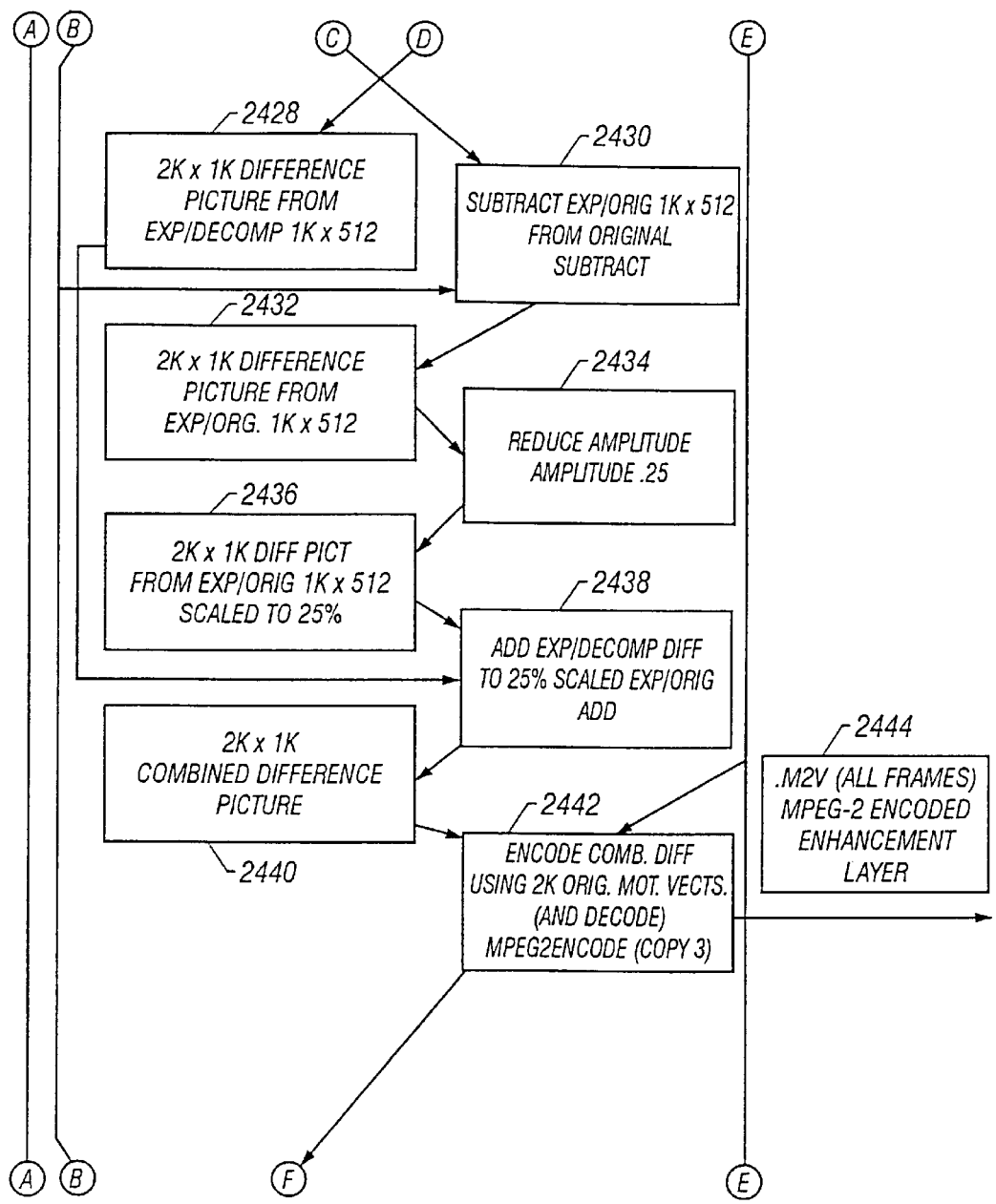
Figure 24C:
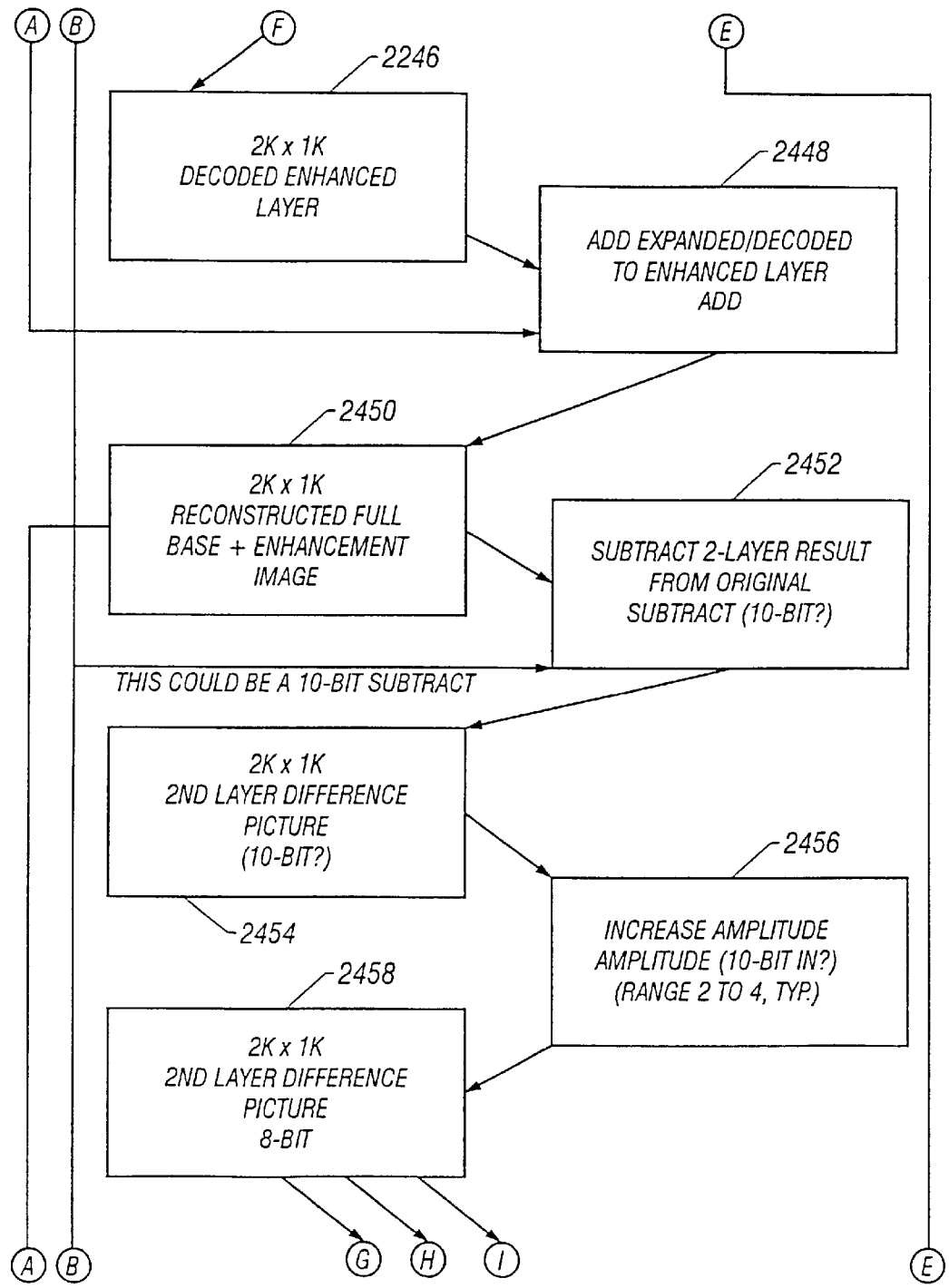
Figure 24D:
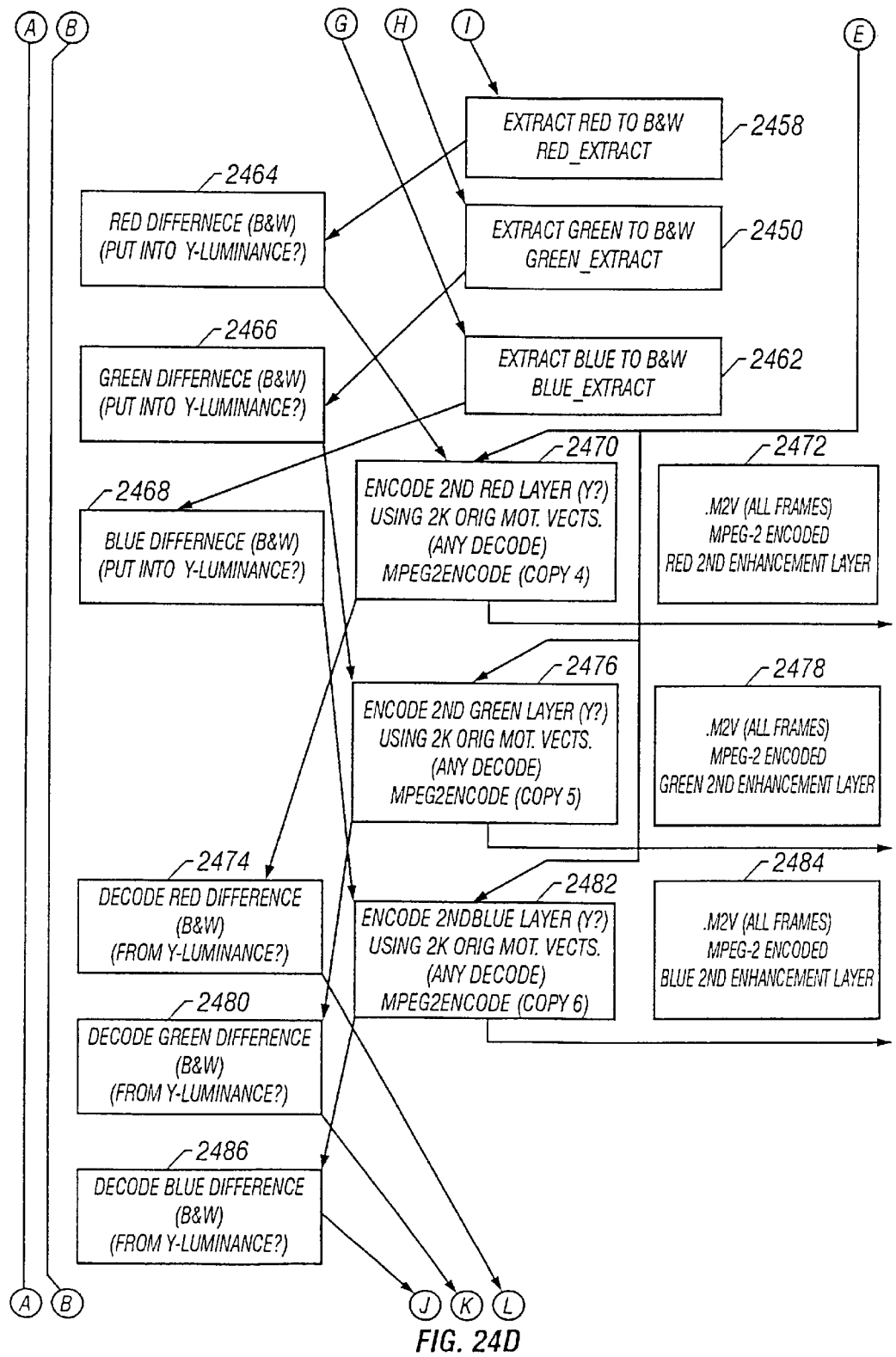
Figure 24E:
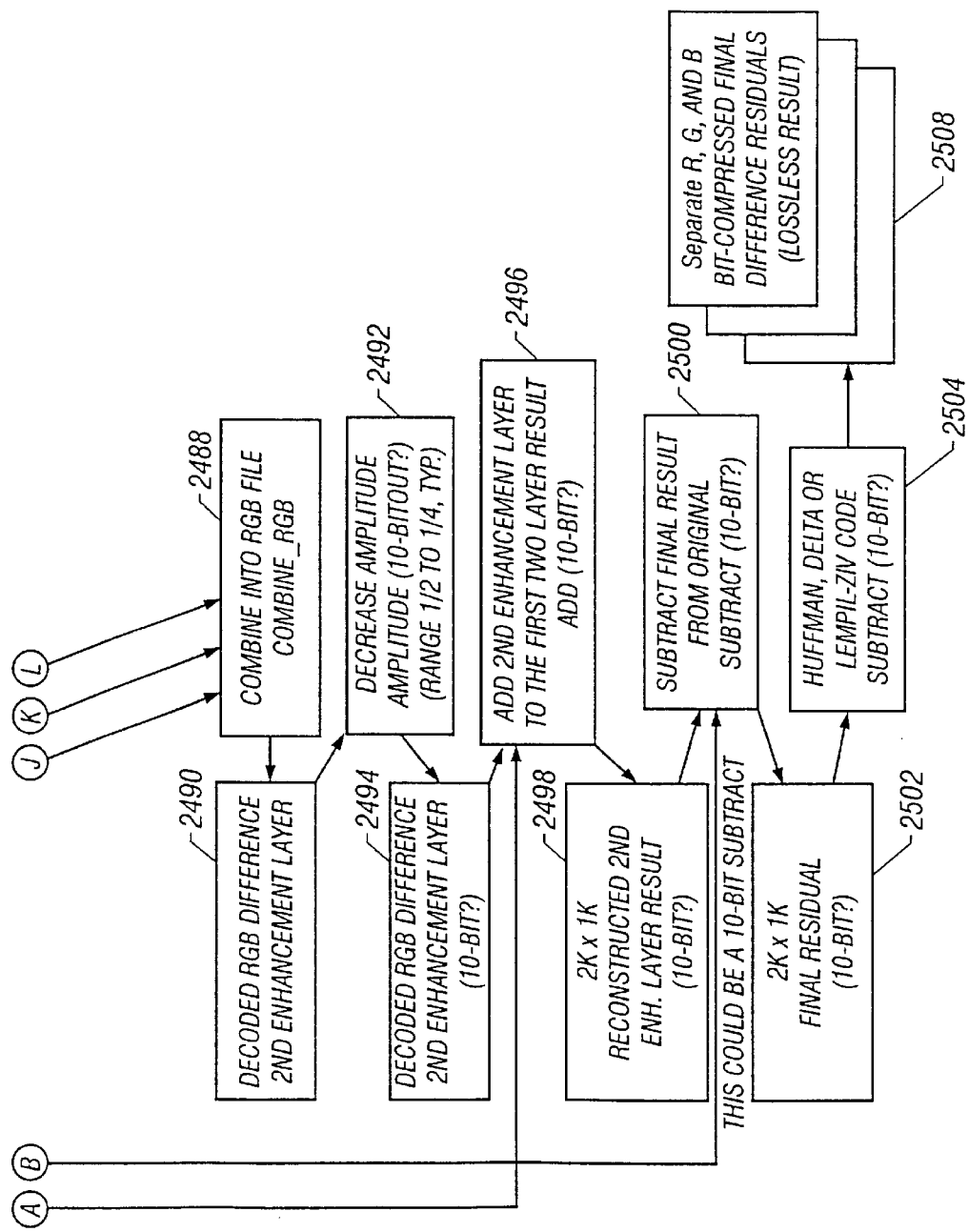

FIG. 24A shows an initial picture 2400 at 2 k×1 k pixels. Down filter 2402 this image to 1 k×512 pixels 2404. Create motion vectors 2406 from the initial picture and output as a file 2407. Compress/decompress 2408 the 1 k×512 pixel image 2404 to a 1 k×512 decompressed image 2410 and output the compressed version as the base layer 2412, along with the associated motion vector files 2416. Expand 2418 the 1 k×512 decompressed image 2410 as a 2 k×1 k image 2420. Expand 2422 the 1 k×512 image 2404 as a 2 k×k image 2424. Subtract 2426 the 2 k×1 k image 2420 from the original image 2400 to create a 2 k×1 k difference picture 2428.

Subtract 2430 the 2 k×1 k image 2424 from the original image 2400 to create a 2 k×1 k difference picture 2432. Reduce 2434 the amplitude of the 2 k×1 k difference picture 2432 to a selected amount (e.g., 0.25) to create a 2 k×1 k scaled difference picture 2436. Add 2438 the 2 k×1 k scaled difference picture 2436 to the 2 k×1 k difference picture 2428 to create a 2 k×1 k combined difference picture 2440. Encode/decode 2442 the combined difference picture 2440 using the original motion vectors and output an encoded enhancement layer 2444 (MPEG-2, in this example), and a 2 k×1 k decoded enhanced layer 2246. Add 2448 the 2 k×1 k decoded enhanced layer 2246 to the 2 k×1 k image 2420 to create a 2 k×1 k reconstructed full base plus enhancement image 2450. Subtract 2452 the original image 2400 from the 2 k×1 k reconstructed full base plus enhancement image 2450 to create a 2 k×1 k second layer difference picture 2454. Increase 2456 the amplitude of the 2 k×1 k second layer difference picture 2454 to create a 2 k×1 k difference picture 2458. Then extract the red channel information 2458, the green channel information 2460, and the blue channel information 2462 to create respective red difference 2464, green difference 2466, and blue difference 2468 images.

Using the motion vector file 2407: encode/decode 2470 a second red layer from the red difference picture 2464 as a red second enhancement layer 2472, and a decoded red difference image 2474; encode/decode 2476 a second green layer from the green difference picture 2466 as a green second enhancement layer 2478, and a decoded green difference image 2480; and encode/decode 2482 a second blue layer from the blue difference picture 2468 as a blue second enhancement layer 2484, and a decoded blue difference image 2486.

Combine 2488 the decoded red difference image 2474, decoded green difference image 2480, and the decoded blue difference image 2486 into a decoded RGB difference image 2490. Decrease 2492 the amplitude of the decoded RGB difference image 2490 to create a second decoded RGB difference image 2494. Add 2496 the second decoded RGB difference image 2494 to the 2 k×1 k reconstructed full base plus enhancement image 2450 to create a 2 k×1 k reconstructed second enhancement layer image 2498. Subtract 2500 the 2 k×1 k reconstructed second enhancement layer image 2498 from the original image 2400 to create a 2 k×1 k final residual image 2502. This 2 k×1 k final residual image 2502 is then losslessly compressed 2504 to create separate red, green, and blue final difference residuals 2506.

COMPUTER IMPLEMENTATION

The invention may be implemented in hardware or software, or a combination of both. However, preferably, the invention is implemented in computer programs executing on one or more programmable computers each comprising at least a processor, a data storage system (including volatile and non-volatile memory and/or storage elements), an input device, and an output device. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on a storage media or device (e.g., ROM, CD-ROM, or magnetic or optical media) readable by a general or special purpose programmable computer system, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

CONCLUSION

Different aspects of the invention that are considered to be novel include (without limitation) the following concepts:

Use of 72 fps as a source frame rate for electronic cameras, in order to provide compatibility with the existing worldwide 24 fps film and video infrastructure, while allowing the benefits of high frame rate for new electronic video systems.

Conversion to 60 fps from 72 fps and/or 120 fps using the motion compensation and frame rate conversion techniques from U.S. patent application Ser. No. 09/435,277 (entitled "System And Method For Motion Compensation and Frame Rate Conversion", filed Nov. 5, 1999).

Conversion to 24 fps from 72 fps using filters with weightings in the range [0.1 0.8, 0.1] to [0.25, 0.5, 0.25], and conversion to 24 fps from 120 fps using weightings of approximately [0.1, 0.2, 0.4, 0.2, 0.1].

Conversion to 60 fps from 120 fps using overlapping sets of three frames (advanced two 120ths for each one 60th frame) using weightings in the range [0.1, 0.8, 0.1] to [0.25, 0.5, 0.25].

Using motion compensation and frame techniques from U.S. patent application Ser. No. 09/435,277 (entitled "System And Method For Motion Compensation and Frame Rate Conversion", filed Nov. 5, 1999) to increase the motion blur and convert the frame rate from 72 fps (or other higher rate) source to 24 fps, on the small percentage of scenes where the generally preferred simple weightings may be less than the desired quality.

Using 24 fps monitoring, via the weighting functions described above, while shooting using a higher (72 fps, 120 fps, etc.) frame rate.

Simultaneous release of the derived 24 fps result together with the original higher frame rate.

De-graining and/or noise-reducing filtering prior to layered encoding.

Re-graining or re-noising after decoding, as a creative effect.

De-interlacing prior to layered compression.

Applying a three-field-frame de-interlacer prior to either single and multi-layer compression.

Upfiltering a picture prior to either single and multi-layer compression, thereby providing improved color resolution.

Adjusting the size of a sub-region within an enhancement layer, and the relative proportion of the bits allocated to the base and enhancement layer.

Treating vertical and horizontal relationships as independent, such that the fractional relationships can be independent and different.

Allowing higher bit rates for compression units (such as the GOP) during periods of high compression stress (either automatically, by detecting high values of rate control quantization parameter, or manually controlled).

Using "modularized" bit rates wherein natural units of compression and layered compression systems can utilize increased bit rates in modular units.

Pre-loading a decompression buffer(s) with modular units of increased bit rate for use with compression or layered compression systems.

Using constant bit rate systems with one or more layers of the present layered compression system.

Using variable bit rate systems with one or more layers of the present layered compression system.

Using combined fixed and variable bit rate systems used with various layers of the present layered compression system.

Using correspondingly larger DCT block size and additional DCT coefficients for use in resolution layering (also called "spatial scalability"). For example, if a given layer doubles the resolution, then the DCT block size will be twice as large. This results in a harmonically aligned resolution layering structure, providing optimal coding efficiency due to optimal inter-layer coefficient orthogonality.

Using multiple motion vectors per DCT block, so that both large and small DCT blocks can optimize the tradeoff between motion vector bits and improved motion compensated prediction.

Using negative-lobed upsizing and downsizing filters, particularly truncated sinc filters.

Using negative-lobed motion compensation displacement filters.

Selection of optimal variable length codes on a relatively instantaneous basis, such as each frame, each region of a frame (such as several scanlines or macroblock lines or each quadrant), or every several frames.

Using an augmentation stream to add improved coding features to existing compression systems, thereby providing backward compatibility as well as improved quality using a new enhanced decoder.

Using an enhanced decoded picture to provide a higher quality base layer for resolution layering.

Sharing of coding elements between similar moving image coding systems to provide backward compatibility as well as a path to improvement.

Consideration in the encoding process of generating compressed bitstreams partially common to two types of decoders, including provision for favoring one or the other.

Using base layer motion vectors as guide vectors to center the range of motion vectors used in the enhancement layer.

Application of combinations of the above techniques to enhancement layers, or to improve MPEG-1, MPEG-2, MPEG-4, H.263, DVC-Pro/DV, and other compression systems, including wavelet-based systems.

A number of embodiments of the invention have been described. Nevertheless, it will be understood that various modifications may be made without departing from the spirit and scope of the invention. For example, while the preferred embodiment uses MPEG-2 or MPEG-4 coding and decoding, the invention will work with any comparable standard that provides equivalents of I, P, and/or B frames and layers. Accordingly, it is to be understood that the invention is not to be limited by the specific illustrated embodiment, but only by the scope of the appended claims.

What is claimed is:

1. A method for enhancing image quality in an image encoding system using one-quarter pixel motion compensation, including:
    (a) applying a filter having negative lobes to a half-way subpixel point between adjacent first and second pixels to generate a one-half filtered pixel value;
    (b) applying a filter negative lobes to a one-quarter-way subpixel point between the first and second pixels; and
    (c) applying a filter having negative lobes to a three-quarter-way subpixel point between the first and second pixels.

2. A method for enhancing image quality in an image encoding system using one-half pixel motion compensation, including applying a filter having negative lobes to a half-way subpixel point between adjacent first and second pixels to generate a one-half filtered pixel value.

3. A method for enhancing image quality in an image encoding system using, during encoding of an image, one-half pixel motion compensation for a luminance channel, including filtering each chrominance channel using one-quarter pixel resolution and further including applying a filter having negative lobes to each one-quarter subpixel point between adjacent first and second chrominance pixels.

4. A method for enhancing image quality in an image encoding system using, during encoding of an image, one-quarter pixel motion compensation for a luminance channel, including filtering each chrominance channel using one-eighth pixel resolution and further including applying a filter having negative lobes to each one-eighth subpixel point between adjacent first and second chrominance pixels.

5. The method of claims 1, 2, 3, or 4, wherein each filter having negative lobes is a truncated sinc filter.

6. A method for enhancing image quality in an image encoding system using at least one-quarter pixel motion compensation, including:

applying a filter having negative lobes to a half-way subpixel point between adjacent first and second pixels to generate a one-half filtered pixel value;

applying a filter having negative lobes to a one-quarter-way subpixel point between the first and second pixels; and applying a filter having negative lobes to a three-quarter-way subpixel point between the first and second pixels.

7. The method of claim 6, wherein each filter having negative lobes is a truncated sinc filter.

8. A method for enhancing image quality in an image encoding system using, during encoding of an image, one-half pixel motion compensation for a luminance channel, including filtering each chrominance channel using one-quarter pixel resolution, wherein said enhancing is carried out during both encoding and decoding of the image.

9. A method for enhancing image quality in an image encoding system using, during encoding of an image, one-quarter pixel motion compensation for a luminance channel, including filtering each chrominance channel using one-eighth pixel resolution, wherein said enhancing is carried out during both encoding and decoding of the image.

* * * * *